United States Patent [19]
Ariga et al.

[11] Patent Number: 5,933,191
[45] Date of Patent: Aug. 3, 1999

[54] IMAGE INPUT APPARATUS HAVING AN ADJUSTABLE SUPPORT MECHANISM

[75] Inventors: Kazuto Ariga; Kenji Kawano; Seiji Iida, all of Tokyo, Japan

[73] Assignee: Canon Kabushiki Kaisha, Tokyo, Japan

[21] Appl. No.: 08/664,246

[22] Filed: Jun. 7, 1996

[30] Foreign Application Priority Data

| Jun. 14, 1995 | [JP] | Japan | 7-147908 |
| Jan. 30, 1996 | [JP] | Japan | 8-014685 |
| Jan. 30, 1996 | [JP] | Japan | 8-014686 |
| Jan. 30, 1996 | [JP] | Japan | 8-014687 |

[51] Int. Cl.$^6$ .................................................. H04N 5/225
[52] U.S. Cl. .......................................... 348/373; 348/375
[58] Field of Search .................................. 348/373, 374, 348/375, 376, 207; 248/278.1; 403/50, 53, 180, 181; 362/418, 419; 396/419, 422, 428, 429; H04N 5/225

[56] References Cited

U.S. PATENT DOCUMENTS

| 4,916,550 | 4/1990 | Miyake et al. . | |
| 5,108,061 | 4/1992 | Vlasak . | |
| 5,429,336 | 7/1995 | Ko .......................................... | 248/278 |

FOREIGN PATENT DOCUMENTS

| 0 563 438 A1 | 10/1993 | European Pat. Off. . | |
| 0 656 194 A1 | 6/1995 | European Pat. Off. . | |
| 44 30 559 A1 | 3/1995 | Germany . | |
| 6-141206 | 5/1994 | Japan ............................ | H04N 5/222 |
| 673 148 A5 | 2/1990 | Switzerland . | |

OTHER PUBLICATIONS

European Search Report in Application No. EP 96 30 4397 dated Jul. 30, 1998 citing to the references listed herein.

*Primary Examiner*—Tuan V. Ho
*Attorney, Agent, or Firm*—Morgan & Finnegan LLP

[57] ABSTRACT

There is provided an image input apparatus which can quickly and easily move a camera head to an intended position, can adequately adjust the position of the camera head, can improve operability in the document photographing mode, and is easy to carry. The image input apparatus has a camera head, support members coupled via a plurality of joint portions to support the camera head, and a base for supporting the proximal end side of the support members. When an image is input by the camera head, the camera head can be held at a predetermined position and posture by each of the plurality of joint portions. A pivot support mechanism arranged between a camera unit and a support portion has a fist support member having two opposing projections, a second support member arranged between the projections, a pair of clamping members arranged to clamp the projections between the second support member and themselves, and a torque generation mechanism for generating a torque between the second support member, the clamping members, and the projections. A pivot support mechanism arranged between a support portion and a base has a first support member having two opposing projections, a second support member, and has two end portions respectively engaging with the two projections and a coupling portion for coupling these two end portions, and a torque generation mechanism arranged between the first and second support members. An opening portion through which the cable extends is formed on the coupling portion.

24 Claims, 37 Drawing Sheets

IMAGE INPUT APPARATUS HAVING AN ADJUSTABLE SUPPORT MECHANISM

BACKGROUND OF THE INVENTION

The present invention relates to an image input apparatus for picking up images of objects such as various kinds of documents, a person, and the like.

A conventional image input apparatus of this type will be explained below with reference to FIGS. 36 and 37. Referring to FIG. 36, reference numeral 301 denotes a lens; 302, a camera head which incorporates a CCD element and its circuit board (neither are shown); and 303, an arm which is constituted by a bellows- or spiral-shaped metal pipe. A signal cable is inserted through the arm 303, which can be bent to an arbitrary shape. Reference numeral 304 denotes a base which incorporates a main circuit board (to be described later) and is coupled to a chassis which also serves as a weight; 305, a monitor connected via a cable 306; 307, an original; 308, an operator or his or her position; and 309, an image of the operator as an object displayed on the monitor 305.

A portrait photographing operation as a typical use method of the conventional image input apparatus with the above-mentioned arrangement will be described below. First, the operator turns on a power switch (not shown) arranged on the base 304. Then, an image of the object (person) picked up by the camera head 302 is displayed on the monitor 305. In the case of FIG. 36, since the camera head 302 picks up an image of the photographer at the position 308, the monitor 305 displays the image 309 of the operator. At this time, a focusing ring provided to the lens 301 is turned to attain a focusing operation, as needed.

A document photographing operation for picking up an image of the original 307 placed on the desk will be described below. When the document photographing operation is performed, the operator holds the camera head 302 to move it to a position 302a indicated by a broken line in FIG. 36. Since the arm 303 is constituted by the bellows-shaped metal pipe that can be bent to an arbitrary shape, the operator can easily move the camera head 302.

The operator places the original 307 with respect to the camera head 302 moved to the position 302a, so that the lower side of the original is located on the base side (erected state when viewed from the base 304), as shown in FIG. 36. The original 307 must be placed in such direction since the CCD is attached to the camera head 302 to have a normal up-and-down direction in the portrait photographing operation. For this reason, in the document photographing operation, the up-and-down direction of the original 307 must be set in correspondence with the direction of the CCD, as shown in FIG. 36. With this adjustment, an image of the original 307 picked up by the camera head 302 at the position 302a can be displayed on the monitor 305 to have a normal direction, thus realizing a document photographing operation. At this time, the focusing ring provided to the lens 301 is turned to attain a focusing operation, as needed.

The internal arrangement of the base 304 will be described below with reference to FIG. 37. Referring to FIG. 37, the base 304 comprises a cylindrical portion 304a for holding the arm 303, and is fixed to a chassis 315 by screws (not shown). A main circuit board 316 is fixed to the chassis 315 by screws. Circuit boards 317, 318, and 319 are connected to the main circuit board 316 via connectors 320, 321, and 322, thus assuring a board area by effectively utilizing the internal space of the base 304.

The main circuit board 316 also has a connector 316a for receiving a cable (a flexible circuit board consisting of polyimide) for transferring signals from the camera head 302, and an image output terminal for receiving the cable 306 (FIG. 36). The chassis 315 comprises a substantially cubic block 315a consisting of a zinc-based material. The block 315a has not only a role of the bottom plate to which the main circuit board 316 and the base 304 are attached, but also a role of a weight that stably supports the entire apparatus.

However, the above-mentioned prior art suffers the following problems.

(1) The arm 303 has resiliency since it consists of a bellows-shaped metal member. For this reason, when the operator moves the camera head 302, the camera head 302 deviates slightly from the position intended by the operator due to the resiliency, i.e., so-called spring back. Therefore, the operator must repetitively adjust the position of the camera head 302, resulting in cumbersome operations.

(2) In a normal document photographing operation, an A4-size (JIS) original is photographed to be fully displayed on the screen of the monitor 305. However, since the arm 303 is free to bend to an arbitrary shape, the operator has no reference for alignment, and a long time is also required for adjusting the position of the camera head 303 even in the normal document photographing operation.

(3) Furthermore, in the document photographing operation, the lower portion of the original 307 must be set on the base 304 side, as described above. When the monitor 305 is present in the vicinity of the operator, the operator can give an explanation while observing the monitor 305. However, when the monitor 305 is located at a position separated away from the operator and the operator must give an explanation while reading the original 307, since the characters on the original 307 are in an upside-down state viewed from the operator, it is very difficult to read such document, thus disturbing a smooth explanation.

(4) When the apparatus is carried while holding the base 304, the arm 303 rocks to the right and left due to the weight of the camera head 302. For this reason, it is not easy to carry the apparatus. In the worst case, the camera head 302 may be damaged upon colliding against the wall.

(5) In particular, in the document photographing operation, the arm 303 to which the camera head 302 is fixed is constituted by a bellows-shaped metal pipe that is free to bend to an arbitrary shape, the camera head 302 moves freely and it is difficult to fix the camera head 302 at a given position. Furthermore, with this arrangement, the camera head 302 is easily influenced by an external vibration or the like. For this reason, the image displayed on the monitor 305 may vibrate, and becomes very difficult to observe.

(6) When the operator wants to normally display an image of the original 307 on the screen of the monitor 305, he or she must change the position of the original 307 or must move the camera head 302 in a so-called trial-and-error manner while confirming the image of the original 307, resulting in tedious operations. In this manner, when the original 307 is placed, an alignment operation requires troublesome operations in association with the camera head 302, resulting in very poor operability. Also, in terms of assembling, since the cable or the like must be inserted through the bellows-shaped metal pipe that is free to bend to an arbitrary shape, the assembling efficiency is impaired, resulting in high cost.

(7) Furthermore, in terms of reliability as well, since there is no means for regulating the rotation angle or the like of the bend portion, an excessive load is imposed on the cable, and the cable may be disconnected consequently.

SUMMARY OF INVENTION

It is an object of the present invention to provide an image input apparatus which allows an operator to quickly and easily move the camera head to a position that he or she intended.

It is another object of the present invention to provide an image input apparatus which allows an operator to easily recognize the basic form of the apparatus in the document photographing operation, and to quickly adjust the position of the camera head for the document photographing operation.

It is still another object of the present invention to provide an image input apparatus which can perform the document photographing operation while setting an original in a direction which is easy to read for the operator.

It is still another object of the present invention to provide an image input apparatus which can be easily carried.

An image input apparatus of the present invention comprises a camera head for inputting an image, a support member coupled via a plurality of joint portions so as to be able to support the camera head, and a base for supporting a proximal end side of the support member, and when an image is input by the camera head, the camera head can be held at a predetermined position and posture by each of the plurality of joint portions.

The plurality of joint portions comprise a first joint portion consisting of a first hinge portion and a first pivot portion, a second joint portion consisting of a second hinge portion, and a third joint portion consisting of a third hinge portion and a second pivot portion, the support member comprises a first column on the side of the camera head and a second column on the side of the base, which columns are coupled via the second joint portion, and the hinge portions and the pivot portions of the respective joint portions pivot within predetermined angle ranges and can be held at arbitrary angular positions.

The camera head is supported by one end of the first column via the first joint portion, so that the optical axis direction with respect to the first column and the pivot angle about the optical axis are respectively adjustable, the first column is supported at the other end thereof via the second joint portion, so that the axial direction with respect to the second column is adjustable, the second column is supported at the proximal end thereof via the third joint portion, so that the axial direction with respect to the vertical axis of the base and the pivot angle about the axis are respectively adjustable, and the apparatus can be set in at least a first posture in which the optical axis direction of the camera head is set in substantially the vertically downward direction, and a second posture in which the optical axis direction of the camera head is set in substantially the horizontal direction.

The camera head can move within a predetermined area range of a substantially horizontally arranged object placing surface and be held at an arbitrary position while being set in the first posture, and the camera head can face an object portion in substantially the vertical direction while being set in the second posture.

The camera head can be set in the first posture, the second posture, and a third posture in which the joint portions are pivoted so that the first and second columns are folded to overlap each other.

More specifically, according to the present invention, the hinge and pivot portions of the respective joint portions are designed not to generate a spring back in the pivot direction when they are pivoted, and can be fixed in position at an arbitrary pivot angle. With this structure, when the camera head is moved, the camera head position can be prevented from deviating, and hence, the operator can be quickly and adequately move the camera head to a position that he or she intended.

According to the present invention, when a normal document photographing operation for picking up an image of, especially, an A4-size original to be fully displayed on the screen of the monitor is performed, the apparatus preferably adopts a form in which the second column is set to be perpendicular to the base, the first column is set to be parallel to the base, and the camera-head is set to face down. In other words, the base and the second column form right angles, the second and first columns form right angles, and the first column and the camera head form right angles. Since this form is a typical one that can be easily recognized and remembered by the operator, the operator can quickly perform the normal document photographing operation.

When the original has a size other than A4 size, e.g., a size smaller than A4 size, the above-mentioned form is set, and thereafter, the camera head need only be moved immediately downward in correspondence with such original. Conversely, when the original has a size larger than A4 size, the camera head need only be moved immediately upward. As described above, originals having different sizes can be set by basically moving only the camera head vertically. Therefore, a document photographing operation can be attained more quickly than in a conventional apparatus.

In order to set an original at a position where the original is easy to read for the operator in the document photographing operation, the original must be placed to be erected when viewed from the operator side. However, the direction of the original at that time is opposite to that of an object in a portrait photographing operation. For this reason, when the vertical direction of the CCD incorporated in the camera head is determined with reference to the vertical direction of an object in the portrait photographing operation, if the document photographing operation is performed using the camera head set in this state, a vertically inverted original image is displayed on the monitor. In view of this problem, in the apparatus of the present invention, the camera head is pivotal in the circumferential direction of the lens by the first pivot portion. By pivoting the camera head through 180° so as to match the vertical direction of the CCD with that of the original, an erected original image can be displayed on the monitor screen. As described above, in the document photographing operation, an original can be set in a direction in which the original is easy to read for the operator.

According to the present invention, in this apparatus, the first pivot portion with the camera head is preferably pivoted by the first hinge portion vertically upward with respect to the first column through a predetermined angle, and the first column is pivoted by the second hinge portion to be substantially parallel to the second column. Subsequently, when the second column is set to be substantially perpendicular to the base, the apparatus can have a form in which the entire apparatus falls within the projected range of the base. With this form, the apparatus can be made compact, and the folded first and second columns can be held by one hand. Thus, the operator can easily carry the apparatus with his or her hand.

It is still another object of the present invention to provide an image input apparatus which can reliably fix the camera head in position, allows accurate and easy alignment of the camera head with respect to an original so as to improve operability in a document photographing operation, has high resistances for environmental conditions such as a vibration, and can realize low cost and high reliability with a simple arrangement.

An image input apparatus according to the present invention comprises a camera unit for inputting an image, a support portion for pivotally supporting the camera unit, a base for supporting the support portion, and a pivot support mechanism arranged between the camera unit and the support portion, and the pivot support mechanism comprises a first support member having two opposing projections, a second support member arranged between the two projections, a pair of clamping members arranged to clamp the two projections between the second support members and themselves, and torque generation means for generating a predetermined torque between the second support member, the clamp members, and the projections.

The second support member and the clamping members are coupled via a screw arranged at the pivot center.

The first support member is arranged in the support portion, and the second support member is arranged on the side of the camera unit.

The camera unit and the second support member are coupled to each other via a coupling member.

The torque generation means comprises a first slide member arranged between the projections of the first support member and the end portion of the second support member, a second slide member arranged between the projections and the clamping members, and clamping force generation means for generating a clamping force between the second support member and the clamping members.

The clamping force generation means comprises tightening means for tightening from the position outside the pair of clamping members, and urging means arranged between the tightening means.

The urging means is arranged outside at least one of the clamping members.

The urging means comprises a belleville spring, the second slide member comprises a sheet-shaped member, and a metal plate is arranged between the urging means and the second slide member.

Alternatively, according to the present invention, a pivot support mechanism, which is arranged between first and second members, and supports the first and second members to be pivotal relative to each other, comprises a first support member having two opposing projections, a second support member arranged between the two projections, a pair of clamping members arranged to clamp the two projections between the second support members and themselves, and torque generation means for generating a predetermined torque between the second support member, the clamp members, and the projections.

The second support member and the clamping members are coupled via a screw arranged at the pivot center.

The torque generation means comprises a first slide member arranged between the projections of the first support member and the end portion of the second support member, a second slide member arranged between the projections and the clamping members, and clamping force generation means for generating a clamping force between the second support member and the clamping members.

The clamping force generation means comprises tightening means for tightening from the position outside the pair of clamping members, and urging means arranged between the tightening means.

The using means is arranged outside at least one of the clamping members.

The using means comprises a belleville spring, the second slide member comprises a sheet-shaped member, and a metal plate is arranged between the using means and the second slide member.

More specifically, according to the present invention, an image input apparatus comprises a camera unit for inputting an image, a support portion for pivotally supporting the camera unit, a base for supporting the support portion, and a pivot support mechanism arranged between the camera unit and the support portion, and the pivot support mechanism comprises a first support member having two opposing projections, a second support member arranged between the two projections, a pair of clamping members arranged to clamp the two projections between the second support members and themselves, and torque generation means for generating a predetermined torque between the second support member, the clamp members, and the projections.

With this arrangement, the camera portion is stably supported by the base via the support portion. In this case, the position of the camera portion with respect to the support portion can be adjusted via the pivot support mechanism, so that a camera head of the camera portion can be reliably fixed in position. In particular, in a document photographing mode, the camera head can be accurately and easily aligned to an original, thus improving the operability in the document photographing mode.

Also, according to the present invention, the torque generation means comprises a first slide member arranged between the projections of the first support member and the end portion of the second support member, a second slide member arranged between the projections and the clamping members, and clamping force generation means for generating a clamping force between the second support member and the clamping members. When the pivot support mechanism is pivoted while generating an appropriate pivot torque during its operation, the camera head can be adequately set at a desired position, thus realizing a pivot support mechanism with high reliability.

An image input apparatus according to the present invention comprises a camera unit for inputting an image, a cable for transmitting information from the camera unit, a support portion for pivotally supporting the camera unit, a base for supporting the support portion, and a pivot support mechanism arranged between the camera unit and the support portion, the pivot support mechanism comprises a first support member having two opposing projections, a second support member which is a planar member having a U-shaped section, and has two end portions engaging with the two projections and a coupling portion for coupling the two end portions, and torque generation means arranged between the first and second support members, and the coupling portion is formed with an opening portion through which the cable extends.

The support portion comprises a pipe-shaped member, and the cable extends through the support portion.

The first support member is arranged on the base, and the second support member is arranged on the support portion.

One of the two projections comprises a member, a position of which is adjustable with respect to the first support member.

The torque generation means comprises a first slide member arranged between the projections of the first support member and the end portion of the second support member, a second slide member arranged to clamp the end portion of the second support member by the first slide member, and clamping force generation means for generating a clamping force between the first and second slide members.

The clamping force generation means comprises tightening means for tightening from the position outside the projections of the first support members and the second slide member, and urging means arranged between the tightening means.

The urging means is arranged on the side of the second slide member.

The urging means comprises a belleville spring, the second slide member comprises a sheet-shaped member, and a metal plate is arranged between the urging means and the second slide member.

Alternatively, according to the present invention, a pivot support mechanism, which is arranged between first and second members, and supports the first and second members to be pivotal relative to each other, comprises a first support member having two opposing projections, a second support member which is a planar member having a U-shaped section, and has two end portions engaging with the two projections and a coupling portion for coupling the two end portions, and torque generation means arranged between the first and second support members, and the torque generation means comprises a first slide member arranged between the projections of the first support member and the end portion of the second support member, a second slide member arranged to clamp the end portion of the second support member by the first slide member, and clamping force generation means for generating a clamping force between the first and second slide members.

The clamping force generation means comprises tightening means for tightening from the position outside the projections of the first support members and the second slide member, and urging means arranged between the tightening means.

The urging means is arranged on the side of the second slide member.

The urging means comprises a belleville spring, the second slide member comprises a sheet-shaped member, and a metal plate is arranged between the urging means and the second slide member.

The One of the two projections comprises a member which is attached to the first support member so that its position is adjustable.

More specifically, according to the present invention, an image input apparatus comprises a camera unit for inputting an image, a cable for transmitting information from the camera unit, a support portion for pivotally supporting the camera unit, a base for supporting the support portion, and a pivot support mechanism arranged between the camera unit and the support portion, the pivot support mechanism comprises a first support member having two opposing projections, a second support member which is a planar member having a U-shaped section, and has two end portions engaging with the two projections and a coupling portion for coupling the two end portions, and torque generation means arranged between the first and second support members, and the coupling portion is formed with an opening portion through which the cable extends.

With this arrangement, the camera portion can be stably supported on the base via the support portion. In this case, since the opening portion through which the cable extends is formed on the coupling portion of the second support member in the pivot support mechanism, the cable can be efficiently housed in the apparatus, thus attaining a size reduction of the apparatus. Since the cable can have an optimal layout, it is free from any stress due to twisting, bending, and the like of the cable during the camera operation. Thus, the cable durability can be improved, and an image input apparatus with high reliability can be realized.

Also, according to the present invention, the torque generation means comprises a first slide member arranged between the projections of the first support member and the end portion of the second support member, a second slide member arranged to clamp the end portion of the second support member by the first slide member, and clamping force generation means for generating a clamping force between the first and second slide members. When the pivot support mechanism is pivoted while generating an appropriate pivot torque during its operation, the camera head can be adequately set at a desired position, thus realizing a pivot support mechanism with high reliability.

Furthermore, since the position of one torque generation means can be freely adjusted, a low-cost pivot support mechanism can be realized.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

The preferred embodiments of an image input apparatus according to the present invention will be described hereinafter with reference to the accompanying drawings.

Figure 1:
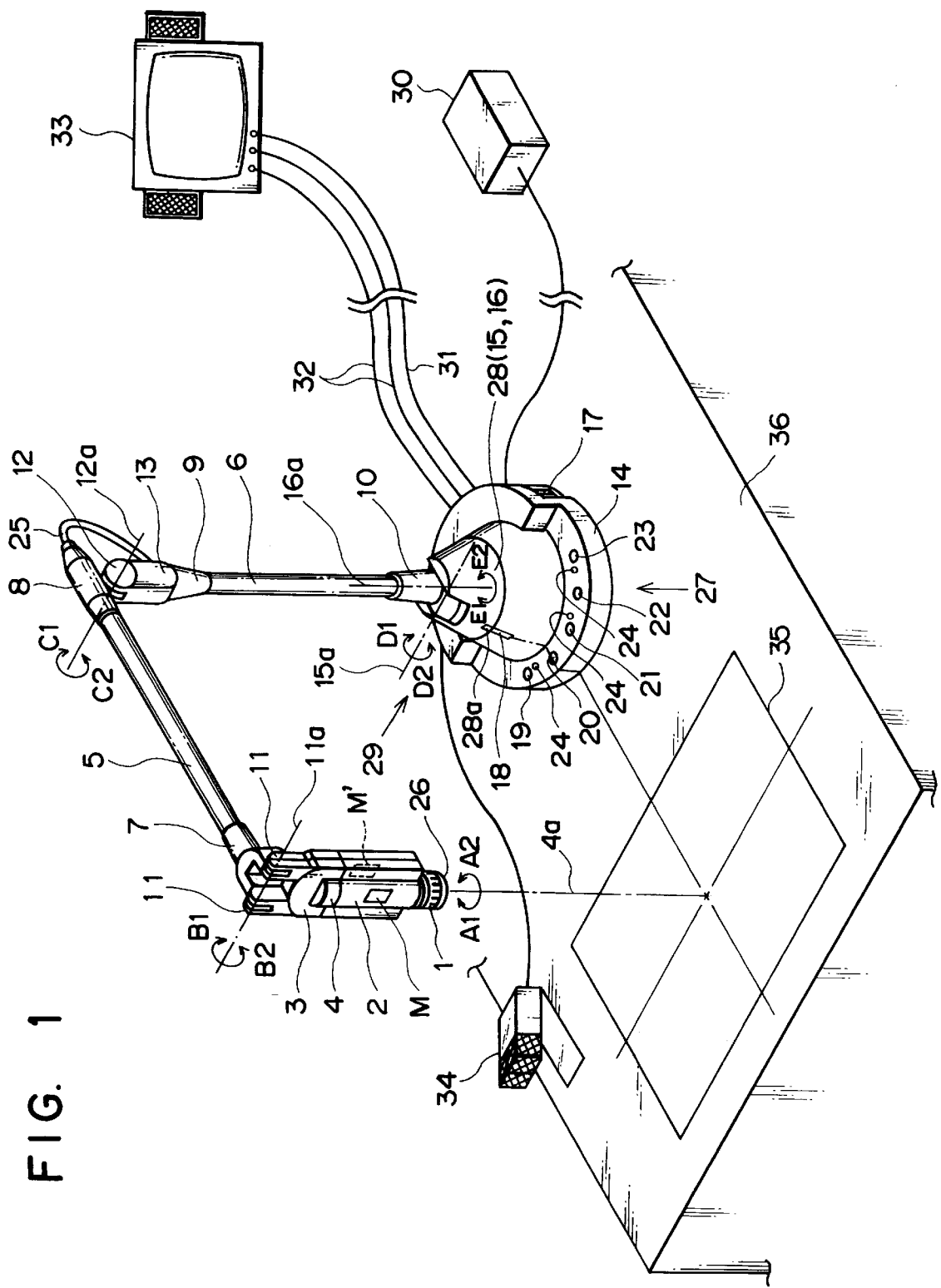
FIG. 1 is a perspective view best illustrating the outer appearance of an image input apparatus according to an embodiment of the present invention.

FIG. 1 is a perspective view best illustrating the characteristic feature of the present invention. Referring to FIG. 1, reference numeral 1 denotes a lens, which comprises a focus adjustment ring 1a and an aperture adjustment ring 1b (to be described later). An alternate long and short dashed line in FIG. 1 indicates the optical axis direction of the lens 1. Reference numeral 2 denotes a camera head which includes a CCD as an image pickup element and an electronic circuit board for performing image signal processing (neither are shown).

Reference numeral 3 denotes a head base for supporting the camera head 2. The camera head 2 and the head base 3 are axially supported by a first pivot portion 4 to be pivotal in the directions of arrows A1 and A2 about an axis 4a agreeing with the lens optical axis. Reference numeral 5 denotes an arm serving as a first column for supporting the camera head 2; and 6, an arm serving as a second column. These arms 5 and 6 respectively comprise hollow pipes, and joints 7 and 8, and 9 and 10 are respectively coupled to the two-end portions of these arms 5 and 6 by press-fitting. The joint 7 and the head base 3 are axially supported by a hinge 11 serving as a first hinge portion to be pivotal in the directions of arrows B1 and B2 about a central axis 11a indicated by an alternate long and short dashed line. Note that the first pivot portion 4 and the hinge 11 constitute a first joint portion.

The joints 8 and 9 are axially supported by a hinge 12 serving as a second hinge portion to be pivotal in the directions of arrows C1 and C2 about a central axis 12a indicated by an alternate long and short dashed line. The hinge 12 and the joint 9 are covered by an outer case 13. Note that the hinge 12 constitutes a second joint portion.

The joint 10 is axially supported by a hinge 15 (FIG. 27) serving as a third hinge portion and a second pivot portion 16 to be pivotal in the directions of arrows D1 and D2 and in the directions of arrows E1 and E2 with respect to a main body base 14 serving as a base about central axes 15a and 16a indicated by alternate long and short dashed lines. Note that the second pivot portion 16 and the hinge 15 constitute a third joint portion.

The main body base 14 includes an electronic circuit board serving as a signal processing unit for performing image signal processing, input/output control, and the like, and a weight for improving the stability of the apparatus, which are not shown in FIG. 1. Furthermore, the main body base 14 comprises a power switch 17, a power LED lens 18 for externally guiding light emitted by a power LED which is arranged on the circuit board and indicates the ON/OFF state of the power supply, switches for attaining various functions, and LED lenses indicating their operation states. Reference numeral 19 denotes an automatic gain control switch (to be referred to as an AGC switch hereinafter) for automatically controlling the brightness of an image; 20, a negative/positive reversal switch; 21, a microphone mute switch; and 22, a white balance switch (to be referred to as a WB switch hereinafter). With the WB switch 22, the color tones can be adjusted. On the circuit board, LEDs indicating the operation states of the switches 19, 21, and 22 are arranged, and light beams emitted from these LEDs are externally guided via an LED lens 24.

Reference numeral 25 denotes a main cable, which connects the circuit board in the camera head 2 and that in the main body base 14. The main cable 25 serving as a cable in the present invention runs through the interiors of the arms 5 and 6. Portions of the main cable 25 are exposed between the head base 3 and the joint 7, and between the joints 8 and 9. Although not shown, the two ends of the cable 25 are respectively clamped by the head base 3 and the main body base 14. Reference numeral 26 denotes a lens cap which protects the lens 1 when the apparatus is not used.

Reference numeral 27 (FIG. 35) denotes rubber legs which are arranged on the bottom surface of the main body base 14 in FIG. 1 and are used for preventing the apparatus from slipping and for improving the stability of the apparatus; and 28, a hinge cover which pivots about the central axis 16a together with the hinge 16. The hinge cover 28 has an index 28a that matches the power LED lens 18 when the camera head 2 is located on the central line of the main body base 14. Furthermore, reference numeral 30 denotes an AC adapter for converting an AC current into a DC current; 31 and 32, connection cords used for outputting an image signal and stereophonic audio signals to an external monitor 33 with stereophonic loudspeakers. The AC adapter 30 and the connection cords 31 and 32 are respectively connected to a DC input terminal, an image output terminal, and audio output terminals arranged on the rear surface of the main body base 14. Reference numeral 34 denotes an external microphone which picks up a voice of an operator as stereophonic audio data. The microphone 34 is connected to a microphone input terminal 29 arranged on the side surface of the main body base 14. Reference numeral 35 denotes an original as an object.

Figure 2:
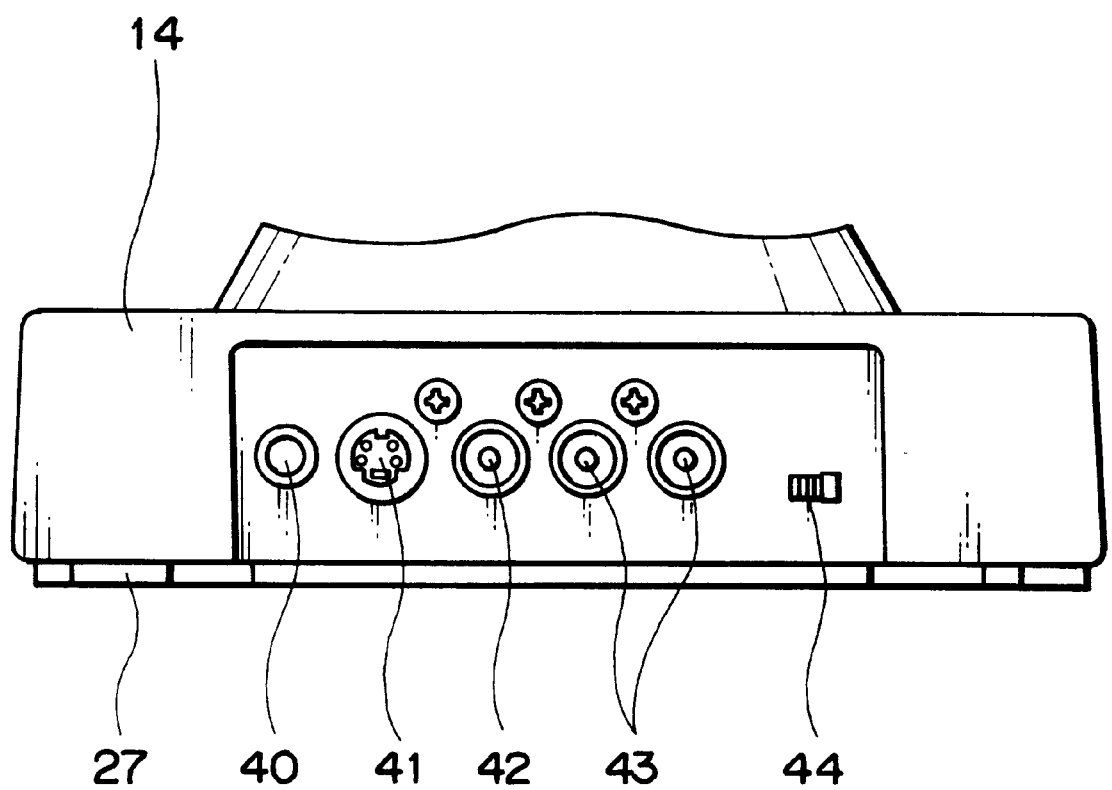
FIG. 2 is a schematic rear view for explaining a rear panel in the embodiment of the present invention.

FIG. 2 shows the input/output terminal panel arranged on the rear surface of the main body base 14. Referring to FIG. 2, reference numeral 40 denotes a DC input terminal which is connected to the above-mentioned AC adapter 30; 41, an S terminal serving as the above-mentioned image output terminal; and 42, a video terminal serving as the above-mentioned image output terminal. Reference numeral 43 denotes audio output terminals described above, which consist of two, (R) and (L) stereophonic terminals. Reference numeral 44 denotes a selection switch for selecting a desired shutter speed.

Figure 3:
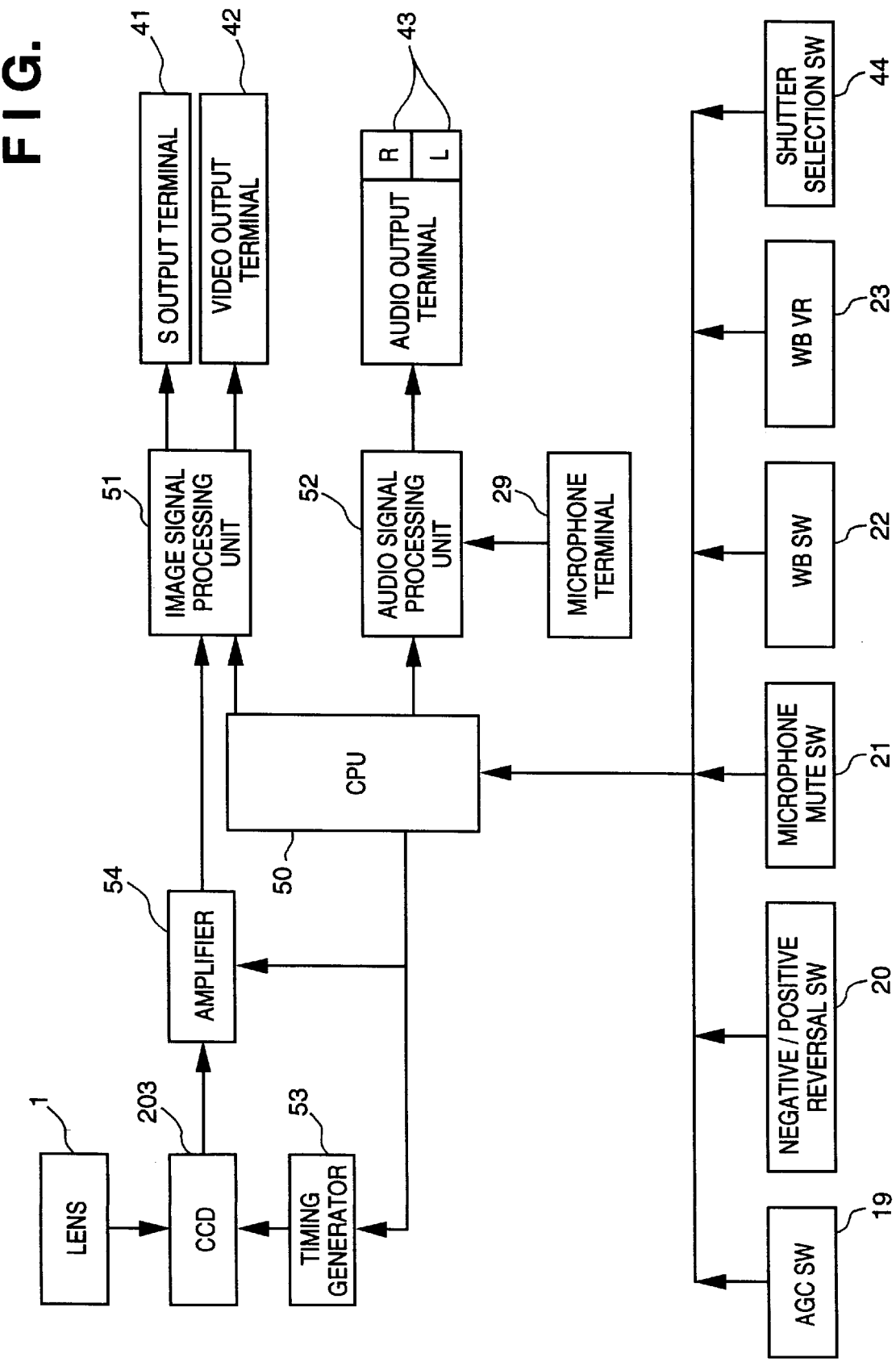
FIG. 3 is a block diagram for explaining signal exchange in the embodiment of the present invention.

FIG. 3 is a block diagram for explaining an example of signal processing in the embodiment of the present invention. Referring to FIG. 3, reference numeral 50 denotes a CPU; 51, an image signal processing unit; 52, an audio signal processing unit; 53, a timing generator; and 54, an amplifier.

Figure 4:
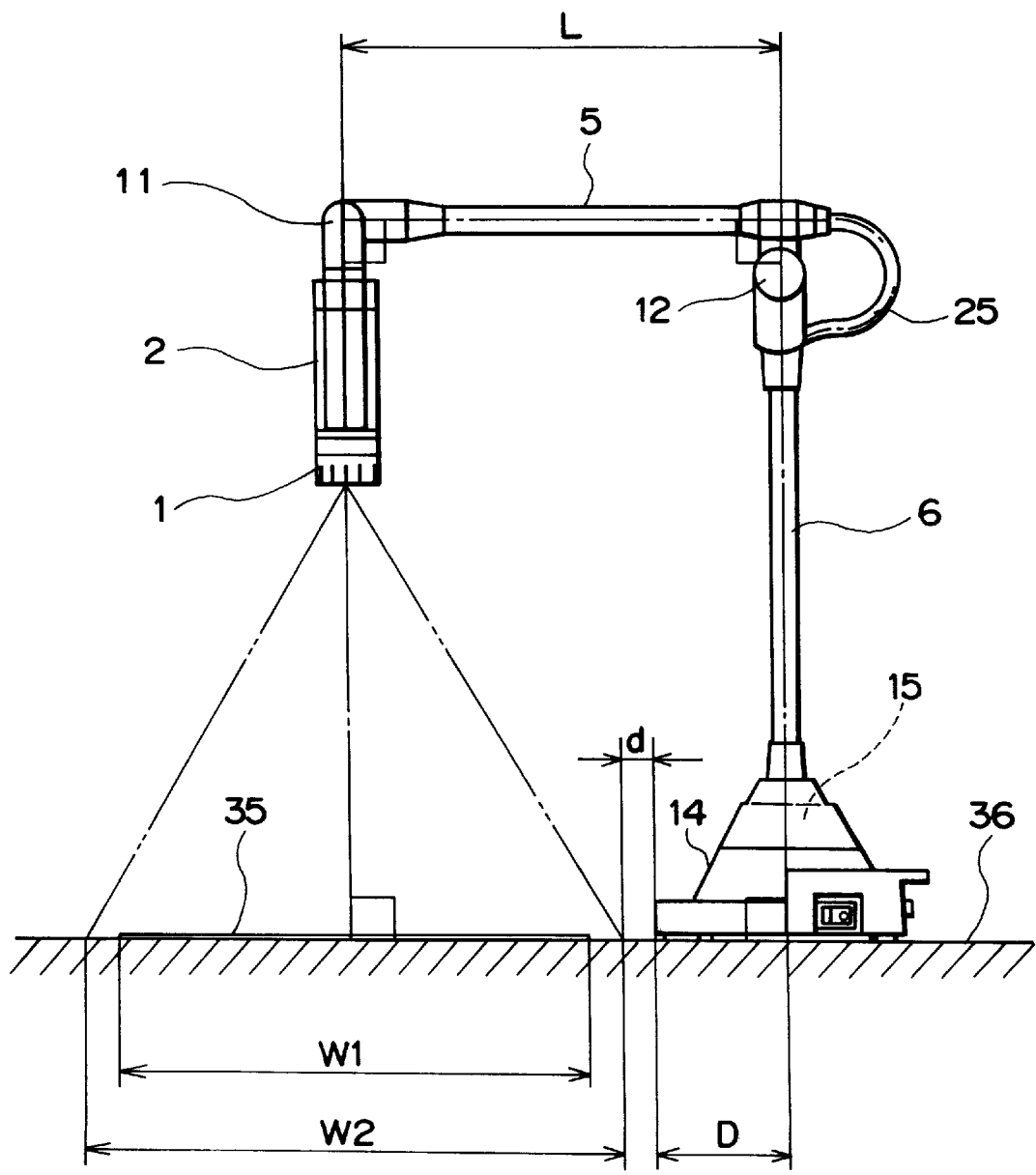
FIG. 4 is a schematic side view for explaining a document photographing mode in the embodiment of the present invention.

FIG. 4 is a side view of the apparatus in the document photographing mode. The apparatus main body and the original 35 are placed on a placing surface 36 of, e.g., a desk. In FIG. 4, the camera head 2 and the arm 5, the arms 5 and 6, and the arm 6 and the placing surface 36 roughly form right angles therebetween. In this form or posture, an image of the entire original 35 can be fully displayed on the screen of the monitor 33, and for example, in this embodiment, the original size at that time is set to be A4 size. Reference symbol L in FIG. 4 denotes the interval between the hinges 11 and 12; D, the radius of the main body base 14 having a substantially circular shape; W1, the width of the original 35; W2, the photographing range of the CCD; and d, the interval between the original 35 and the main body base 14. Since other reference numerals denote the same parts as in the above description, a detailed description thereof will be omitted.

Figure 5:
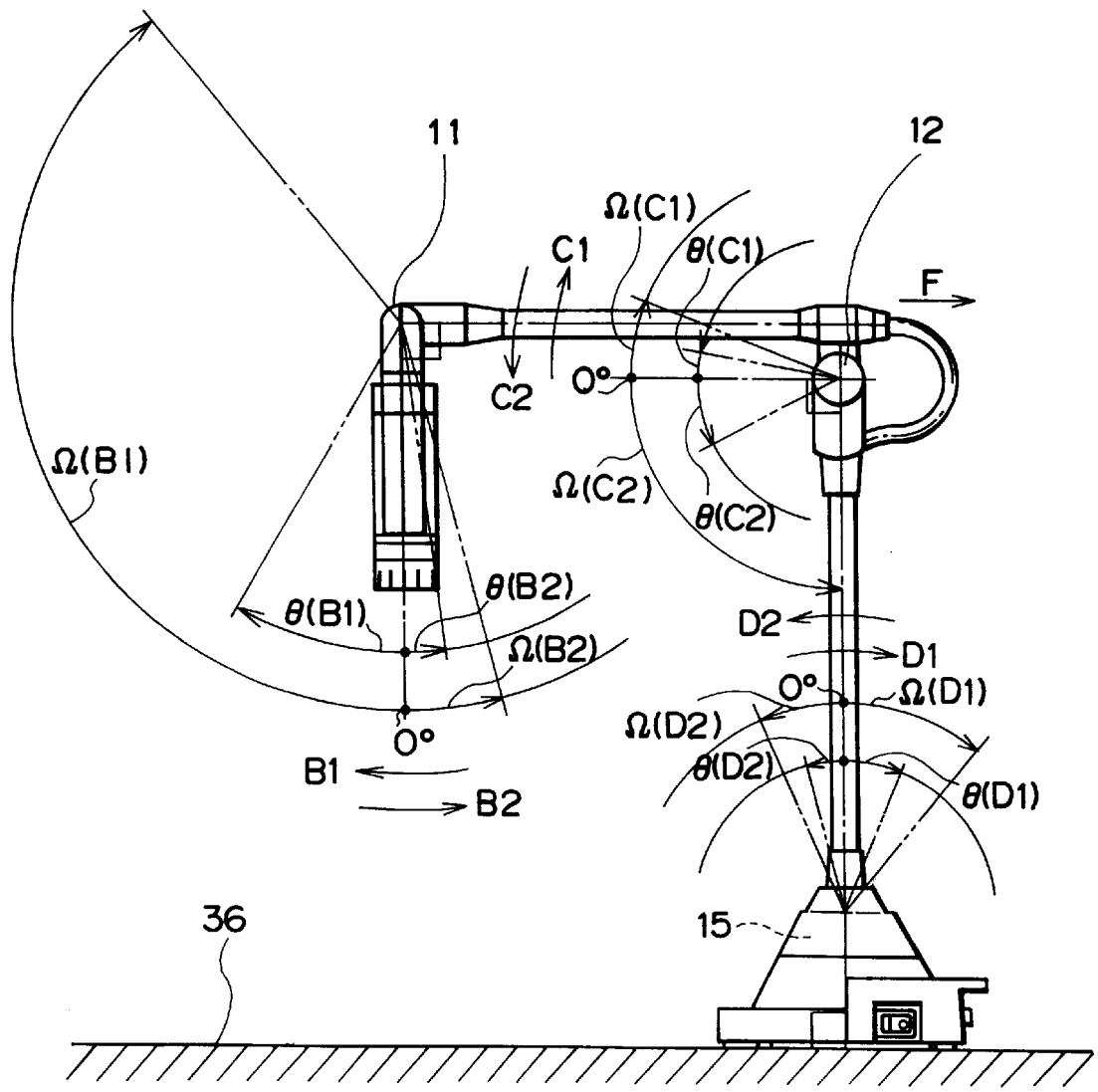
FIG. 5 is a schematic side view for explaining the pivotal motion of a hinge in the embodiment of the present invention.
Figure 6:
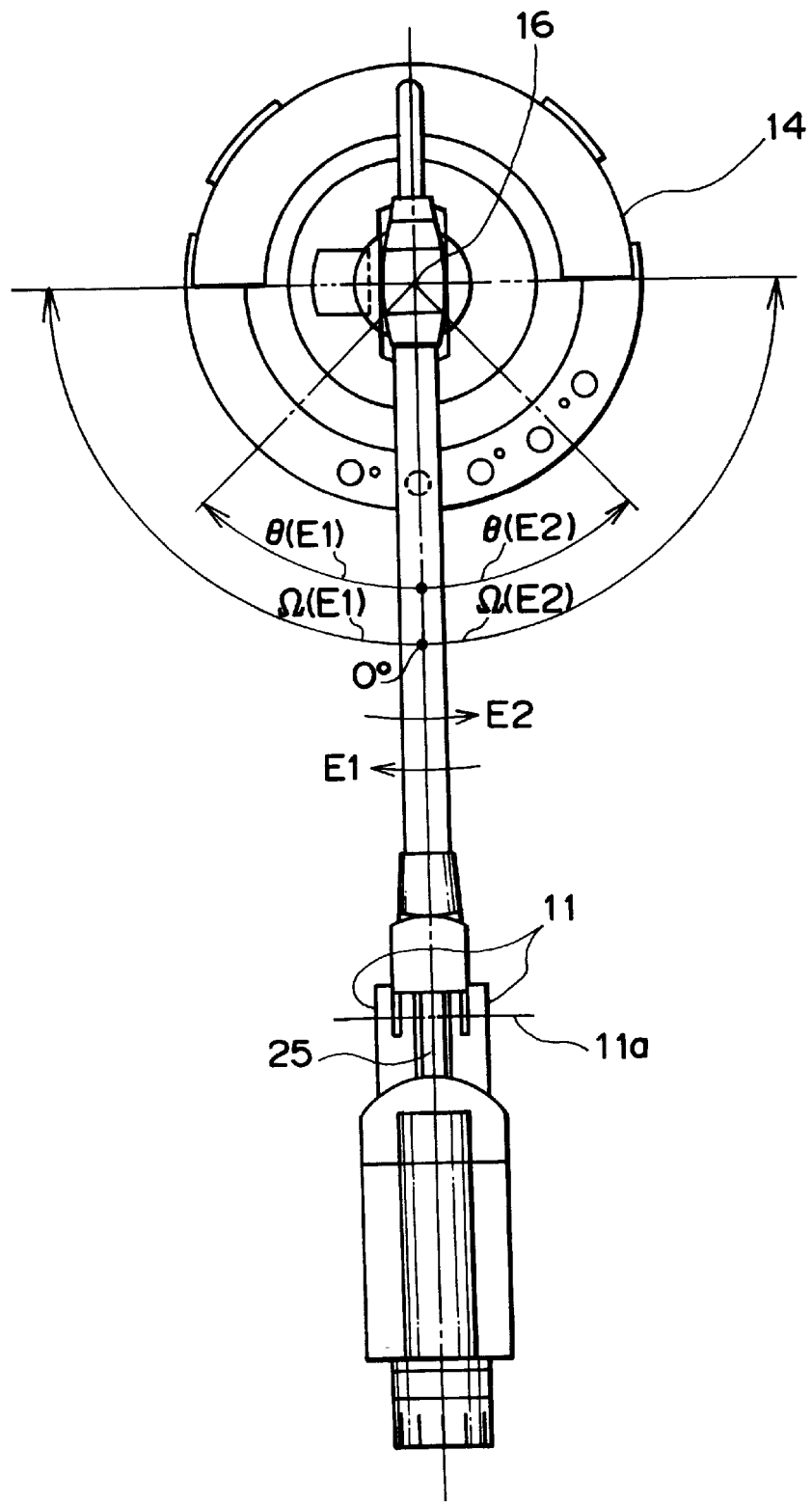
FIG. 6 is a schematic top view for explaining the pivotal motion of the hinge in the embodiment of the present invention.
Figure 7:
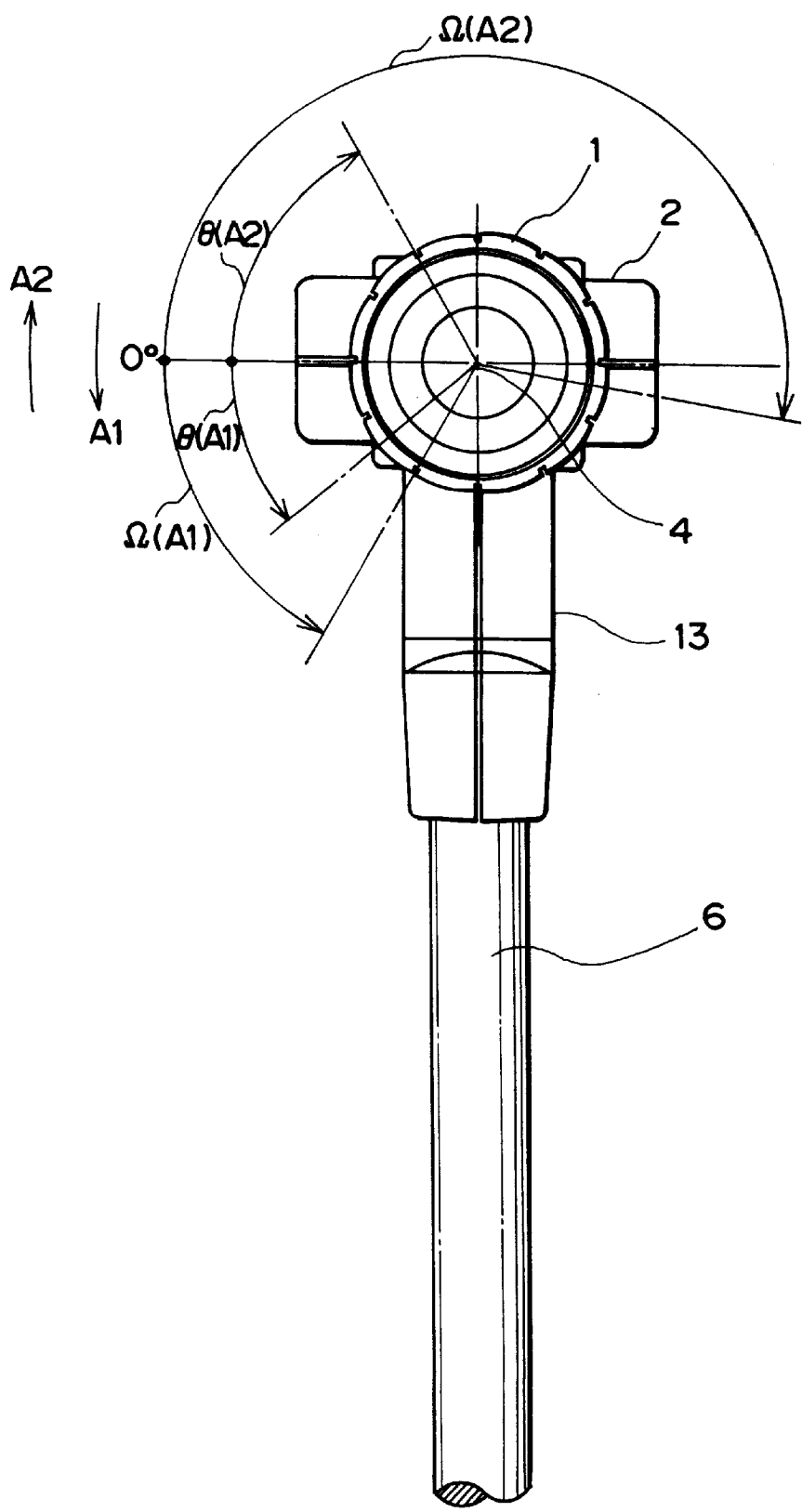
FIG. 7 is a schematic front view for explaining the pivotal motion of the hinge in the embodiment of the present invention.

FIGS. 5, 6, and 7 show preferred examples of the pivot angles of the respective hinges and pivot portions. FIG. 5 is a side view showing the pivot ranges of the hinges 11, 12, and 15, FIG. 6 is a top view showing the pivot range of the second pivot portion 16, and FIG. 7 is a view showing the pivot range of the first pivot portion 4 when viewed from the lens 1 side. Note that FIG. 7 illustrates a state wherein the camera head 2 is set in a horizontal state by pivoting it via the hinge 11 in the document photographing mode shown in FIG. 4.

In FIGS. 5 to 7, an angle θ indicates the pivot angle of each of the hinges and pivot portions with reference to the state shown in FIG. 4. Since other reference numerals denote the same parts as in the above description, a detailed description thereof will be omitted. As will be described later, each hinge has a stopper for regulating its pivot angle, and examples of the maximum pivot angle, Ω, set by the stopper are as follows:

Ω(A1)=60°, Ω(A2)=190°

Ω(B1)=140°, Ω(B2)=15°

Ω(C1)=20°, Ω(C2)=90°

Ω(D1)=40°, Ω(D2)=24°

Ω(E1)=180°, Ω(E2)=180°

Note that each of the hinges and pivot portions generates a holding torque required for holding the pivot angle against its weight. The holding torque to be generated is set to be a value that can prevent the camera head 2 from dropping by its weight independently of the angle of the hinge.

Figure 8:
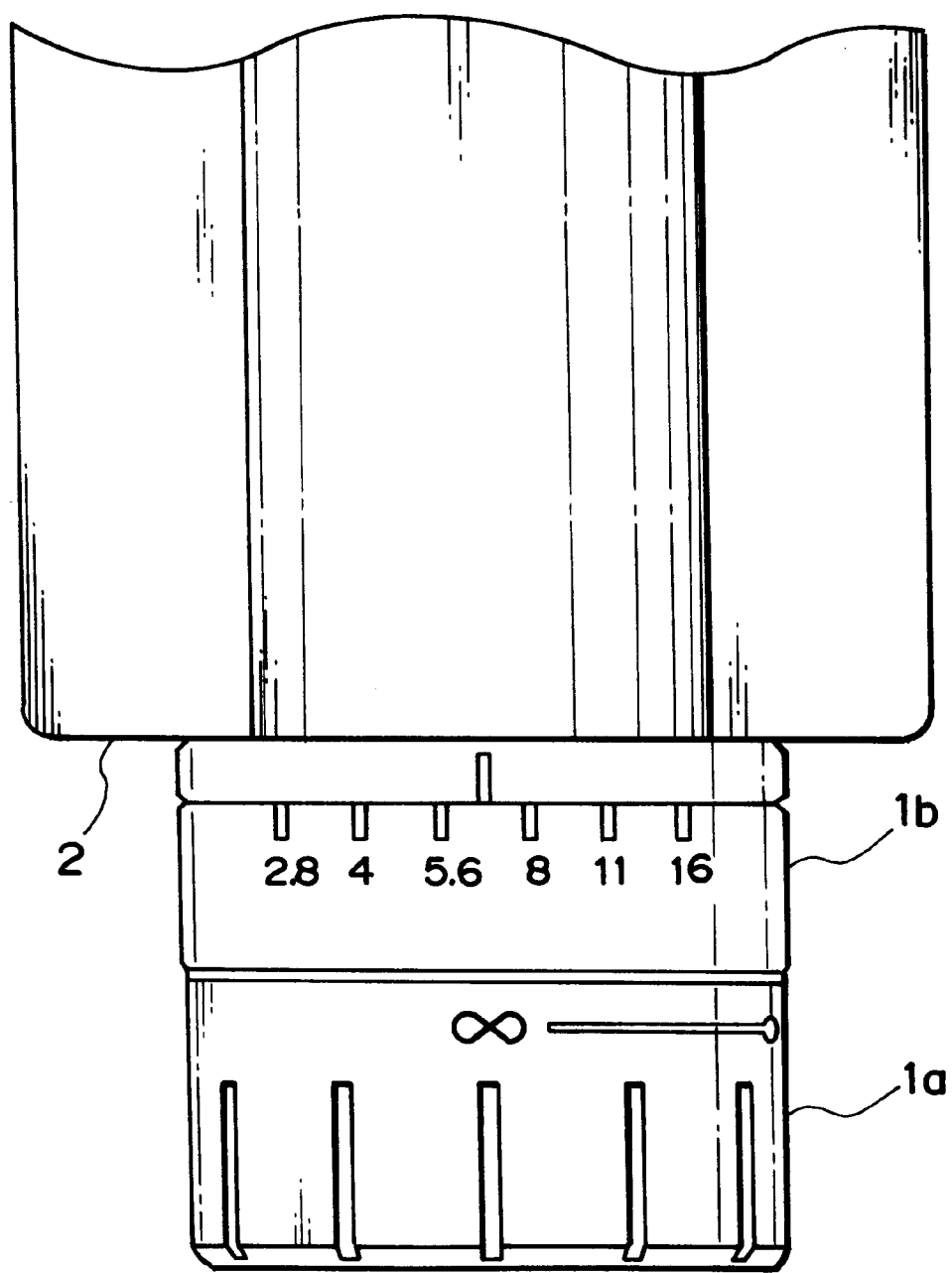
FIG. 8 is a schematic top view for explaining a lens portion in the embodiment of the present invention.

FIG. 8 is a partial enlarged view of the upper surface of the lens 1. The focus adjustment ring 1a preferably consists of hard rubber, and is formed with embossed indices for focus adjustment. Since the ring 1a consists of rubber, even when the lens 1 collides against the placing surface during the operation, the ring 1a can absorb the shock, and can prevent the lens 1 and the CCD and circuit board incorporated in the camera head 2 from being damaged. On the other hand, aperture values are, for example, printed on the aperture adjustment ring 1b.

Furthermore, both the focus adjustment ring 1a and the aperture adjustment ring 1b have another set of such indices at a position opposite to the above-mentioned indices through 180°. That is, when viewed from the back surface side of the plane of the drawing of FIG. 8, the same indices as those shown in FIG. 8 are seen. Therefore, the operator can observe the indices in both the portrait and document photographing modes.

Since the torque required for pivoting each of the focus adjustment ring 1a and the aperture adjustment ring 1b is set to be smaller than the pivot torque of the first pivot portion 4, the camera head 2 can be prevented from being rotated upon pivoting the ring 1a or 1b.

Figure 9:
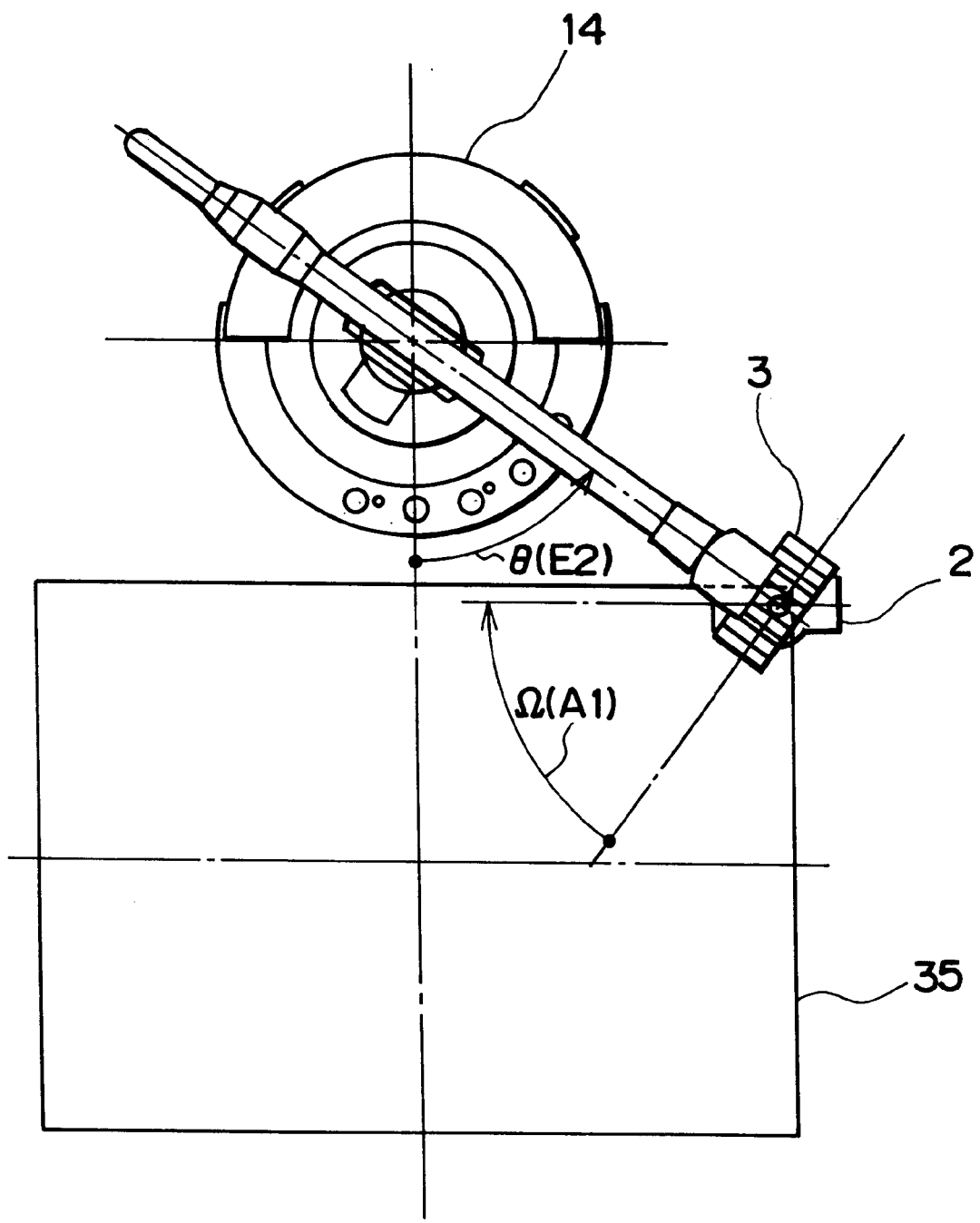
FIG. 9 is a schematic top view for explaining an original peripheral portion photographing operation in the embodiment of the present invention.

FIG. 9 is a top view showing the pivot state of the camera head 2 when a portion of the original 35 is to be photographed in an enlarged scale. Since the same reference numerals in FIG. 9 denote the same parts as in the above description, a detailed description thereof will be omitted.

Figure 10:
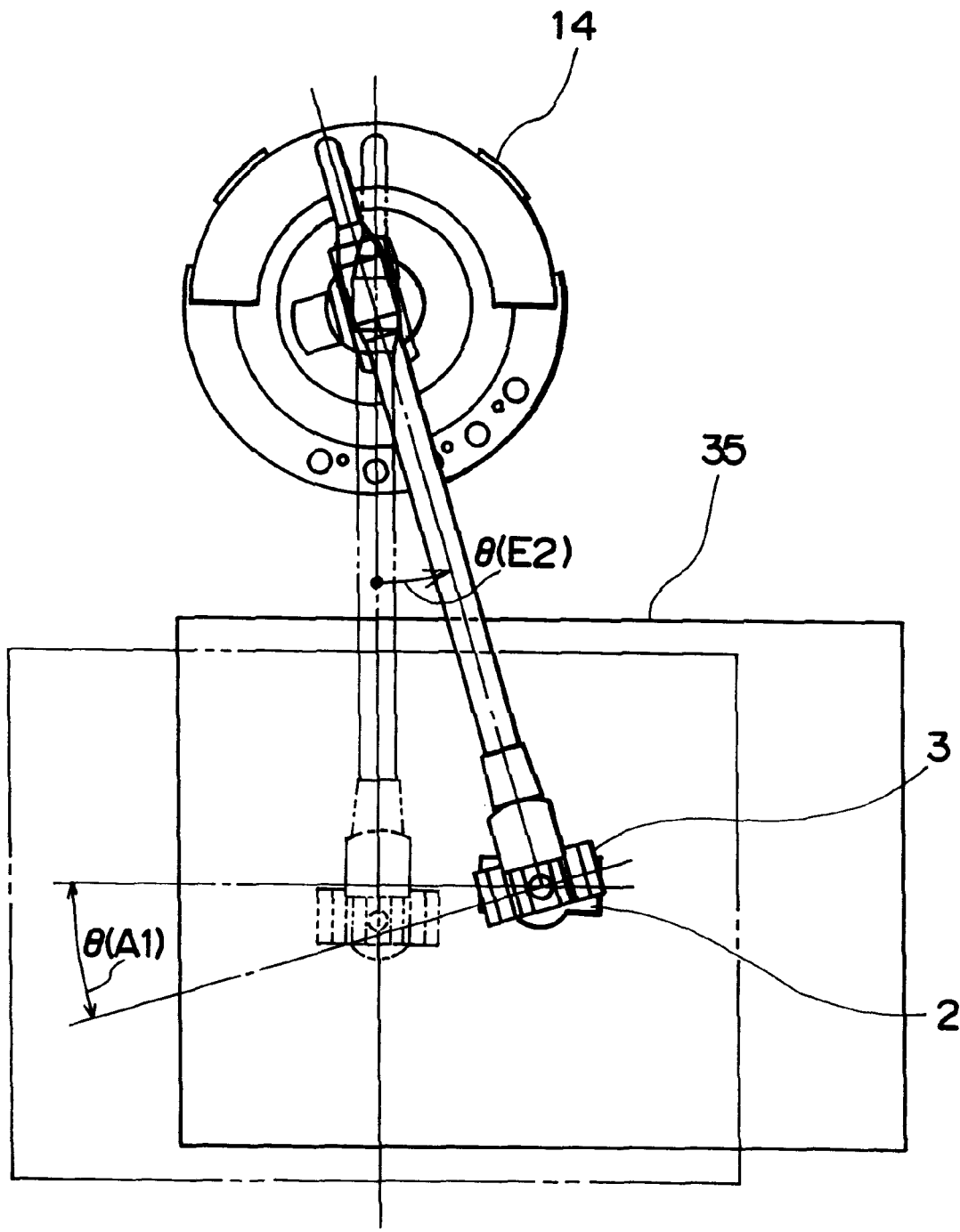
FIG. 10 is a schematic top view for explaining an offset original portion photographing operation in the embodiment of the present invention.

FIG. 10 is a top view showing the pivot state of the camera head 2 when the original 35, which is placed at a position offset from the central axis of the main body base 14, is to be photographed. Since the same reference numerals in FIG. 10 denote the same parts as in the above description, a detailed description thereof will be omitted.

Figure 11:
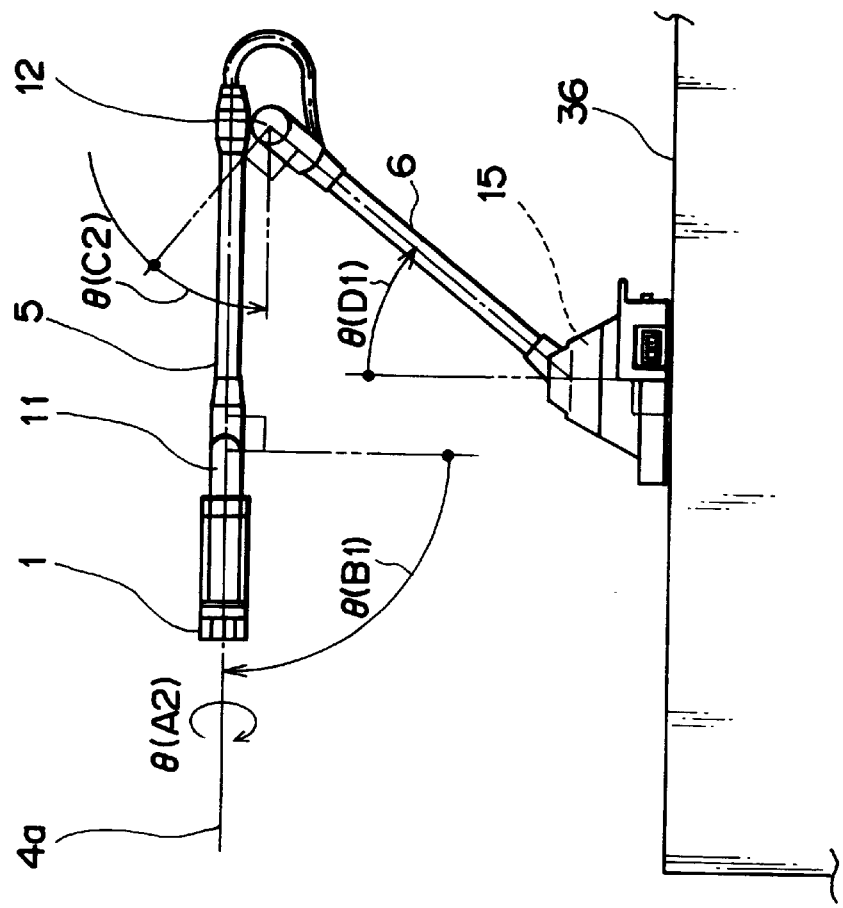
FIG. 11 is a schematic side view for explaining a portrait photographing operation in the embodiment of the present invention.
Figure 11:
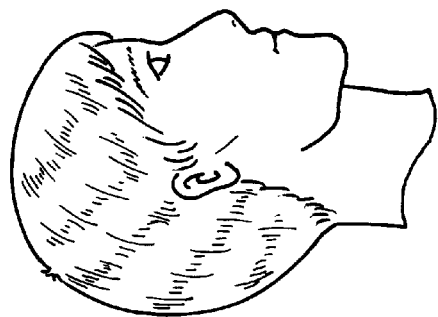

FIG. 11 is a side view showing an example of the form used when an object such as a person is photographed in the horizontal direction.

Figure 12:
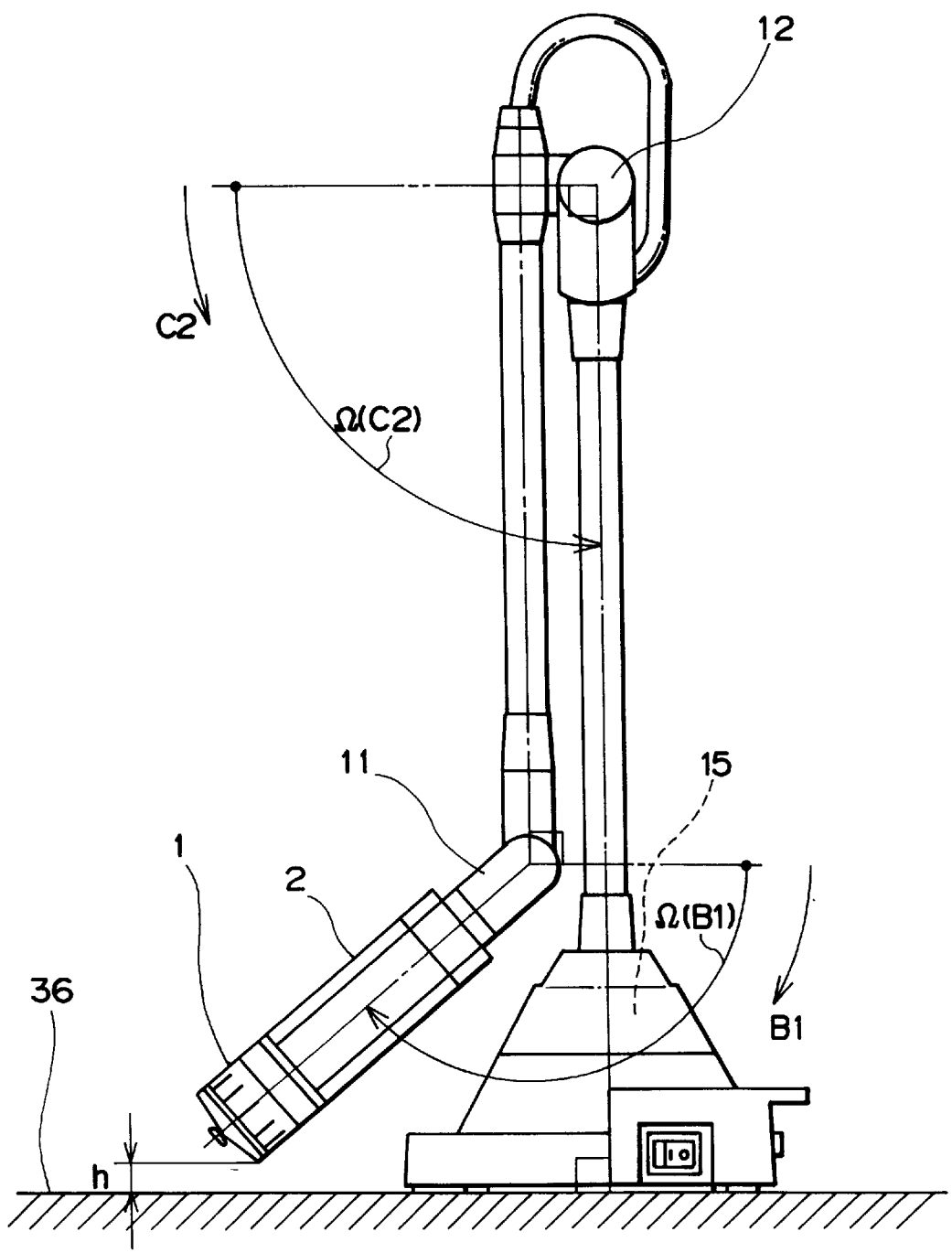
FIG. 12 is a schematic side view for explaining the carrying form in the embodiment of the present invention.

FIG. 12 is a side view showing an example of the form used when the apparatus is to be carried or stored. Reference symbol h in FIG. 12 denotes the distance between the distal end of the lens 1 and the placing surface 36.

Figure 13:
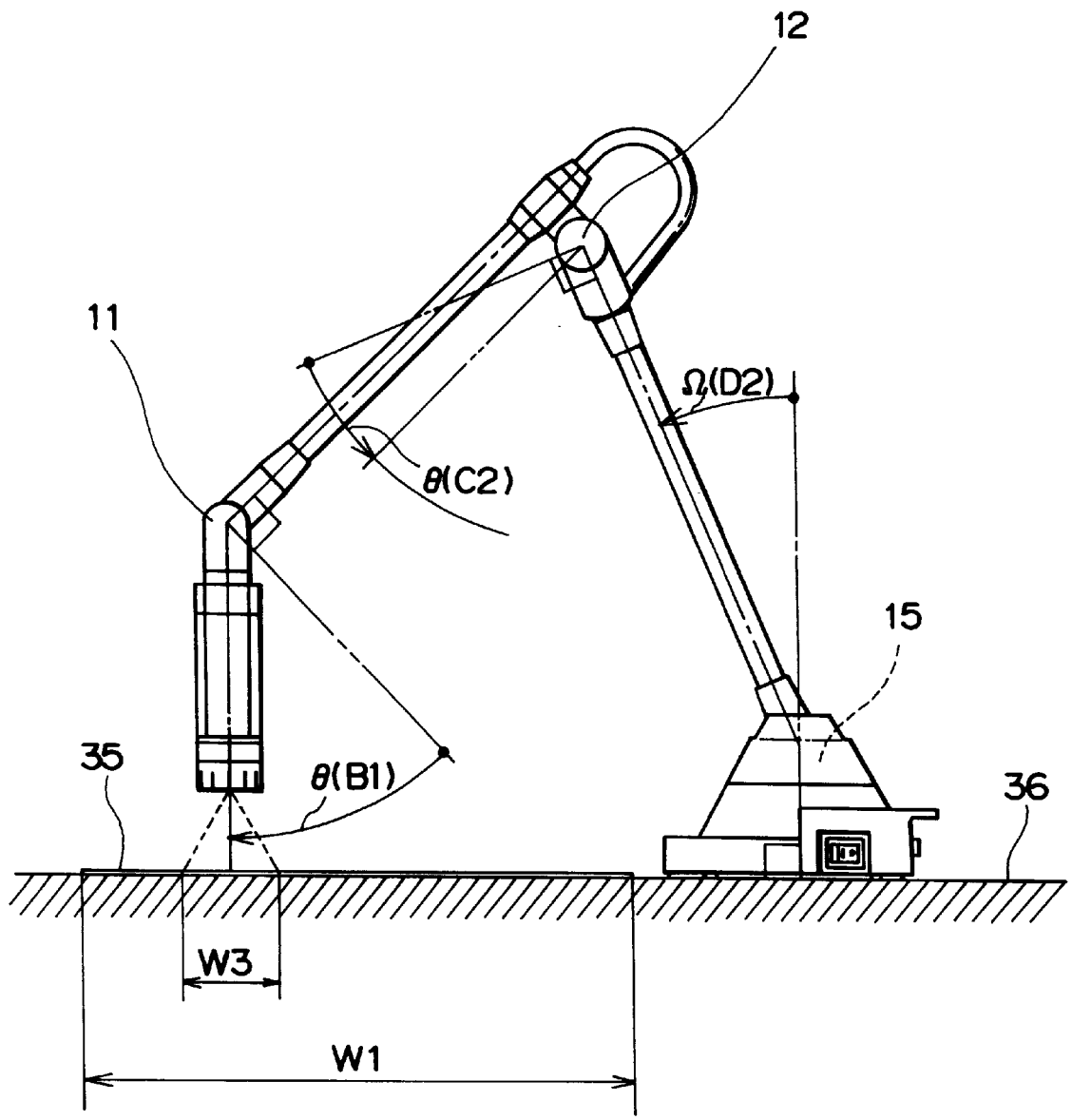
FIG. 13 is a schematic side view for explaining a partial enlarged-scale photographing operation in the embodiment of the present invention.

FIG. 13 is a side view showing an example of the form of the apparatus when a portion of the original 35 is photographed in an enlarged scale. Reference symbol W1 in FIG. 13 denotes the width of the original 35, as described above; and W3, the range to be photographed in the enlarged scale.

Figure 14:
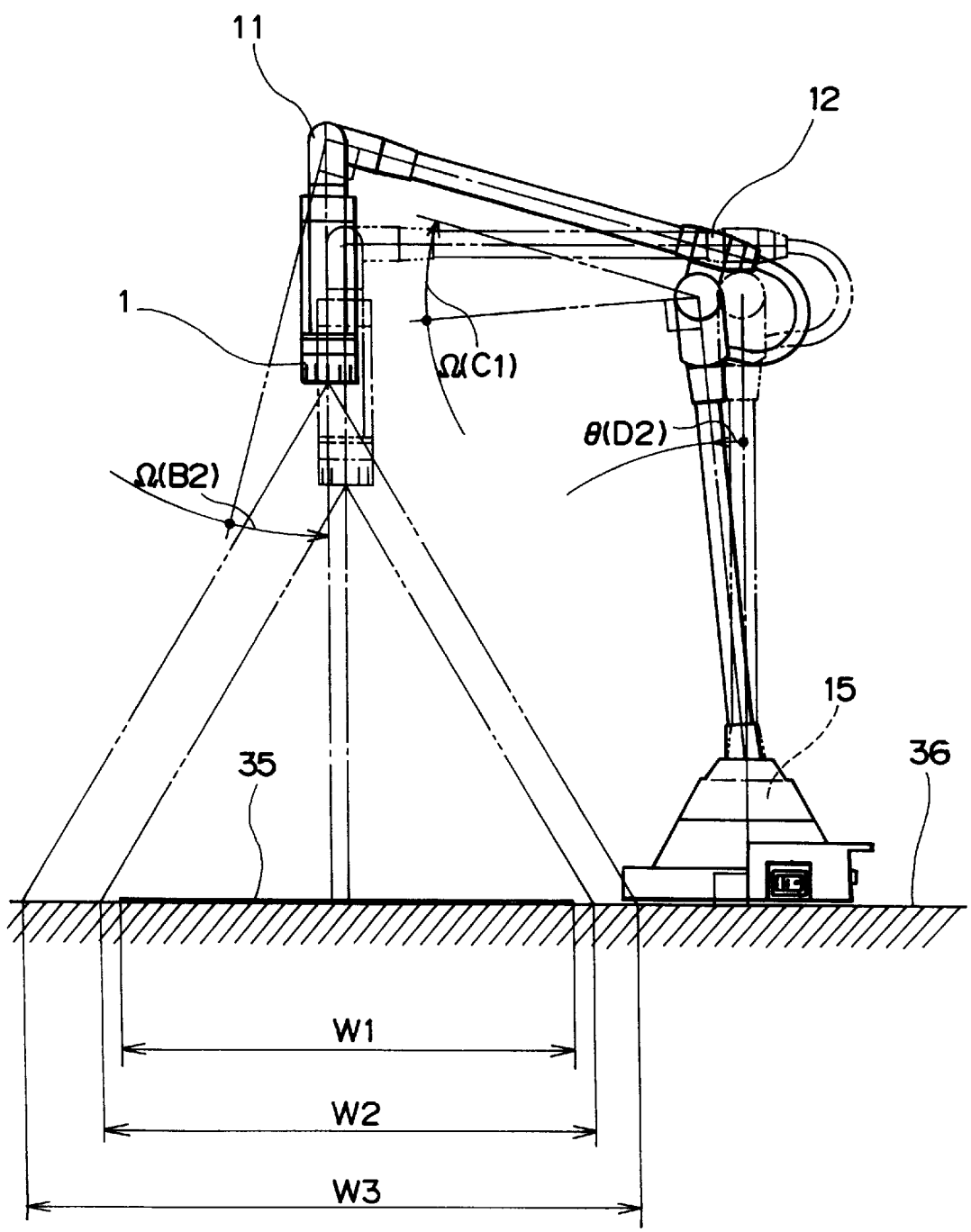
FIG. 14 is a schematic side view for explaining a large-size original photographing operation in the embodiment of the present invention.

FIG. 14 is a side view showing an example of the form of the apparatus when an original larger than the original 35 with a standard size is entirely photographed. The form indicated by an alternate long and two short dashed line in FIG. 14 corresponds to that of the apparatus when the A4-size original 35 is to be photographed as in FIG. 4. Reference symbols W1 and W2 in FIG. 14 respectively denote the width of the original 35 and the photographing range of the CCD, as has been described above with reference to FIG. 4; and W3, the enlarged photographing range.

Figure 15:
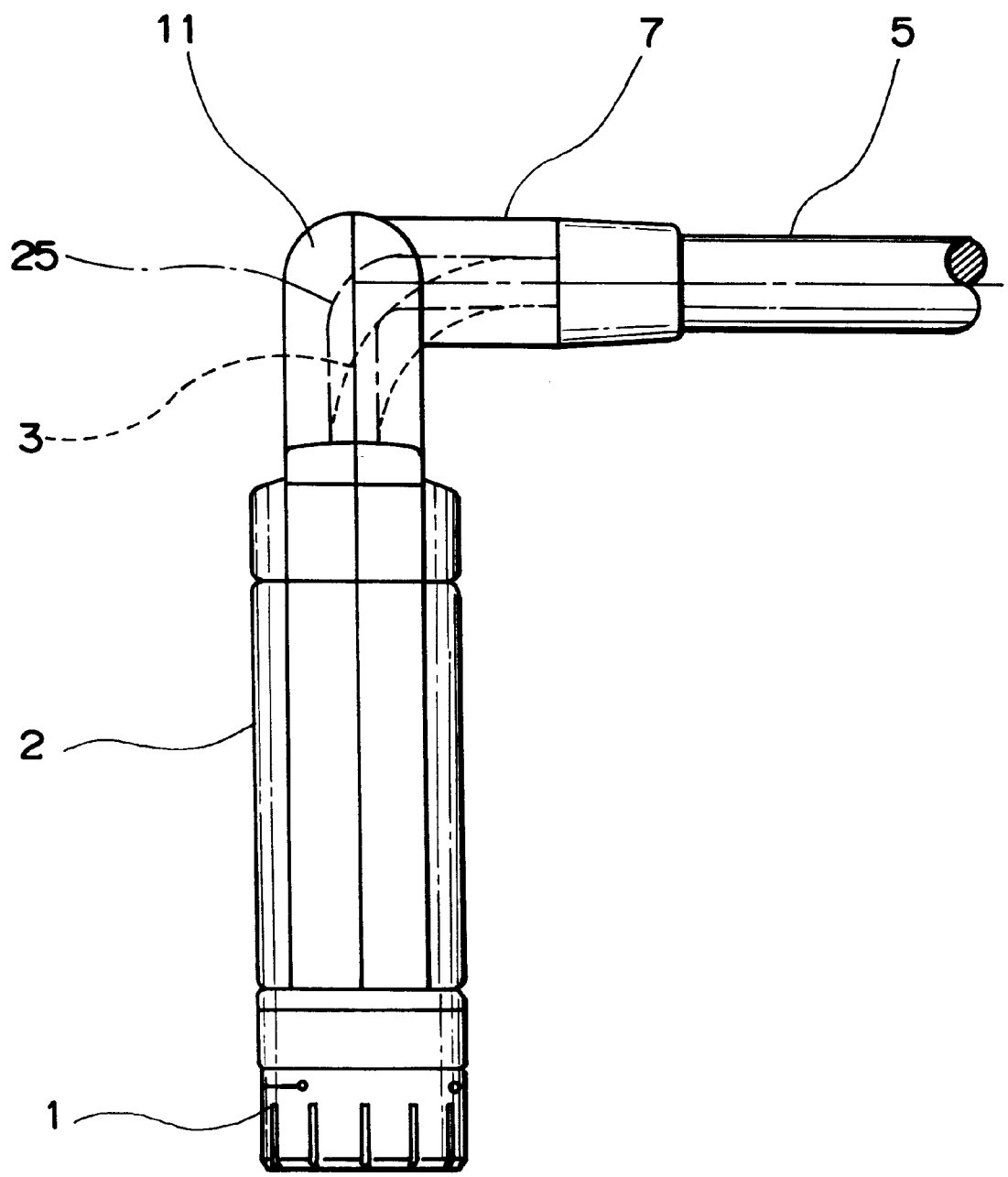
FIG. 15 is a schematic side view for explaining the bent state of a cable in the embodiment of the present invention.

FIG. 15 shows the bent state of the main cable 25 upon pivoting the hinge 11. In FIG. 15, an alternate long and short dashed line indicates the shape of the main cable 25 which is not subjected to a slip treatment, and a broken line indicates the shape of the main cable 25 subjected to a slip treatment.

Figure 16:
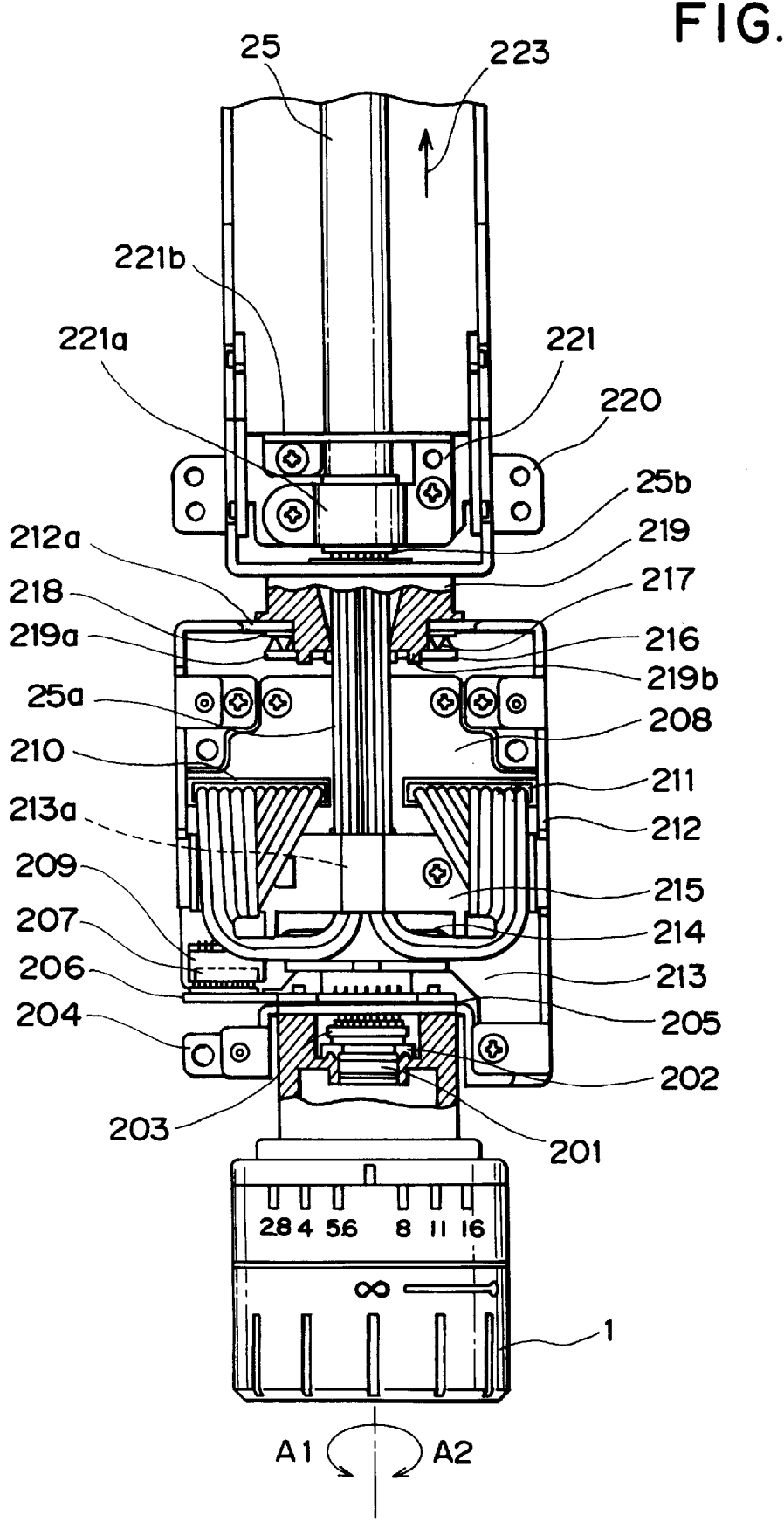
FIG. 16 is a schematic top view for explaining a camera head portion in the embodiment of the present invention.

FIG. 16 is a schematic top view for explaining the camera head 2. In FIG. 16, a camera case and a shield case are not shown. Referring to FIG. 16, reference numeral 201 denotes a substantially rectangular low-pass filter; 202, an elastic member which serves as a shock absorber upon clamping the low-pass filter 201 between a CCD 203 and the lens 1, and has a rectangular shape with a central square hole (the elastic member 202 preferably consists of silicone rubber in this embodiment, but the present invention is not limited to this material); 204, a lens chassis for holding the lens 1, a CCD circuit board 206, and a video circuit board 208; and 205, an insulating sheet for preventing the CCD circuit board 206 from contacting the lens chassis 204 to cause short-circuiting (the insulating sheet 205 preferably consists of vinyl chloride, but the present invention is not limited to this material as long as the sheet 205 can serve as an insulating member). The CCD 203 is fixed to the CCD circuit board 206 by soldering. A connector 209, which engages with a connector 207 on the CCD circuit board 206, and connectors 210 and 211, which engage with connectors of the main cable 25, are mounted on the video circuit board 208.

Reference numeral 212 denotes a head chassis, which has a round hole 212a that receives a head shaft 219 and a vertical plate 213, and is fixed to the lens chassis 204 at three bend portions by screws; and 214, a sheet which prevents signal lines 25a of the main cable 25 from touching the edge and the like of the lens chassis (the sheet 214 preferably consists of vinyl chloride in this embodiment, but the present invention is not limited to this), and is fixed to the vertical plate 213 by a double-sided tape adhered to its rear surface. Reference numeral 215 denotes a mold clamp for fixing the respective signal lines 25a at roughly the position of a groove portion 213a of the vertical plate 213; and 216, a head pan plate, which comprises a stopper 216a (to be described later; not shown in FIG. 16), is aligned by bosses 219a and 219b of the head shaft 219, and regulates the amounts of rotation of the head chassis 212 in the directions of the arrows A1 and A2 about the head shaft 219. The head pan plate 216 also serves as a regulating means for the deflection amount of a wave washer 217.

The wave washer 217 generates a torque upon rotation of the head chassis 212 in the directions of the arrows A1 and A2. Reference numeral 218 denotes a washer for improving slide feeling upon rotation of the chassis 212 (the material of the washer 218 and the slide feeling will be explained later). The head shaft 219 serves as a center upon rotation of the head chassis 212 in the directions of the arrows A1 and A2.

Furthermore, reference numeral 220 denotes a tilt chassis; and 221, a metal clamp which has roughly a sawtooth-shaped portion at its one end so as to fix the main cable 25.

Figure 17:
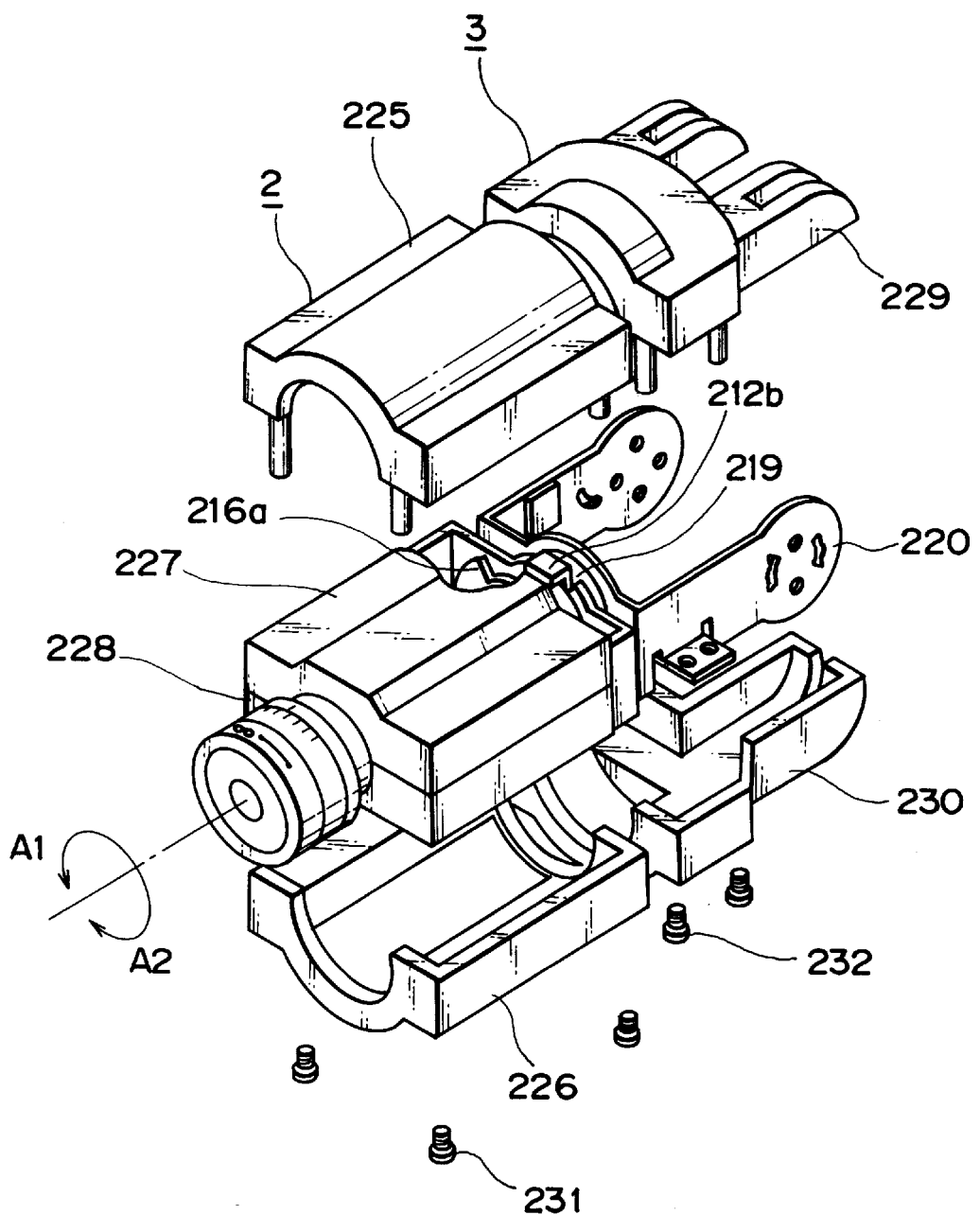
FIG. 17 is a schematic perspective view for explaining the camera head portion in the embodiment of the present invention.

FIG. 17 is a schematic perspective view for explaining the camera head 2. Referring to FIG. 17, reference numerals 225 and 226 denote camera cases fixed by screws 231; 227 and 228, shield cases; and 229 and 230, head base cases fixed by screws 232.

Figure 18:
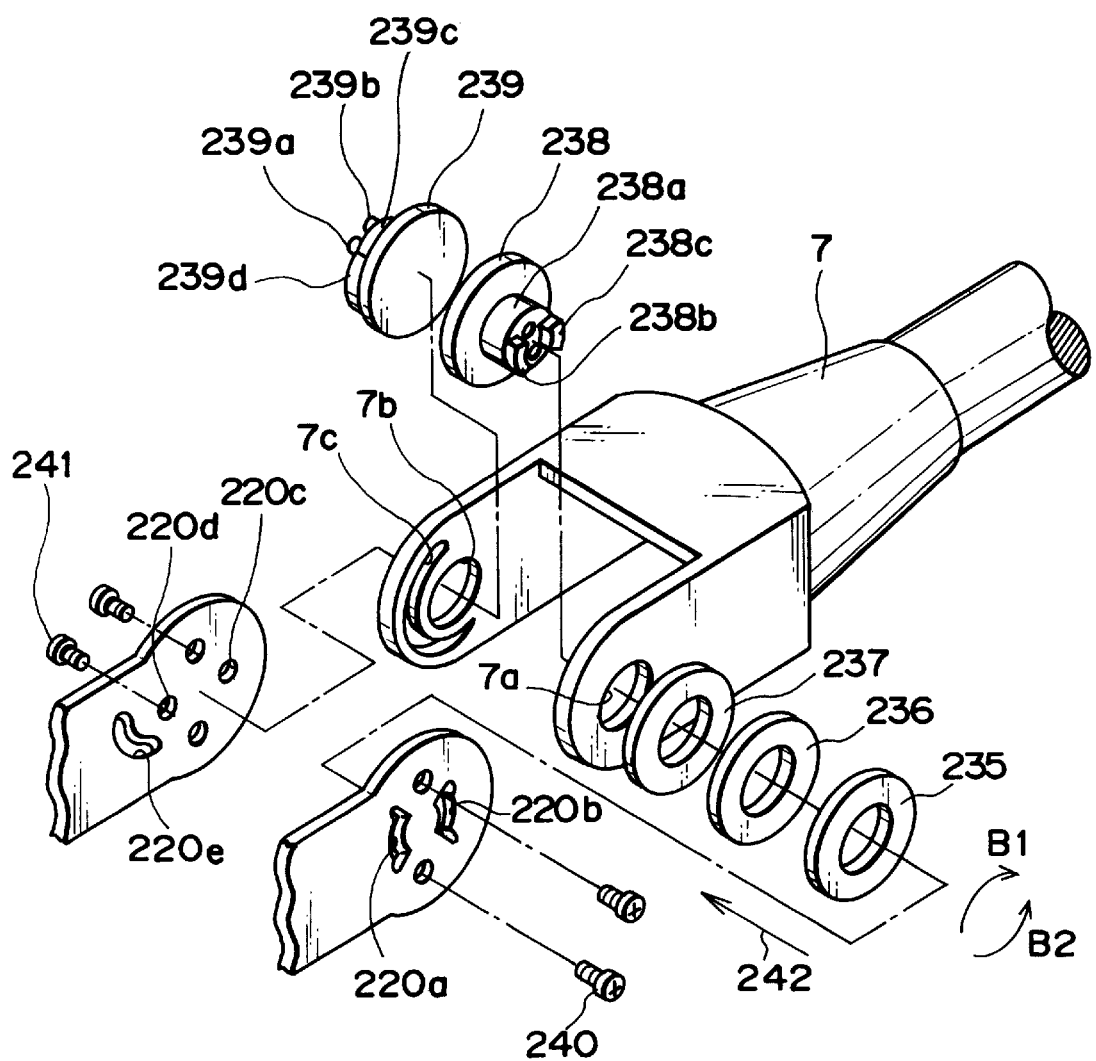
FIG. 18 is a schematic perspective view for explaining rotation of a head base in the embodiment of the present invention.

FIG. 18 is a schematic perspective view for explaining rotation of the head base 3 in the directions of the arrows B1 and B2. FIG. 18 does not illustrate the head base cases 229 and 230 constituting the head base 3, and the main cable 25. Referring to FIG. 18, reference numeral 235 denotes a belleville spring for generating a rotation torque; 236, a metal washer; 237, a slide washer; 238, a tilt shaft serving as the rotation shaft of the head base 3; and 239, a tilt shaft which serves as the rotation shaft of the head base 3, and regulates the rotation angle of the head base 3 by means of a groove 7c and a projection 239d.

Figure 19:
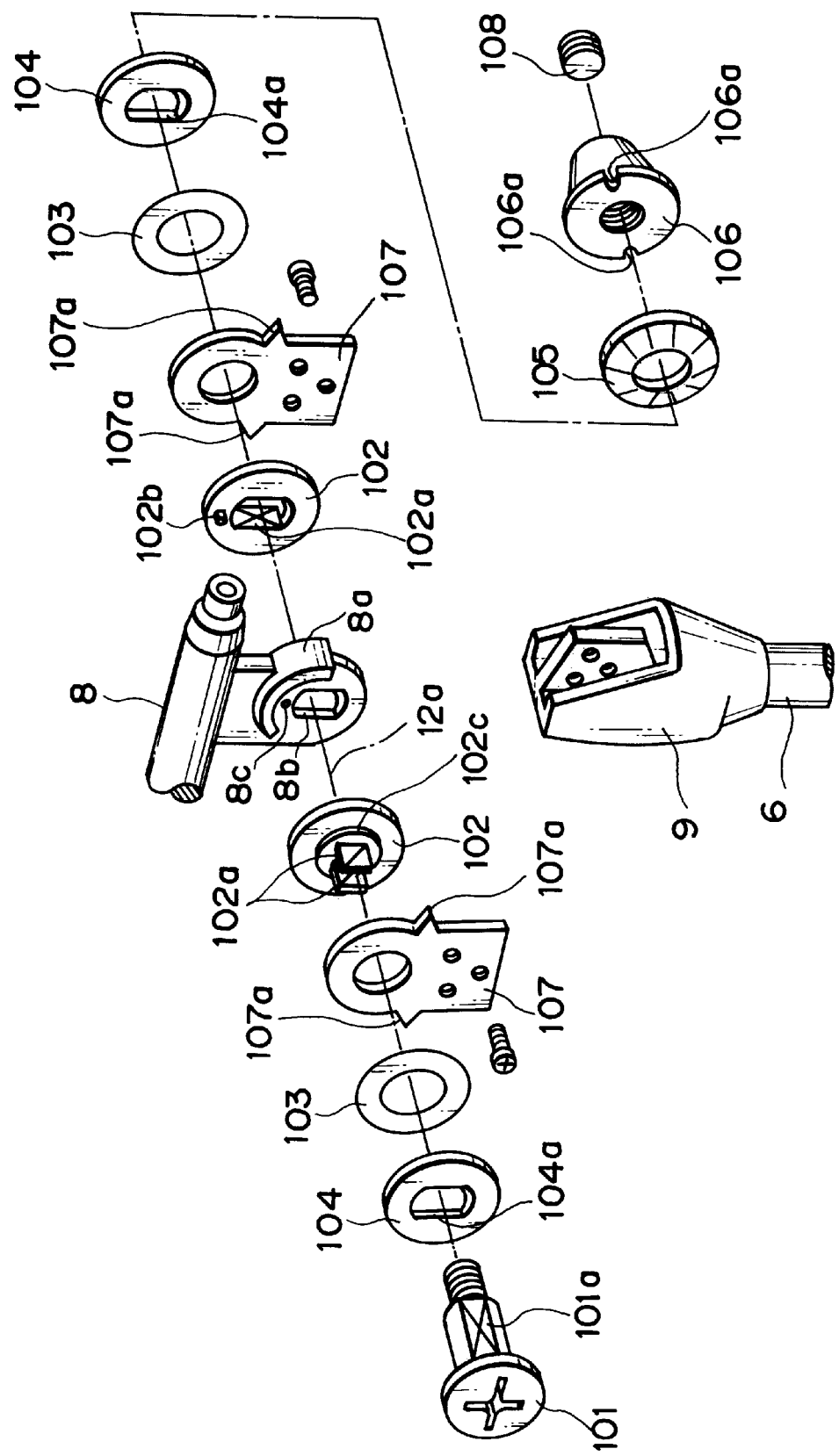
FIG. 19 is a schematic exploded perspective view of a second hinge portion in the embodiment of the present invention.

FIG. 19 is a schematic exploded perspective view of the hinge 12 serving as the second hinge portion. FIG. 19 does not illustrate the outer case 13 and the main cable 25. The detailed arrangement of the hinge 12 will be explained later, and the hinge 12 constitutes a pivot support mechanism of the present invention.

The pivot support mechanism according to the present invention has a first support member having two opposing projections, a second support member arranged between the two projections, a pair of clamping members arranged to clamp the two projections in cooperation with the second support member, and a torque generation means for generating a predetermined torque among the second support member, the clamping members, and the projections. In this embodiment, the hinge 12 serves as the pivot support mechanism of the present invention.

Referring to FIG. 19, the joint 9 is press-fitted onto one end of the arm 6 that serves as the first support member in the pivot support mechanism of the present invention, and serves as a stationary-side base of the hinge 12. A pair of support plates (to be described later) are attached to the arm 6 via the joint 9, and serve as the two opposing projections of the present invention. The joint 8 is pivotal about the central axis 12a, and has a rib portion 8a which regulates pivotal motion and is formed into an arcuated shape, a hole 8b which has flat portions on the two sides of its central portion and receives a pivot shaft (to be described later), and a positioning hole 8c which is formed in the vicinity of the hole 8b and positions a slide washer (to be described later). The joint 8 serves as the second support member of the present invention.

Reference numeral 101 denotes a metal pivot shaft which is fitted into the hole 8b of the joint 8 and is rotated. The pivot shaft 101 is constituted by a collar portion, a shaft portion, and a screw portion, and flat portions 101a are formed on the two sides of the shaft portion. Reference numeral 102 denotes slide washers, each of which consists of a resin material (preferably, a POM resin) that has a high wear resistance and can be easily formed into an arbitrary shape. Each slide washer 102 is formed with tongue-shaped extended portions 102a at its distal end portion, and also has a projection 102b which is fitted into the positioning hole 8c of the joint 8 to attain positioning, and a rotation shaft portion 102c serving as a rotation slide portion.

Reference numeral 103 denotes slide sheets consisting of, e.g., an ultra-high-molecular-weight polyethylene sheet with a high wear resistance; and 104, pivot washers each constituted by a metal plate. Flat portions 104a are formed on the two sides of the inner circumferential portion of each pivot washer 104, and the pivot washers 104 and the flat portions 101a of the pivot shaft 101 hold the extended portions 102a of the pivot washers 102 to sandwich them therebetween. In this embodiment, each metal pivot washer 104 consists of a stainless steel material having a thickness of 1.6 mm.

Reference numeral 105 denotes a belleville spring for generating a rotation torque upon axial displacement; and 106, a metal nut which threadably engages with the screw portion of the metal pivot shaft 101 and compresses the belleville spring 105 when it is fastened by a predetermined torque. The nut 106 is formed with rotation groove portions 106a at two positions of its outer circumferential portion. Reference numeral 107 denotes support plates which pivotally and axially support the joint 8 and the pivot shaft 101, and are fixed to the joint 9 by attachment screws.

Note that the belleville spring 105 serves as the torque generation means in the pivot support mechanism of the present invention together with the slide washers 102, the slide sheets 103, the pivot shaft 101, and the nut 106. More specifically, the torque generation means is constituted by the slide washers 102 which are arranged between the support plates 107 and the end portions of the joint 8 and serves as the first slide member, the slide sheets 103 which are arranged between the support plates 107 and the pivot washers 104 and serve as the second slide members, the pivot shaft 101 which serves as a clamping force generation means for generating a clamping force between the joint 8 and the pivot washers 104, the belleville spring 105, and the nut 106. The support plates 107 serve as the two opposing projections in the pivot support mechanism of the present invention, as described above.

Each support plate 107 has projections 107a, which are in contact with the arcuated rib portion 8a formed on a portion of the joint 8, thereby regulating the pivotal motion of the joint 8. In this embodiment, each support plate 107 consists of the same material as that of the pivot washer 104, i.e., a stainless steel material having a thickness of 1.6 mm. Furthermore, reference numeral 108 denotes a set screw for preventing the metal nut 106 from being loosened.

FIGS. 20 to 23 are views showing the assembling order of the hinge 23. Since reference numerals in FIGS. 20 to 23 denote the same parts as in the above description, a detailed description thereof will be omitted.

Figure 24:
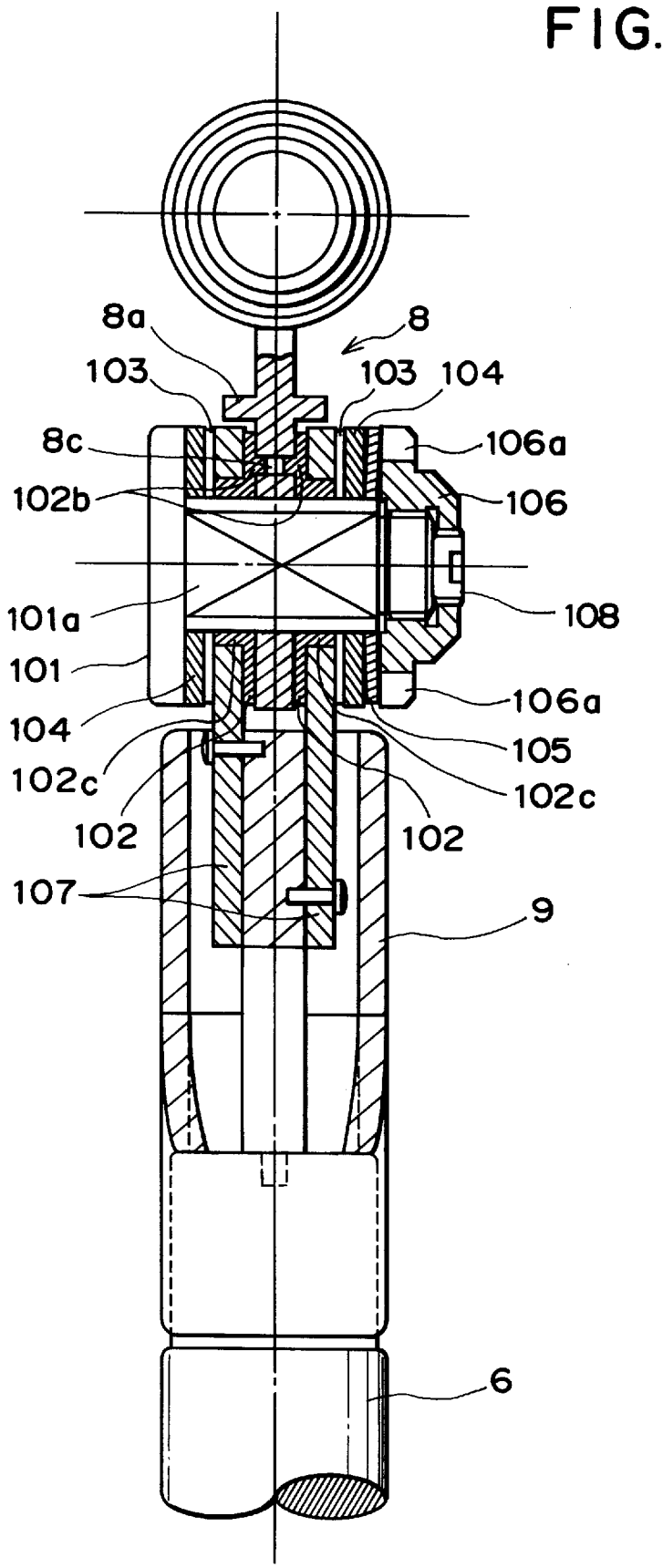
FIG. 24 is a sectional view showing principal part of the second hinge portion in the embodiment of the present invention.

FIG. 24 is a sectional view showing principal part of the hinge 12. Note that FIG. 24 does not illustrate the outer case 13 and the main cable 25. Referring to FIG. 24, as has already been described above, reference numeral 101 denotes a metal pivot shaft which is fitted into a D-cut hole (not shown) of the joint 8 and is rotated; 102, slide washers each of which consists of a resin material that has a high wear resistance and can be easily formed into an arbitrary shape; 103, slide sheets each of which is constituted by a metal plate; 105, a belleville spring; 106, a metal nut which threadably engages with the screw portion of the pivot shaft and compresses the belleville spring 105; and 107, support plates which pivotally and axially support the joint 8 and the pivot shaft and are fixed to the joint 9.

Figure 25:
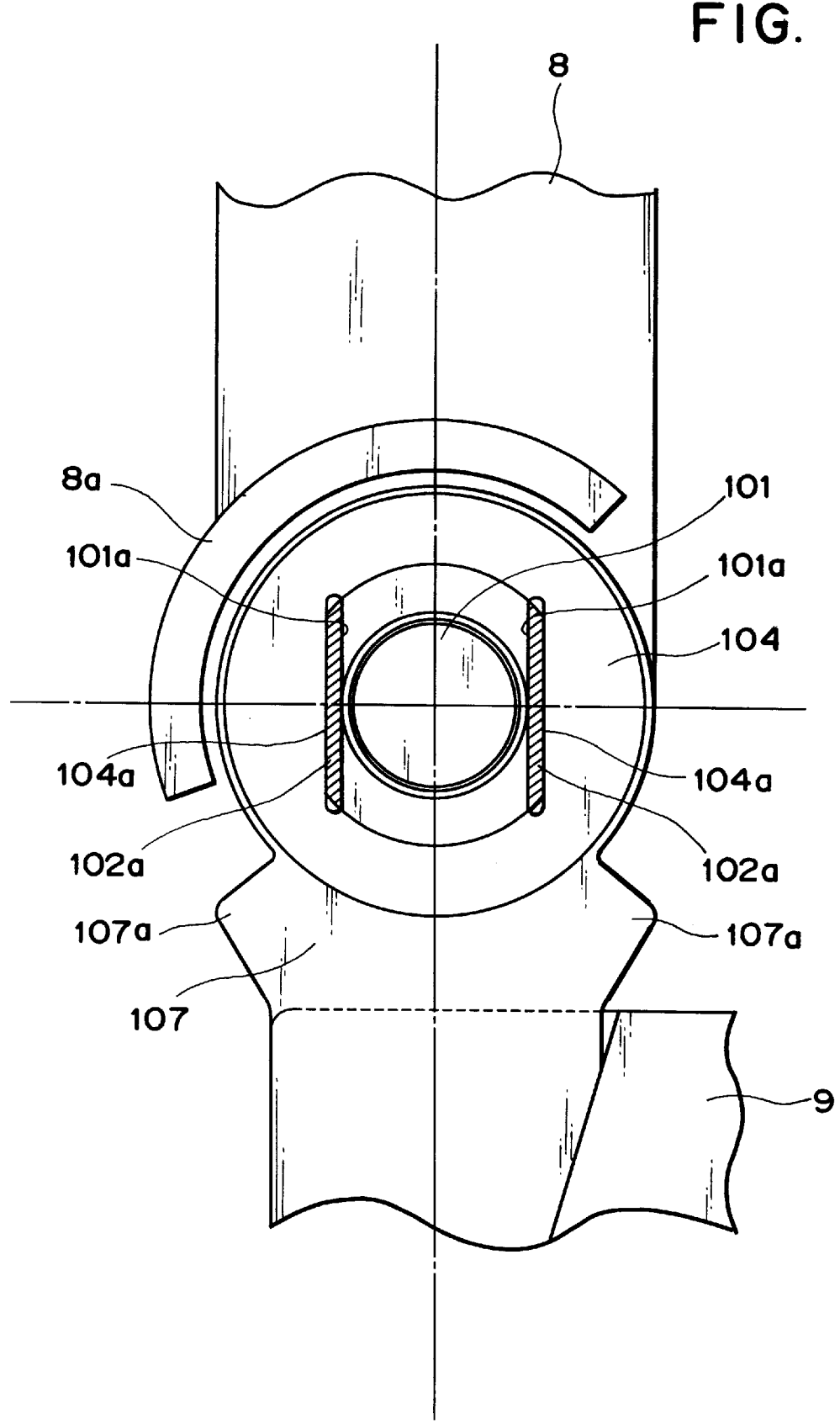
FIG. 25 is a schematic side view of the second hinge portion in the embodiment of the present invention.

FIG. 25 is a schematic side view of the hinge 12. FIG. 25 illustrates a state wherein the pivot washer 104 consisting of the metal plate and the flat portions 101a of the metal pivot shaft 101 hold the extended portions 102a of the pivot washer 102 to sandwich them therebetween, as described above.

Figure 26:
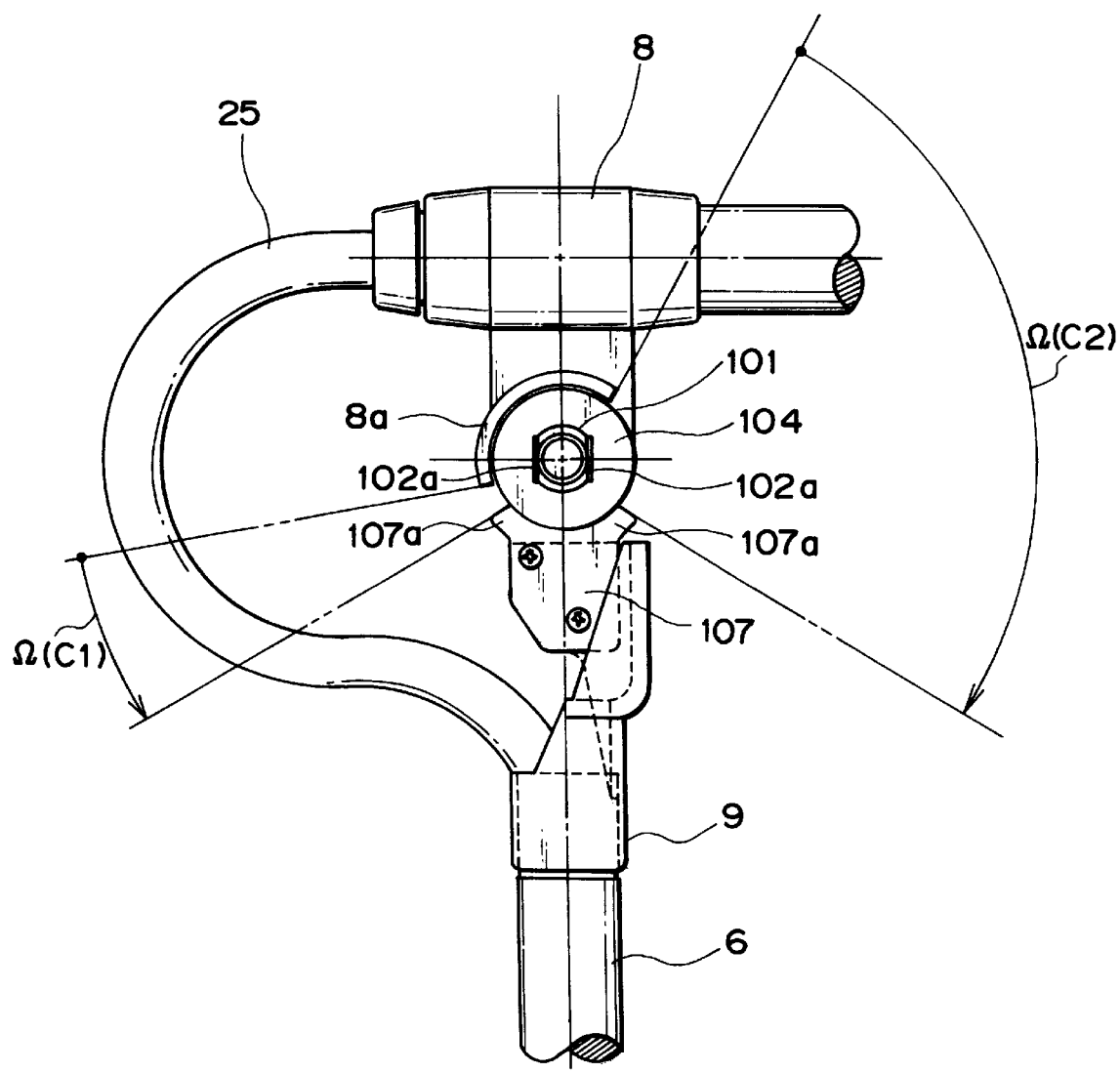
FIG. 26 is a side view showing principal part of the second hinge portion in the embodiment of the present invention.

FIG. 26 is a side view showing principal part of the hinge 12. FIG. 26 does not illustrate the nut 106 and the belleville spring 105. As has been described above, in FIG. 26, the two surfaces of the pivot shaft 101 are D-cut. Also, the two side portions of the hole of each pivot washer 104 are D-cut, and the tongue-shaped extended portions 102a of the slide washer 102 are sandwiched between the pivot shaft 101 and the corresponding pivot washer 104. Each support plate 107 partially protrudes to form the projections 107a, and the arcuated rib portion 8a is formed on a portion of the joint 8.

Note that a detailed description associated with that given above using FIGS. 20 to 26 will be made later.

Figure 27:
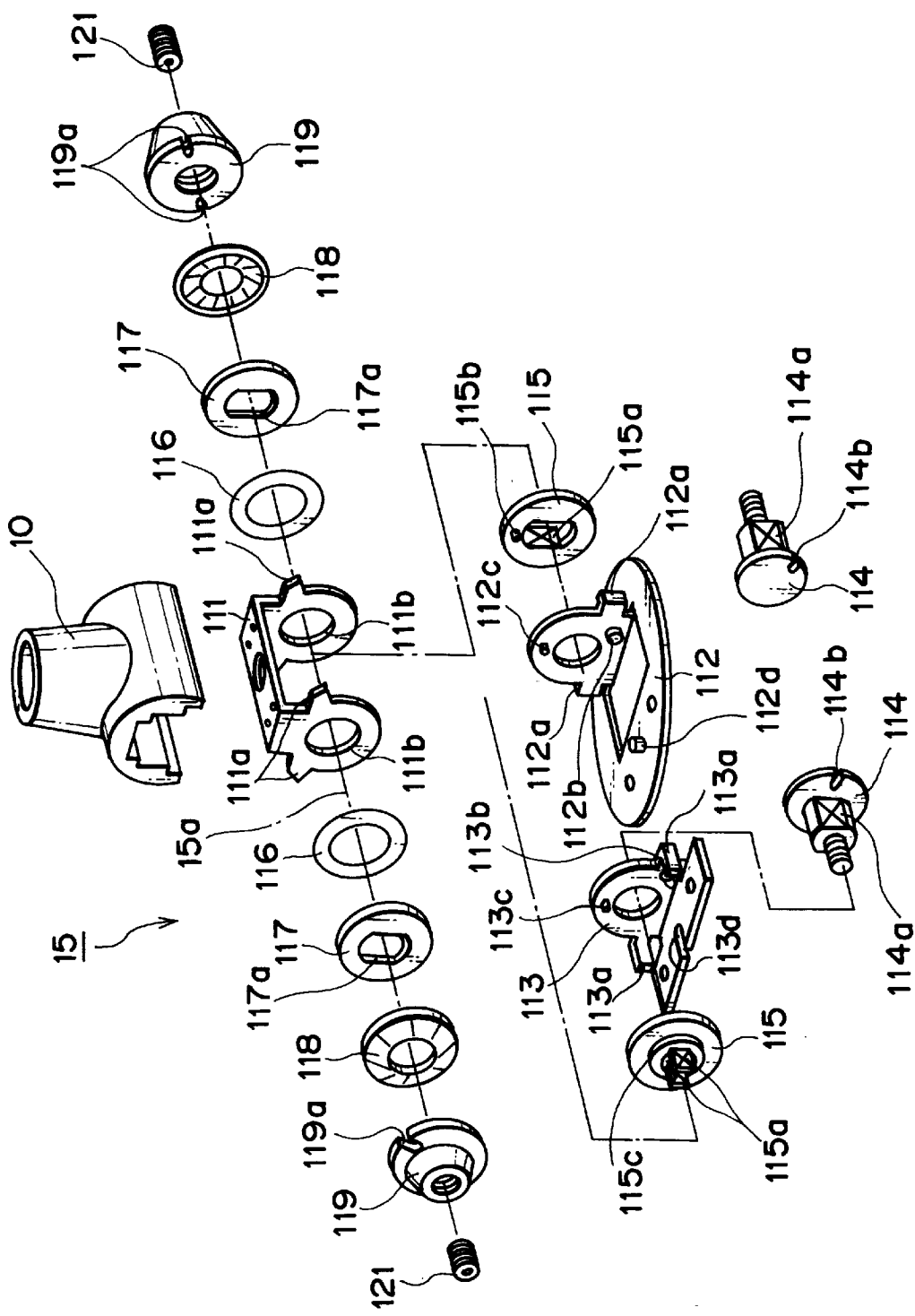
FIG. 27 is a schematic exploded perspective view showing a third hinge portion in the embodiment of the present invention.

FIG. 27 is a schematic exploded perspective view-of the hinge 15 serving as the third hinge portion. The hinge 15 constitutes the pivot support mechanism of the present invention although its detailed arrangement will be described later.

Note that the pivot support mechanism according to the present invention has a first support member having two opposing projections, a second support member which is a planar member having a U-shaped section, and has two end portions respectively engaging with the two projections and a coupling portion for coupling these two end portions, and a torque generation means arranged between the first and second support members. The coupling portion is formed with an opening portion through which the cable is inserted. In this embodiment, the hinge 15 serves as the pivot support mechanism of the present invention.

Referring to FIG. 27, reference numeral 111 denotes a pivot plate which is fixed to the joint 10 and is pivotal about the central axis 15a using, as slide surfaces, holes 111b formed on flat portions bent at its two sides. The pivot plate 111 has projections 111a which respectively contact tongue portions 112a, bent in a tongue shape, of a base plate 112 (to be described later) and tongue portions 113a, bent in a tongue shape, of a base plate 113, thus regulating the pivotal-motion of the joint 10. In this embodiment, the pivot plate 111 consists of a stainless steel material having a thickness of 1.6 mm.

Reference numeral 112 denotes a base plate which pivotally supports the pivot plate 111, and is constituted by a disk-shaped base flat portion, and a rotation support flat portion raised from the base flat portion. The rotation support flat portion has the pair of tongue portions 112a bent in a tongue shape, as described above, and also has a circular projection 112b for positioning a metal support shaft (to be described later), and a positioning hole 112c for positioning a slide washer (to be described later). Also, a projection 112d for positioning a base auxiliary plate (to be described later) is formed on the disk-shaped base flat portion.

Reference numeral 113 denotes a base auxiliary plate for pivotally supporting the pivot plate 111. The base auxiliary plate 113 is constituted by a base flat portion and a rotation support flat portion raised from the base flat portion, as in the base plate 112. The base auxiliary plate 113 and the base plate 112 are positioned by a notch 113d formed on the base flat portion of the base auxiliary plate 113 and the projection 112d of the base plate 112, and are fixed by screws (not shown). In this case, the notch 113d is preferably formed into a U shape so that the base plate 112 is movable in the direction of the central axis 15a upon attachment, thereby absorbing any part working precision error of the pivot plate 111.

The rotation support flat portion of the base auxiliary plate 113 has the pair of tongue portions 113a which are bent in a tongue shape, as described above, and has a circular projection 113b used for positioning a metal support shaft (to be described later), and a positioning hole 113c used for positioning a slide washer (to be described later).

Reference numeral 114 denotes metal support shafts for supporting the pivot plate. Each support shaft 114 is constituted by a collar portion, a shaft portion, and a screw portion, and is formed with flat portions 114a on the two sides of its shaft portion. A U-shaped groove 114b is formed on a portion of the collar portion. The grooves 114b of the support shafts 114 are respectively fitted on the circular projections 112b and 113b of the base plate 112 and the base auxiliary plate 113, so that the support shafts 114 are positioned with respect to the base plate 112 and the base auxiliary plate 113 to prevent pivotal motions therebetween.

Reference numeral 115 denotes slide washers each of which consists of a resin material (preferably, a POM resin) that has a high wear resistance and can be easily formed into an arbitrary shape. Each slide washer 115 is formed with tongue-shaped extended portions 115a at its distal end portion, and has a projection 115b which is fitted into a corresponding one of the positioning hole 112c of the base plate 112 and the positioning hole 113c of the base auxiliary plate 113 to attain positioning, and a rotation shaft portion 115c serving as a rotation slide portion.

Reference numeral 116 denotes slide sheets each consisting of an ultra-high-molecular-weight polyethylene sheet with a high wear resistance; and 117, pivot washers each constituted by a metal plate. Flat portions 117a are formed on the two sides of the inner circumferential portion of each pivot washer 117, and the pivot washers 117 and the flat portions 114a of the pivot shaft 114 hold the extended portions 115a of the pivot washers 115 to sandwich them therebetween. In this embodiment, each metal pivot washer 117 consists of a stainless steel material having a thickness of 1.6 mm as in the pivot plate 111.

Reference numeral 118 denotes belleville springs for generating a rotation torque upon displacement in the axial direction; and 119, metal nuts which threadably engage with the screw portions of the metal support shafts 114 and compress the belleville springs 118 when they are fastened by a predetermined torque. Each nut 119 is formed with rotation grooves 119a at two positions on its outer circumferential portion. Reference numeral 120 denotes a blindfold cover which is locked by an elastic pawl formed on the hinge cover 28 and closes the opening portion of the hinge cover 28. Reference numeral 121 denotes set screws for preventing the metal nuts 119 from being loosened.

Note that the belleville springs 118 serve as the torque generation means in the pivot support mechanism of the present invention together with the slide washers 115, the slide sheets 116, the support shafts 114, and the nuts 119. That is, each torque generation means is constituted by the slide washers 115 which are arranged between the base plate 112 and the base auxiliary plate 113, and the end portions of the pivot plate 111 and serve as the first slide members, the slide sheets 116 which are arranged to clamp the end portions of the pivot plate 111 together with the slide washers 115 and serve as the second slide members, the support shafts 114 which serve as clamping force generation means for generating a clamping force between the slide washers 115 and the slide sheets 116, the belleville springs 118, and the nut 119.

FIGS. 28 to 31 are views showing the assembling order of the hinge 15. Since reference numerals in FIGS. 28 to 31 denote the same parts as in the above description, a detailed description thereof will be omitted.

Figure 32:
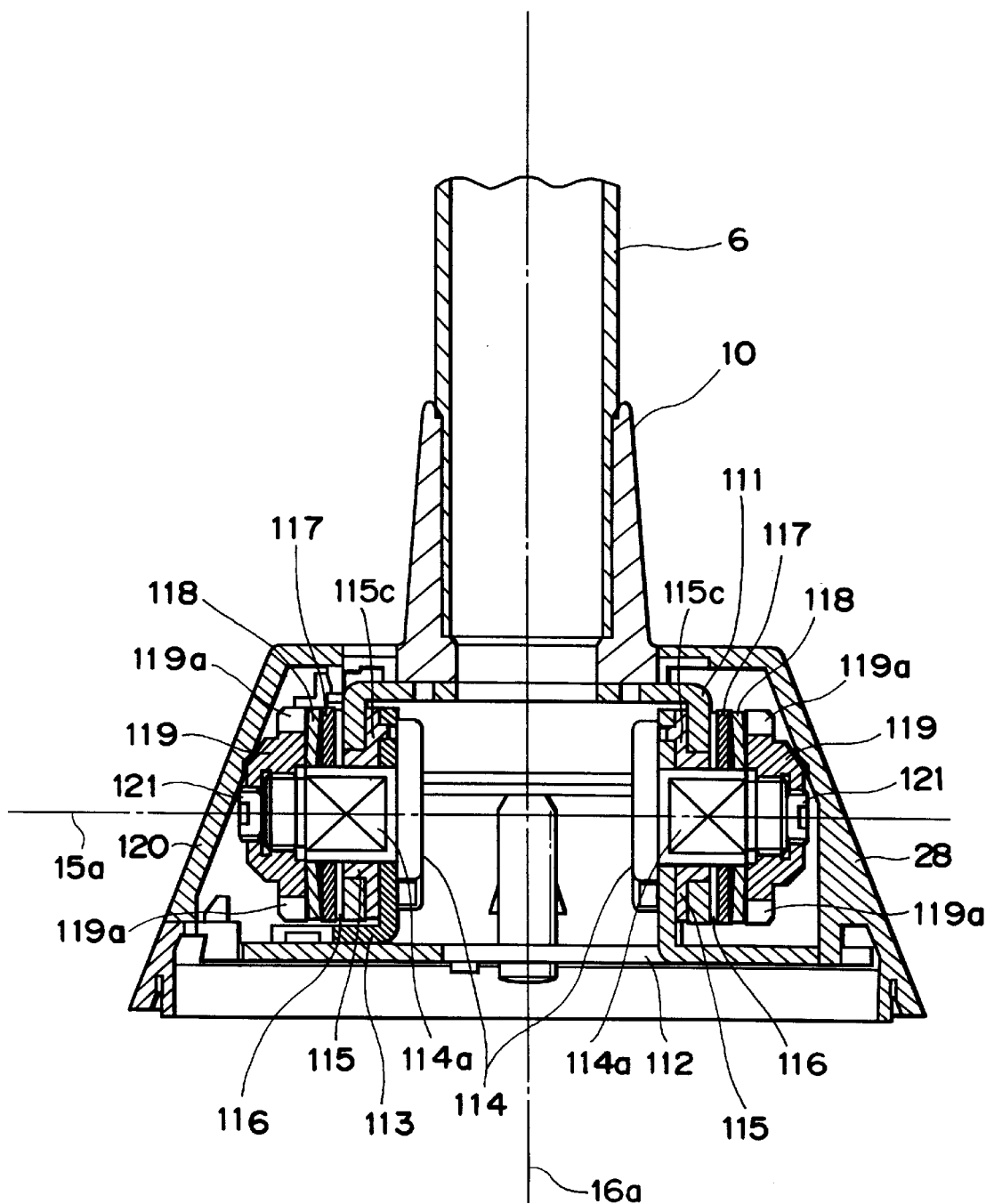
FIG. 32 is a sectional view showing principal part of the third hinge portion in the embodiment of the present invention.

FIG. 32 is a sectional view showing principal part of the hinge 15. Referring to FIG. 32, reference numeral 111 denotes a pivot plate which is fixed to the joint 10 and is pivotal about the central axis 15a; 112, a base plate for pivotally supporting the pivot plate 111; 113, a base auxiliary plate which pivotally supports the pivot plate 111 as in the base plate 112, and is fixed to the base plate 112; and 114, metal support shafts axially support the pivot plate and are fitted in round holes formed in the base plate 112 and the base auxiliary plate 113. Although not shown, rotation stoppers are arranged between the support shafts 114, and the base plate 112 and the base auxiliary plate 113 to prevent the support shafts 114 from pivoting. Reference numeral 115 denotes slide washers each of which consists of a resin material that has a high wear resistance and can be easily formed into an arbitrary shape; 116, slide sheets each consisting of an ultra-high-molecular-weight polyethylene sheet with a high wear resistance; 117, stationary (or pivot) washers each constituted by a metal plate; 118, belleville springs; 119, metal nuts which threadably engage with the screw portions of the support shafts and compress the belleville springs; and 120, a blindfold cover which is locked by an elastic pawl formed on the hinge cover 28 and closes the opening portion of the hinge cover 28.

Figure 33:
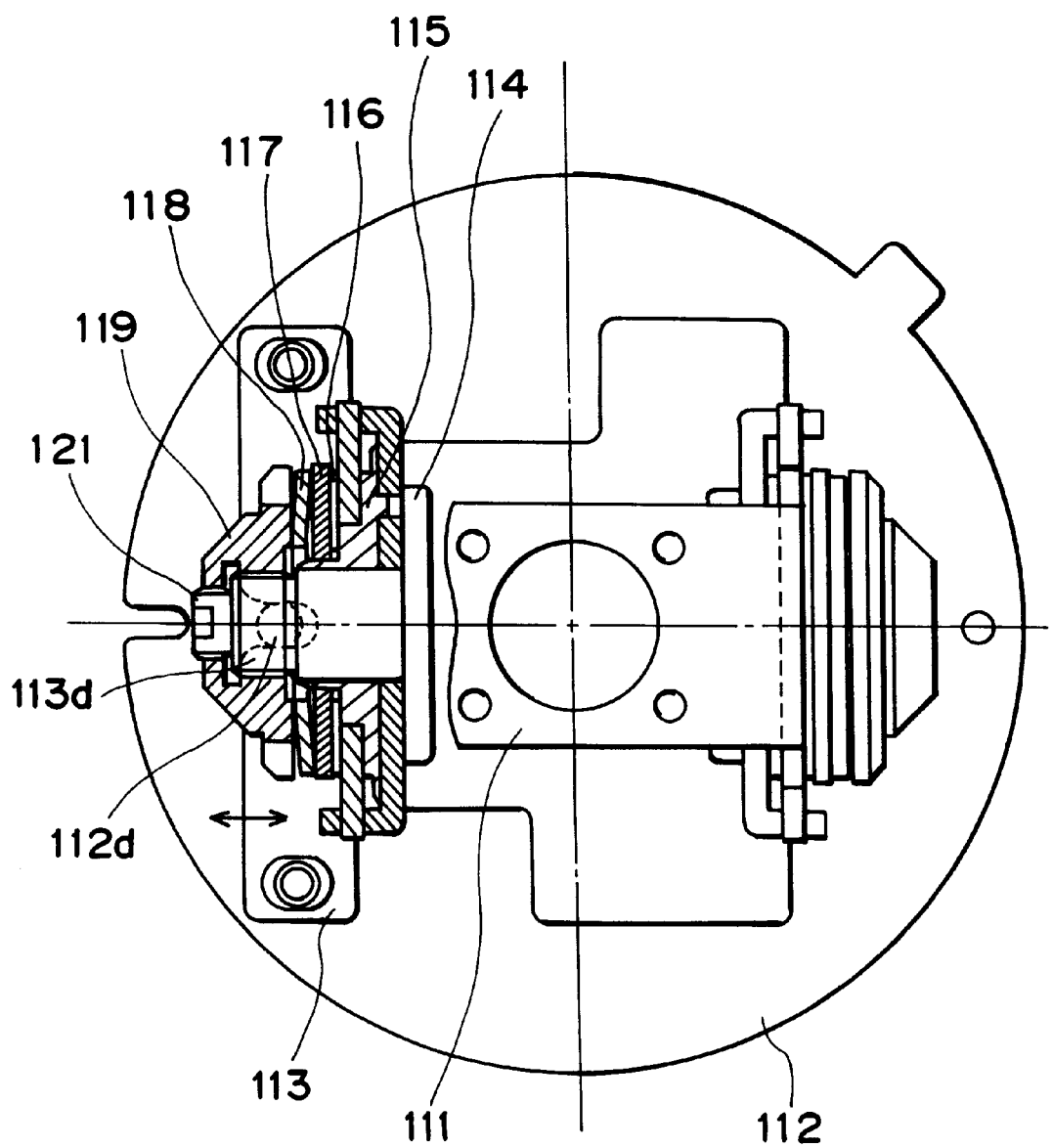
FIG. 33 is a top view showing principal part of the third hinge portion in the embodiment of the present invention.

FIG. 33 is a top view showing principal part of the hinge 15. The same reference numeral in FIG. 33 denote the same parts as in the above description, and a detailed description thereof will be omitted.

Figure 34:
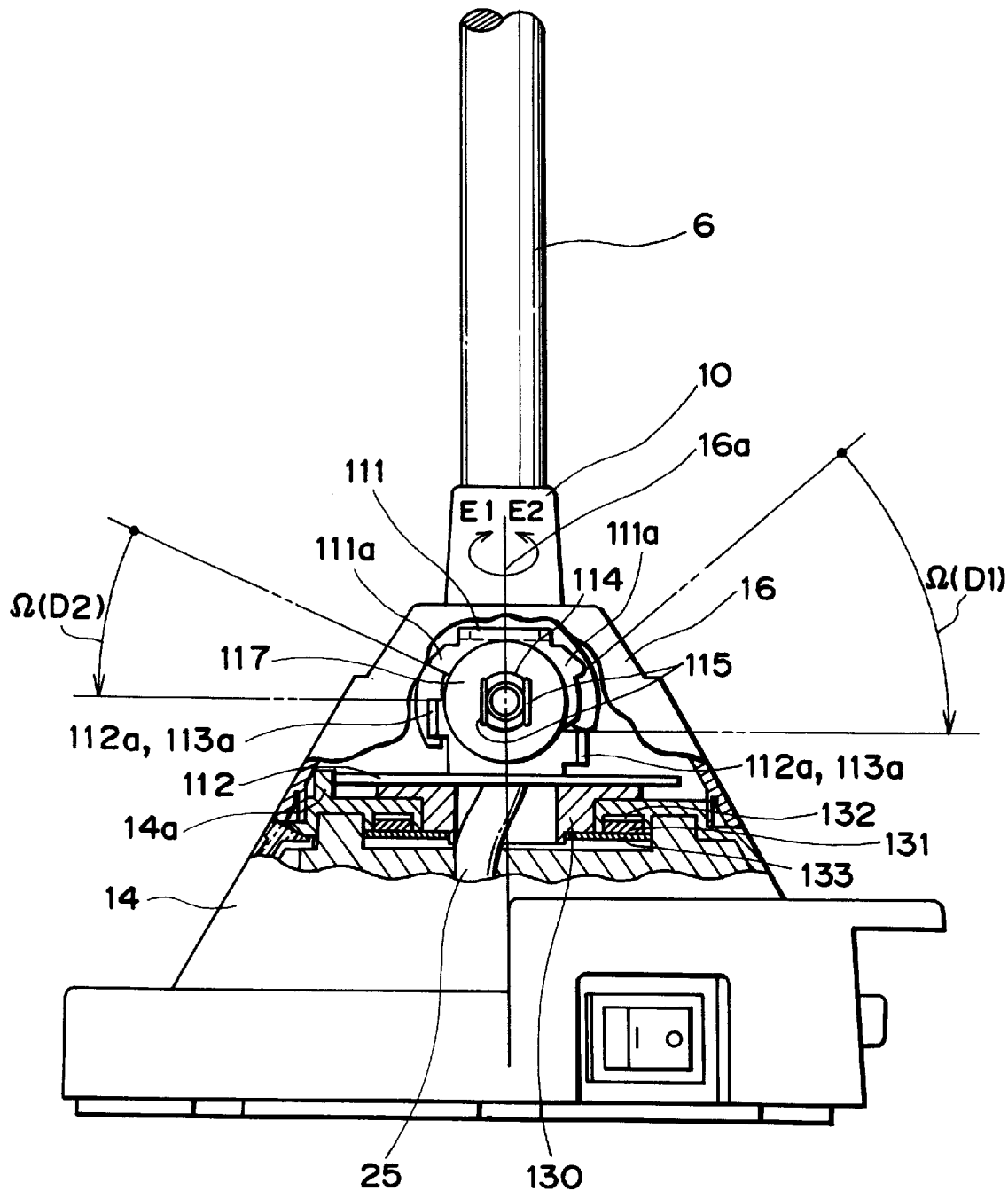
FIG. 34 is a partially cutaway side view of the third hinge portion in the embodiment of the present invention.

FIG. 34 is a side view of the hinge 15 and a sectional view of the second pivot portion 16. FIG. 34 does not illustrate the nuts. As shown in FIG. 34, the two surfaces of each support shaft 114 are D-cut. Also, the two side portions of the hole of each stationary washer 117 are D-cut, and the tongue-shaped extended portions 115a of the slide washers 115 are sandwiched between the support shafts 114 and the stationary washers 117. The pivot plate 111 partially protrudes to form the projections 111a, and the base plate 112 and the base auxiliary plate 113 are partially bent to form the tongue portions 112a and 113a.

The arrangement around the above-mentioned hinge 15 will be described below. Referring to FIG. 34, reference numeral 130 denotes a slide shaft which consists of a resin material with high slidability, and serves as the pivotal center of the second pivot portion 16, which pivots about the central axis 16a; 131, a wave washer for generating a torque upon pivotal motion; 132, a washer which consists of an ultra-high-molecular-weight polyethylene sheet for improving slidability; and 133, a metal pan plate which has a stopper, is positioned by a boss of the slide shaft 130, and regulates the pivot amount, in the directions of arrows E1 and E2, of the slide shaft 130 by its stopper. The pan plate 133 also serves as a regulating means for regulating the deflection amount of the wave washer 131.

Figure 35:
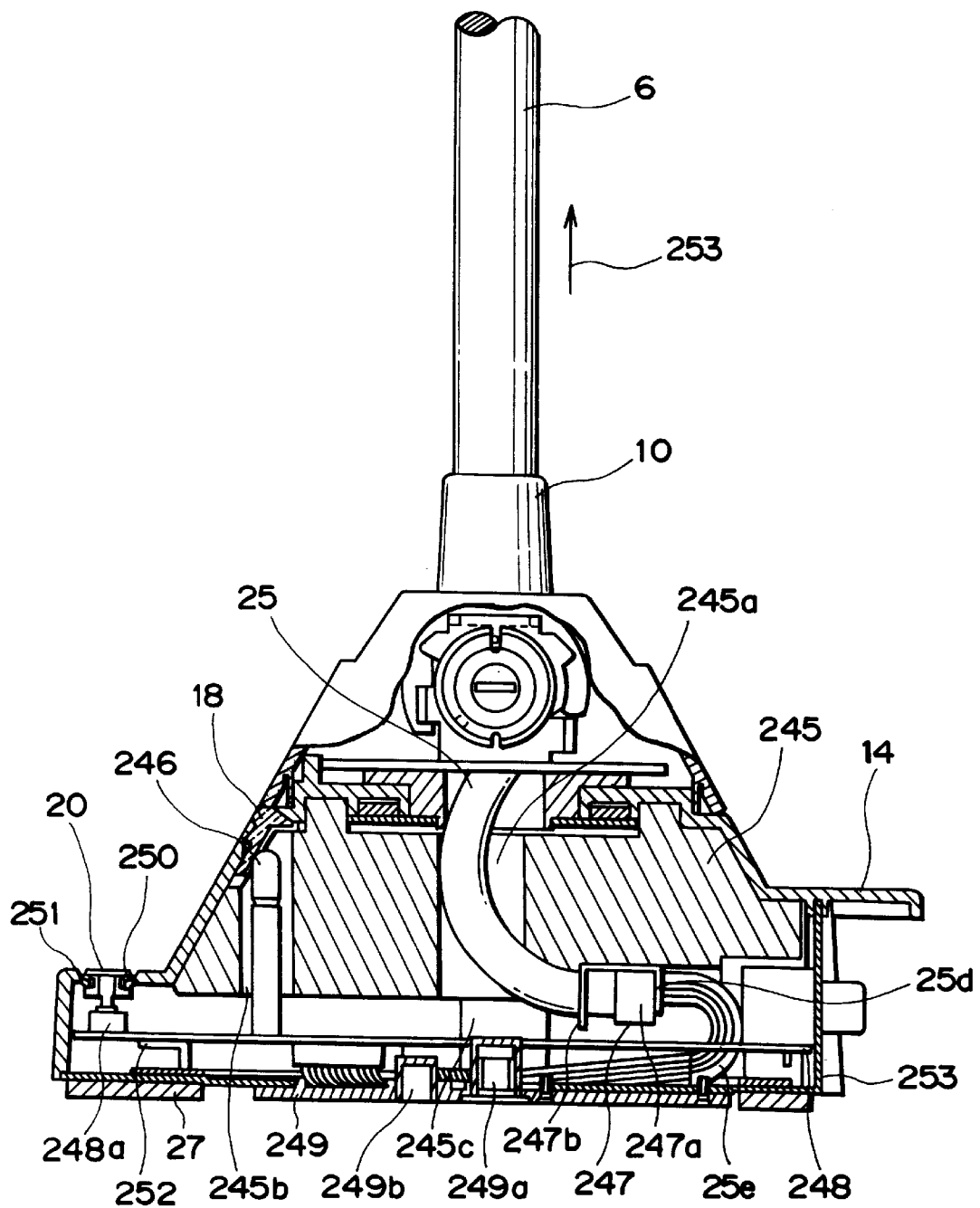
FIG. 35 is a schematic sectional view for explaining the internal structure of a main body base in the embodiment of the present invention.
Figure 36:
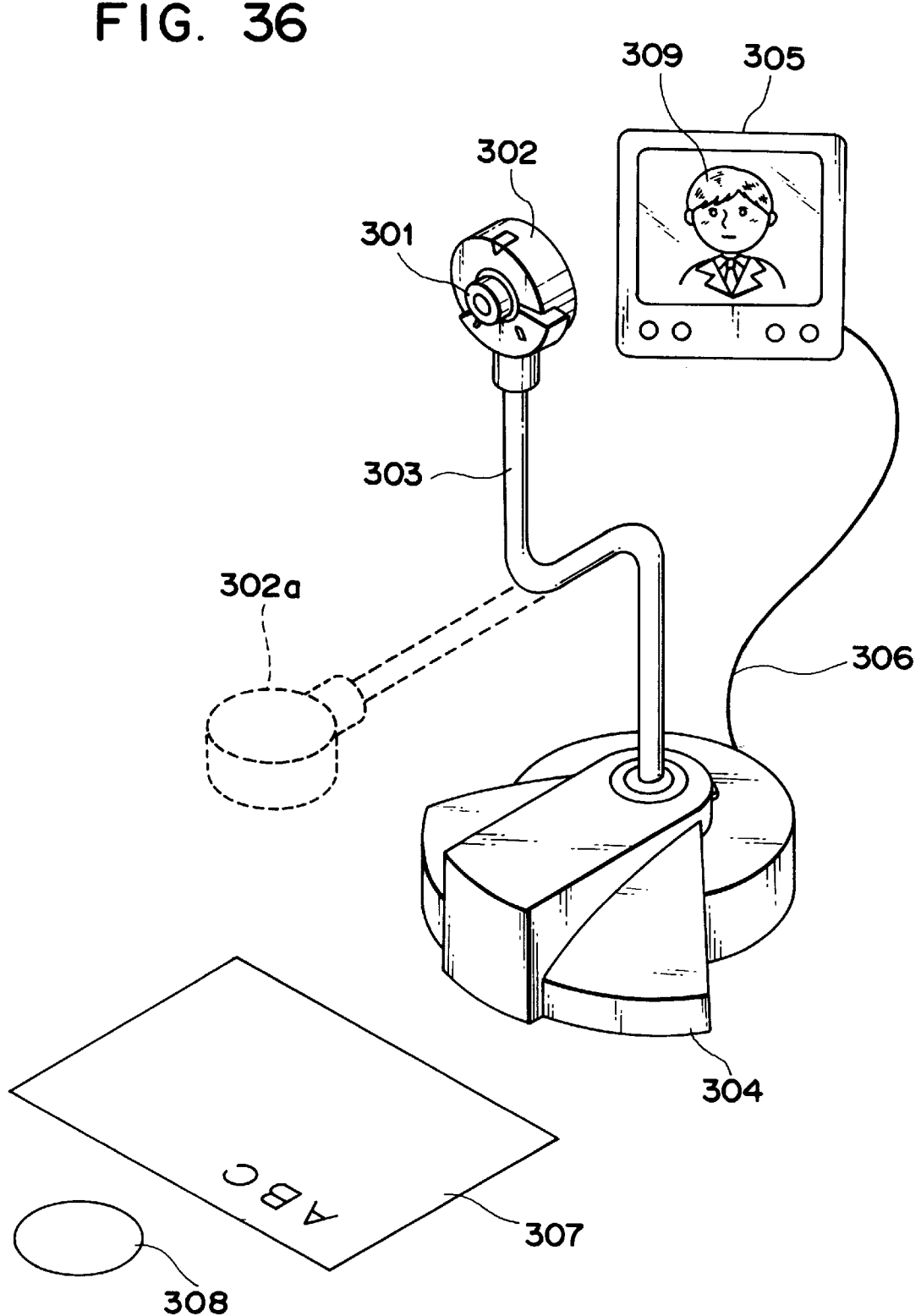
FIG. 36 is a schematic perspective view showing the prior art.
Figure 37:
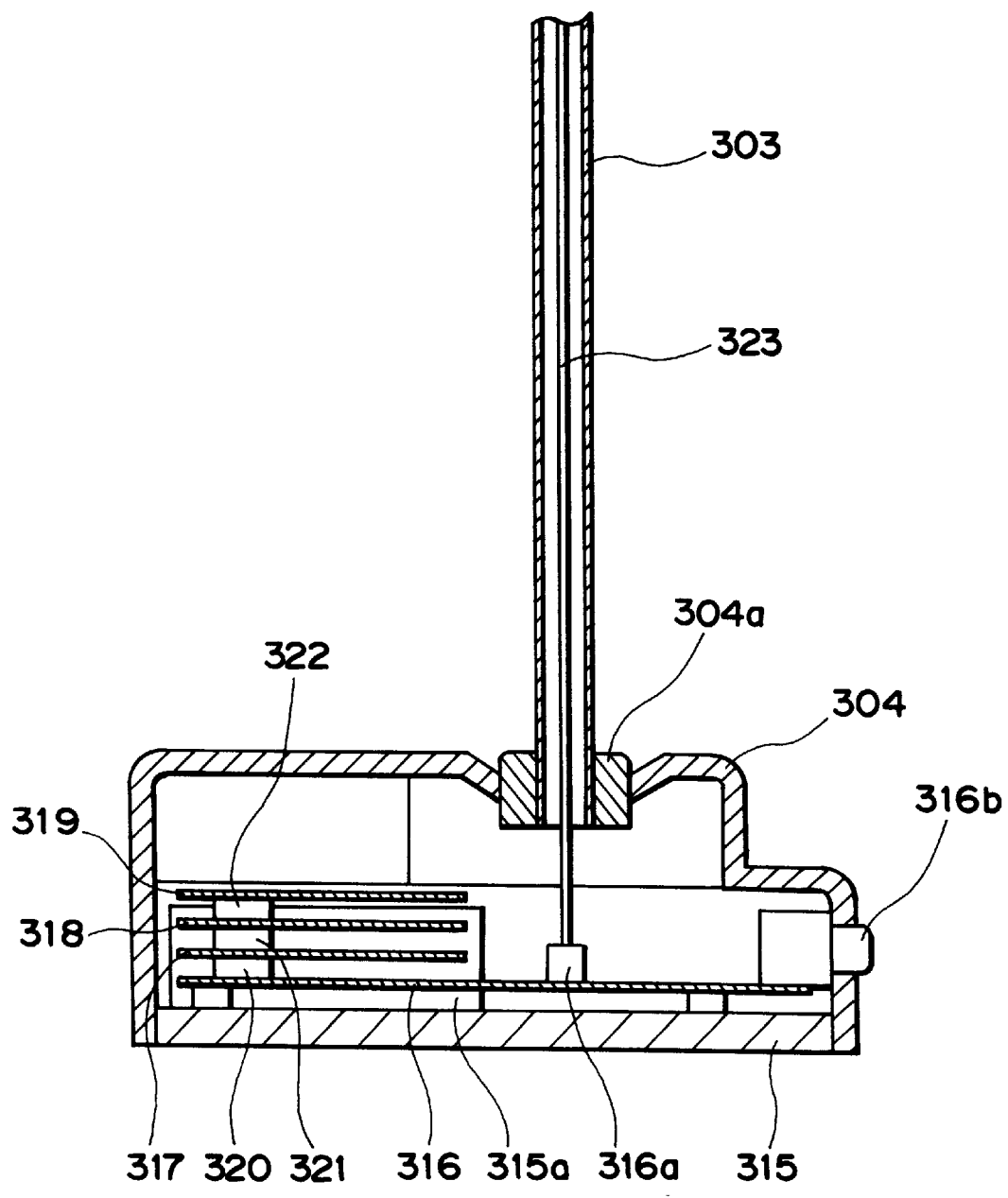
FIG. 37 is a schematic sectional view showing the prior art.

FIG. 35 is a schematic sectional view for explaining the internal structure of the main body base 14. Referring to FIG. 35, reference numeral 245 denotes a ballast which has roughly the same shape as the inner shape of the main body base 14, and is fixed to the main body base 14 by screws (not shown). The ballast 24 has a central hole 245a in which the main cable 25 is inserted, and a square hole 245b for a power LED on the front surface side, and serves as a weight for preventing the image input apparatus from falling down. Reference numeral 246 denotes a power LED which is turned on when the power supply is turned on; 247, a metal clamp for fixing the main cable 25 to the ballast 245; 248, a main circuit board formed with a hole (not shown) in which the main cable 25 is inserted; and 249, a rear cover which has a screw portion 249a for a tripod and a hole 249b for receiving a rotation stopper pin, and serves as a cover for a square hole of a chassis 253 (to be described later).

Reference numeral 250 denotes a negative/positive selection switch button; 251, a coil spring for using the negative/positive selection switch button 250 vertically upward; 252, a ring which is fitted into a groove portion formed on the negative/positive selection switch button 250 to prevent the switch button 250 from disengaging from the main body base 14 (in this embodiment, the ring 252 preferably consists of a resin sheet material having a C-shape but may comprise a general E ring, or the like); and 253, a chassis to which the main circuit board is attached and which has a central square hole used for attaching/detaching a connector.

Note that a detailed description associated with that given above using FIGS. 28 to 35 will be made later.

The operations of the image input apparatus with the above-mentioned arrangement will be described in turn below.

The basic signal processing flow will be described below with reference to FIG. 3. When the power switch 17 is turned on, light imaged on the CCD 203 via the lens 1 is converted into an electrical signal at predetermined time intervals. After the electrical signal is processed via the amplifier 54 and the image signal processing unit 51, the electrical signal is output as an image signal from the S output terminal 41 or the video output terminal 42. Then, an image is displayed on the monitor 33 connected to the apparatus via the connection cord 31.

When the microphone 34 is connected to the microphone input terminal 29, an electrical signal input from the microphone 34 is output to the audio output terminals 43 as stereophonic audio signals via the audio signal processing unit 52. Then, the stereophonic audio signals are output from the loudspeakers of the monitor 33 connected via the connection cord 32. Note that a monaural loudspeaker may be used although the realism deteriorates to some extent.

The operation performed when a document is to be photographed will be explained below. In this embodiment, A4 size as an original size which is most popularly used is assumed to be the standard original size. As shown in FIG. 1, an original 35 serving as an object is placed on the placing surface 36. At this time, the original 35 is positioned with reference to the power LED lens 18 of the main body base 14, so that the central line of the main body base 14 agrees with that of the original 35.

The angles defined by the camera head 2 and the arms 5 and 6 are set to be approximately 90°. In this embodiment, this setting state allows an image of the A4-size original 35 to be fully displayed on the monitor screen.

When the second pivot portion 16 is pivoted so that the index 28a of the hinge cover 28 matches the power LED lens 18, the camera head 2 is located at substantially the center of the original 35. That is, in the image input apparatus of this embodiment without any original table, the position of the original 35 to be placed is not easily determined. In view of this problem, in the apparatus of this embodiment, the power LED lens 18 of the main body base 14 is arranged at the center of the apparatus, and the original 35 is set with reference to the power LED lens 18, resulting in very good operability. Since an image of the standard, A4-size original 35 can be picked up by the above-mentioned simple operation, a need for cumbersome adjustments of the positions of the original and camera head while observing the image displayed on the screen of the monitor 33, can be obviated. Since the indication unit such as the power LED lens 18 for indicating the operation state of the apparatus is effectively utilized as an index or reference used for determining the position of the original 35 to be placed, the operability in the document photographing mode can be improved, and the apparatus can have a natural design.

Finally, the focus adjustment ring 1a of the lens 1 is rotated to adjust the focusing state, and thereafter, the camera head 2 is pivoted by the first pivot portion 4, thereby correcting any tilt of an image of the original 35 displayed on the screen of the monitor 33. After the original 35 is set as described above, its photographing operation is performed.

At this time, the positional relationship shown in FIG. 4 is established between the form of the apparatus and the original size. That is, when the angle formed between the camera head 2 and the arm 5, the angle formed between the arms 5 and 6, and the angle formed between the arm 6 and the placing surface 36 are respectively set to be about 90°, an image, in the landscape direction, of the A4-size original 35 can be fully displayed on the screen of the monitor 33. Furthermore, the interval d between the main body base 14 and the original 35 is set as follows to prevent an image of the main body base 14 from being displayed on the screen:

$$d = L - D - W2/2 > 0$$

In this embodiment, the standard original size is assumed to be A4 size. Of course, the present invention is not limited to this size.

As shown in FIG. 6, the hinge 11 is divided into two opposing portions on the two sides of the main cable 25, i.e., the main cable 25 crosses the central axis 11a of the hinge 11. With this structure, since the main cable 25 need not bypass the hinge 11, it can be naturally laid.

As shown in FIG. 5, when the pivot angle, θ(B1), of the hinge 11 is close to 0°, i.e., when the camera head 2 and the arm 5 form substantially right angles, the main cable 25 is also bent at right angles, and a large stress may locally act on the main cable 25, resulting in disconnection of the main cable 25. The bent shape of the main cable 25 is indicated by an alternate long and short dashed line in FIG. 15. In view of this problem, a resin tube or the like with high slidability is wound around a portion of the main cable so that the inner wall of the arm 5 and the main cable 25 can easily slide against each other. With such slide treatment, the main cable 25 slides in the direction of an arrow F in FIG. 5. As a result, since the main cable 25 forms a large arcuated shape (with a large radius of curvature), as indicated by a broken curve in FIG. 15, no local concentration of stress takes pace, i.e., disconnection of the cable can be prevented. At this time, since the main cable 25 is bent outside the hinge 12, it easily slides in the direction of the arrow F.

In order to improve the slidability of the main cable 25, this embodiment uses a tube with high slidability. Alternatively, a lubricant such as grease may be used, or a paint with high slidability (e.g., fluorine paint) may be applied on the inner wall of the arm 5, thus achieving the same effect as described above.

The functions of various switches will be explained below.

AGC Switch 19

When the power switch 17 is turned on, the AGC function is automatically enabled, and the amplifier 54 operates in accordance with a signal from the CPU 50 (FIG. 3) so as to appropriately adjust the brightness of an image of the original 35 displayed on the monitor 33. However, a high-luminance portion, so-called "oversaturated image", may be generated depending on the ambient illumination, gloss of the original surface, and the like. In such a case, the aperture adjustment ring 1b of the lens 1 is opened. Then, the CPU 50 sets a minimum gain to lower the luminance since the object has a high luminance. At this time, when the AGC switch 19 is depressed, since the AGC switch 19 is a switch for fixing the gain at that time, the gain is fixed to be the minimum value. As the aperture adjustment ring 1b is stopped down, the luminance of the screen of the monitor 33 lowers. Thus, the operator can obtain an appropriate brightness by stopping down the aperture adjustment ring 1b while observing the image displayed on the screen of the monitor 33.

For example, when a person in front of a window as a background is to be photographed, the luminance of the background is often higher than that of the object, and the CPU 50 lowers the gain under the influence of the high luminance of the background, resulting in a dark image of the object. In such a case, the aperture adjustment ring 1b is stopped down to its limit. With this operation, since the CPU 50 sets a maximum gain, the operator depresses the AGC switch 19 at that time to fix the maximum gain. Then, the operator opens to the aperture adjustment ring 1b while observing the image displayed on the screen of the monitor 33 so as to obtain an appropriate brightness.

Note that an LED in the vicinity of the aperture adjustment switch is kept OFF since the apparatus is normally used with the AGC function ON. When the AGC function is disabled, i.e., when the gain is fixed, the LED is turned on.

WB (White Balance) Switch 22

When the operator wants to change the color tone of the image of the object displayed on the monitor 33, he or she depresses the WB switch 22. Upon depression of the switch 22, the CPU 50 supplies a signal to the image signal processing unit 51 to adjust white balance with respect to the object. While the white balance is adjusted, an LED in the vicinity of the WB switch 22 is caused to blink, thereby informing the operator that the white balance is being adjusted. Since the LED is turned off upon completion of the adjustment, the operator then turns the volume 23 to obtain a desired color tone.

In this embodiment, when the volume 23 is turned from the neutral position to the right, the image is tinged with blue; when the volume 23 is turned to the left, the image is tinged with red. That is, when the operator turns the volume 23, the CPU 50 detects the direction and amount of rotation from the neutral position, and determines the bluish or reddish tinge on the basis of the direction of rotation, and determines the amount of change in color tone on the basis of the amount of rotation. The CPU 50 supplies a signal to the image signal processing unit 51 to change the color tone with respect to an image signal supplied from the CCD.

Shutter Selection Switch 44

Since an illumination of, e.g., a normal fluorescent lamp is caused to repetitively blink at the frequency of a commercial power supply, when the blinking frequency of the illumination does not match the shutter speed of the CCD or does not correspond to an integer multiple of the shutter speed, an image flicker occurs. For example, in the Eastern Japan area such as Tokyo, since the frequency of the commercial power supply is 50 Hz, a flicker occurs if the shutter speed is 1/60 sec. In view of this problem, in this embodiment, the shutter speed can be selected from 1/60 sec and 1/100 sec, i.e., can be switched in correspondence with the frequency of the local commercial power supply. For example, in the case of Tokyo, the shutter speed is switched to 1/100 sec, thus preventing any flicker. At this time, the CPU 50 supplies a signal to the timing generator 53 in accordance with the state of the shutter selection switch 44 to control the shutter speed of the CCD.

Negative/positive Reversal Switch 20

When a negative film of, e.g., a still picture is to be photographed, the negative film is placed on a light box serving as a light source, and the negative/positive reversal switch 20 is depressed. The CPU 50 then supplies a signal to the image signal processing unit 51 to perform predetermined processing of an image signal supplied from the CCD, thereby reversing a negative image to a normal positive image, and outputting the positive image.

Microphone Mute Switch 21

For example, when the apparatus of the present invention is used in a video meeting system, the voice of the operator is input using the external microphone 34. When the operator wants to temporarily disable the voice input, he or she depresses the microphone mute switch 21. Then, the CPU 50 supplies a signal to the audio signal processing unit 52 to stop the output of audio signals to the audio output terminals 43. At this time, since an LED in the vicinity of the microphone mute switch 21 is turned on, the operator can easily recognize that the voice input is disabled. On the other hand, when the operator wants to input his or her voice again, he or she depresses the microphone mute switch 21 again, so that the audio signal processing unit 52 outputs signals to the audio output terminals 43. At this time, since the LED is turned off, the operator can easily recognize that his or her voice is being input.

The portrait photographing mode will be described below with reference to FIGS. 7, 8, and 11. In the portrait photographing mode, the arm 6 is pivoted in the direction of an arrow D1, and the arm 5 and the camera head 2 are set to point in substantially the horizontal direction. When the arm 6 is pivoted in the direction of the arrow D1, the camera head 2 is separated away from the object, thereby adjusting the image displayed on the monitor 33 to have an appropriate size. For this purpose, the maximum pivot angle, $\Omega(D1)$, in the direction of the arrow D1, of the hinge 15 is set to be as large as 40°, as described above. Subsequently, in FIG. 7, the camera head 2 is pivoted through 180° in the direction of an arrow A2. This is because a vertically inverted image of the person is displayed when the camera head 2 is merely turned from the document photographing state shown in FIG. 1 to the horizontal state.

In the conventional image input apparatus, since the camera head cannot be pivoted through 180°, as has been described in the prior art, the vertical direction of the CCD of the image pickup unit is set with reference to a person, and an original must be set in an upside-down state when viewed from the operator in the document photographing mode. For this reason, it is difficult for the operator to read an original, or the like, as has been described above. However, in this embodiment, since the camera head 2 can be pivoted through 190°, the operability can be improved even in the document photographing mode. That is, the operator can observe both an original and its image on the monitor 33 in an erected state.

As described above, the indices shown in FIG. 8 are embossed and printed at 180° opposing positions on the focus adjustment ring 1a and the aperture adjustment ring 1b of the lens 1. With these indices, even when the camera head 2 is pivoted through 180°, the operator can perform focus and aperture adjustments while observing the indices as in the document photographing mode. In this embodiment, the aperture adjustment ring 1b has different colors at 180° opposing positions. This is to basically confirm whether the camera head 2 is set in the portrait or document direction (to display an erected image on the monitor) without observing the monitor screen, i.e., in a power-OFF state, a state wherein the apparatus is not connected to the monitor, and the like. With this arrangement of this embodiment, the operability can be improved.

In order to distinguish the portrait and document directions from each other, logos such as "portrait" and "document" may be printed at 180° opposing positions of the outer case of the camera head 2, thus obtaining the same effect as described above. For example, as shown in FIG. 1, a portion M printed with the logo of the document photographing mode is assured at an appropriate position on the outer case of the camera head 2, and a portion M' printed with the logo of the portrait photographing mode is assured on the rear side of the portion M.

Furthermore, the maximum pivot angle, $\Omega(A2)$, of the camera head 2 (first pivot portion 4) is set to be 190° so as to prevent an image from being tilted even when the main body base 14 is placed on an inclined surface, as described above. Thus, even when the main body base 14 is placed on the surface inclined at a maximum of 10°, an image can be corrected to the horizontal state by appropriately pivoting only the camera head 2. Furthermore, since the maximum pivot angle $\Omega(A2)$ of the camera head 2 is set to be 190°, problems associated with parts precision or assembling precision can be solved. A pivot angle of 180° is often insufficient for absorbing accumulated errors of an inclination error of the CCD image pickup surface with respect to the attachment portion on the CCD, an inclination error upon attachment of the CCD to the camera head, an inclination error of the pivot stopper with respect to the camera head, and the like. In view of this problem, the pivot angle requires a margin, and is set to be 190°, as described above. Thereafter, the position of the camera head 2 is finely adjusted while observing the monitor 33, and furthermore, focus adjustment, brightness or color tone adjustment, or shutter speed selection is performed, thus completing preparation for the photographing operation.

In the above-mentioned portrait photographing mode, a drawing adhered on the wall surface, a vertical surface such as a blackboard, or the like may be similarly photographed.

A partially enlarged photographing operation of the original 35 will be described below with reference to FIGS. 9 and 13. When a portion of the original 35 is to be photographed in an enlarged scale, the lens 1 can be brought close to the original 35, as shown in FIG. 13. The photographing range at that time is W3, and is displayed on the monitor 33, thus attaining an enlarged photographing operation. In this embodiment, the maximum pivot angle, $\Omega(D2)$, of the hinge 15 is set to be 24°, so that the lens 1 can reach the corner portion of the A4-size original 35.

When the right corner portion of the original 35 is photographed in an enlarged scale, as shown in FIG. 9, the camera head 2 must be pivoted through an angle $\Omega(E2)$ about the second pivot portion 16 as the pivot fulcrum until it is located at the right corner portion, and must then be pivoted through an angle $\Omega(A1)$ about the 15 first pivot portion 4 as the pivot fulcrum, as shown in FIG. 9. The reason why the camera head 2 is pivoted about the two pivot portions is to solve the following problem and to obtain an erected image on the monitor 33. That is, when the camera head 2 is merely pivoted through the angle $\Omega(E2)$ about the second pivot portion 16, an image of the corner portion of the original 35 is obliquely displayed on the monitor 33 (not an erected image), resulting in a very poor image.

In this embodiment, the angle $\Omega(A1)$ is set to be 60°. However, this problem can be basically solved by arranging the apparatus to satisfy $\theta(E2)=\Omega(A1)$ at any position within the predetermined pivot range for displaying the image of the original 35. Similarly, when the left corner portion is to be photographed in FIG. 9, the camera head 2 is pivoted in the direction of the arrow A2. As described above, since the maximum pivot angle $\Omega(A2)$, in the direction of the arrow A2, of the camera head 2 is set to be 190°, a corner portion of even an original larger than A4 size can be sufficiently photographed in an enlarged scale. Furthermore, since the camera head 2 pivots in the directions of the arrows A1 and A2, the entire original 35 can be photographed even when it is offset from the central line of the main body, as shown in FIG. 10.

A case upon carrying or storing the apparatus will be explained below with reference to FIG. 12.

The arm 6 is set to be substantially perpendicular to the placing surface 36. Subsequently, the camera head 2 is pivoted about the hinge 11 in the direction of an arrow B1 until its pivotal motion is regulated by a pivot stopper (to be described later) of the hinge 11. Then, the arm 5 is pivoted about the hinge 12 in the direction of an arrow C2 until its pivotal motion is regulated by a pivot stopper (to be described later) of the hinge 12. At this time, the stopper of the hinge 12 is set so that the arms 5 and 6 extend nearly parallel to each other.

As described above, by folding the respective arms and the like via the respective pivot portions, the entire apparatus can have a compact form, as shown in FIG. 12, and can be left on the desk without obstructing anything when it is not used. The apparatus can be easily carried since the operator can simultaneously hold the arms 5 and 6. In order to make the apparatus compact, the maximum pivot angle, $\Omega(C2)$ of the hinge 12 is set to be 90.

In other words, since the apparatus of the present invention allows the arms 5 and 6 to be folded in a parallel state, as shown in FIG. 12, portability and storage ability are greatly improved. When the arms 5 and 6 are folded in this manner, the main cable 25 is exposed and flexed from the hinge 12, as shown in FIG. 4. Therefore, any excessive force can be prevented from acting on the main cable 25 even in the form shown in FIG. 12, i.e., the main cable 25 can be prevented from being damaged. In order to assure the interval h between the distal end of the lens 1 and the placing surface 36 in the compact form shown in FIG. 12, the maximum pivot angle, $\Omega(B1)$, in the direction of the arrow B1, of the hinge 11 is set to be 140°. Since the interval h is assured, when the arms are folded, as shown in FIG. 12, or when the apparatus in the state shown in FIG. 12 is carried and placed on the placing surface, the lens 1 can be prevented from being damaged upon crashing on the placing surface.

As described above, in this embodiment, the standard size of the original 35 is assumed to be A4 size. A case will be explained below with reference to FIG. 14 wherein the entire original larger than A4 size is to be photographed. Note that the form indicated by an alternate long and two short dashed line in FIG. 14 corresponds to that shown in FIG. 4.

From the form indicated by the alternate long and two short dashed line, the arm 6 is pivoted about the hinge 15 in the direction of an arrow D2, the arm 5 is pivoted about the hinge 12 in the direction of an arrow C1, and the camera head 2 is pivoted about the hinge 11 in the direction of an arrow B2. As a result, since the camera head 2 is located at the position higher than that for the A4-size original, the photographing range is broadened from W2 to W3, and a larger original can be entirely photographed. In order to take such a form, the maximum pivot angle, $\Omega(B2)$, in the direction of the arrow B2, of the hinge 11 is set to be 15°, and the maximum pivot angle, $\Omega(C1)$, in the direction of the arrow C1, of the hinge 12 is set to be 20°.

The main cable 25 connected to the camera head 2 will be explained below.

Referring to FIG. 16, the main cable 25 comprises, e.g., a 19-line compound cable including three 75 Ω coaxial lines. The main cable 25 comprises, inside its sheath, a shield material (in this embodiment, a single mesh winding of a tin-plated copper wire is preferable, but the present invention is not limited to this), the shield material is folded to cover the sheath, and a conductive copper foil tape 25b is wound around the folded portion. The metal clamp 221 comprises a roughly arcuated portion 221a and a roughly sawtooth-shaped portion 221b. The metal clamp 221 clamps the tape 25b portion of the main cable 25 by the roughly arcuated portion 221a, and the roughly sawtooth-shaped portion 221b bites into the sheath of the main cable 25, thereby securely fixing the main cable 25 to the tilt chassis 220. Since the main cable 25 is fixed in this manner, even when the main cable 25 is pulled in the direction of an arrow 223, it can be prevented from being removed from the camera head 2 and the internal cable can be prevented from being disconnected.

Furthermore, the main cable 25 is released from the constraint of the tape 25b, and is separated into signal lines 25a. These signal lines 25a extend through the head shaft 219, and are then fixed by the mold clamp 215. This portion allows the main cable 25 to rotate in correspondence with the rotation in the directions of arrows A1 and A2 about the head shaft 219 of the head chassis 212 as the rotation shaft. That is, since the video circuit board 208 rotates upon this rotation, the main cable 25 coupled to the connector of the video circuit board 208 is similarly twisted. In this case, the main cable 25 is rotated through 190° in the direction of the arrow A2. However, if the main cable 25 is kept covered with the sheath, the cable 25 can only be twisted through at most 60° in the circumferential direction since the sheath acts to resist the twist. In view of this problem, the sheath is partially removed to separate the cable into the respective signal lines 25a, and the signal lines 25a are bundled by the mold clamp 215, thus allowing smooth rotation through 190°.

The signal lines 25a fixed by the mold clamp 215 are then reversed by the vertical plate 213, and are coupled to the connectors 210 and 211 on the video circuit board 208. Although the signal lines 25a which are not covered by the shield material may serve as a noise source for the CCD 203, noise components generated by the signal lines 25a are shielded by the vertical plate 213. On the other hand, the signal lines 25a themselves are easily influenced by noise since they have no shield material. To solve this problem, this embodiment takes the following countermeasure.

That is, a GND line 25c is fixed by soldering to the tape 25b of the main cable 25, and is connected to a GND terminal of the video circuit board 208 via a connector. The GND terminal of the video circuit board 208 is grounded to the lens chassis 204, and the shield cases 227 and 228 are fixed by screws to the lens chassis 204, as shown in FIG. 17. Therefore, the shield cases 227 and 228 are grounded to the shield material of the main cable 25 via the video circuit board 208, the GND line 25c, and the tape 25b. With this arrangement, the respective signal lines 25a are shielded from noise by the shield cases 227 and 228.

A case will be explained below wherein the camera head 2 is rotated in the directions of the arrows A1 and A2.

As shown in FIG. 16, the lens chassis 204 is fixed by screws to the head chassis 212 to constitute the framework of the camera head 2. Since the camera head 2 is constituted by attaching the shield cases 227 and 228 and the camera cases 225 and 226 to this framework, as shown in FIG. 17, rotation of the camera head 2 is realized by rotation of the head chassis 212 in the directions of the arrows A1 and A2.

Referring to FIG. 16, the head chassis 212 is pivotally and axially supported by the head shaft 219 at its round hole 212a, and is used by the using force, in the direction of the arrow 223, of the wave washer 217 via the washer 218. In this embodiment, the washer 218 consists of an ultra-high-molecular-weight polyethylene sheet which has a small frictional coefficient and a high wear resistance. Upon rotation of the head chassis 212, the washer 218 rotates together with the head chassis 212, and the washers 218 and 217 slip with respect to each other. If a represents the frictional force between the head pan plate 216 and the wave washer 217, b represents the frictional force between the wave washer 217 and the washer 218, and c represents the frictional force between the washer 218 and the head chassis 212, a>b and c>b hold among these frictional forces, and the frictional force between the washer 218 and the wave washer 217 is smallest.

Slip between the washer 218 and the wave washer 217 can attain a slide motion smoother than that obtained between two metal members since they respectively consist of a resin sheet and a metal. Upon rotation of the head chassis 212 in the directions of the arrows A1 and A2 by the urging force from the wave washer 217, a rotation torque T is generated. Therefore, even when the operator stops rotation of the camera head 2 at an arbitrary position, the camera head 2 can be prevented from rotating further by its weight or inertia. Furthermore, the rotation torque T has a larger value than those of the focus adjustment ring 1a and the aperture adjustment ring 1b provided to the lens 1. For this reason, even when the operator rotates these rings, the camera head 2 itself can be prevented from being rotated.

As described above, the camera head 2 is rotated in the directions of the arrows A1 and A2. When the head chassis 212 is rotated through about 60° in the direction of the arrow A1 in FIG. 17, a pawl portion 212b of the head chassis 212 contacts the stopper 216a of the head pan plate 216, thus regulating the rotation. In the direction of the arrow A2 as well, when the head chassis 212 is rotated through about 190°, the pawl portion 212b of the head chassis 212 contacts the stopper 216a (not shown) of the head pan plate 216, thus regulating the rotation.

A case will be explained below wherein the joint 7 including the camera head 2 is rotated in the directions of the arrows B1 and B2.

Referring to FIG. 18, the tilt shaft 238 is positioned to arcuated holes 220a and 220b of the tilt chassis 220 by its arcuated projections 238b and 238c, and is fixed to the tilt chassis 220 by screws 240. A shaft portion 238a engages with a hole 7a of the joint 7, the washer 237, the metal washer 236, and the belleville spring 235, and serves as a rotation shaft in the directions of the arrows B1 and B2. The washer 237, the metal washer 236, and the belleville spring 235 are sandwiched between the tilt chassis 220 and the joint 7. The belleville spring 235 generates an urging force in the direction of an arrow 242, and urges the metal washer 236 against the joint 7 via the washer 237. The metal washer 236 has a role of transmitting the urging force of the belleville spring 235 to the entire surface of the washer 237. If the metal washer 236 is not arranged, the belleville spring 235 bites into the washer 237, and a deflection amount required for the belleville spring 235 cannot be obtained. As a result, a required urging force cannot be generated.

When an appropriate urging force of the belleville spring 235 is obtained by the metal washer 236, a predetermined rotation torque is generated upon rotation of the tilt chassis 220 in the directions of the arrows B1 and B2. This rotation torque allows the camera head 2 and the joint 7 to be held at a position that the operator intended. The washer 237 consists of an ultra-high-molecular-weight polyethylene sheet which has a small frictional coefficient and a high wear resistance. Therefore, upon rotation of the tilt chassis 220, the belleville spring 235, the metal washer 236, and the washer 237 rotate together with the tilt chassis 220, and the washer 237 and the joint 7 slip with respect to each other. This is because the frictional force between the washer 237 and the joint 7 is smallest as compared to those of other portions.

The slide motion between the washer 237 and the joint 7 is smoother than that obtained between two metal members since they respectively consist of a resin sheet and a metal. The tilt shaft 239 is positioned with respect to holes 220c, 220d, and 220e of the tilt chassis 220 by cylindrical projections 239a and 239b and an arcuated projection 239d, and is fixed to the tilt chassis 220 by screws 241. A shaft portion 239c engages with a hole 7b of the joint 7, and serves as a rotation shaft in the directions of the arrows B1 and B2. On the other hand, the projection 239d of the tilt shaft 239 engages with an arcuated elongated hole 7c of the joint 7. When the tilt chassis 220 has rotated through 50° in the direction of the arrow B1 or through 105° in the direction of the arrow B2 with respect to the horizontal axis, the projection 239d contacts the corresponding end face of the elongated hole 7c, thus regulating the rotation. In this manner, the joint 7 including the camera head 2 can be rotated in the directions of the arrows B1 and B2.

The assembling order of the hinge 12 will be described below with reference to FIGS. 20 to 23.

Figure 20:
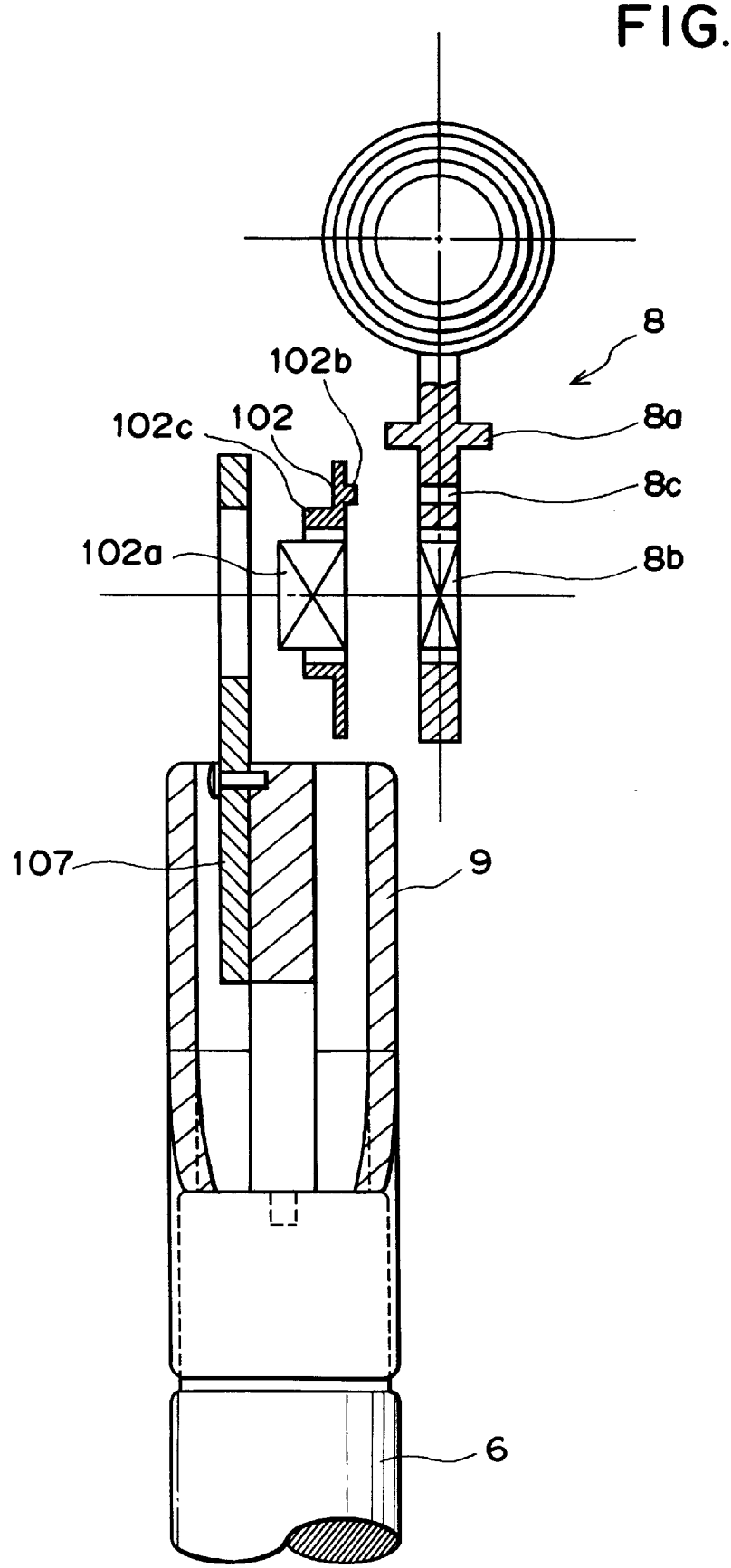
FIG. 20 is a view showing the assembling order of the second hinge portion in the embodiment of the present invention.

As shown in FIG. 20, the slide washer 102 is attached in correspondence with the hole 8b of the joint 8 (at this time, the projection 102b of the slide washer 102 is inserted in the positioning hole 8c of the joint 8, so that the slide washer 102 and the joint 8 are positioned with respect to each other, and cannot pivot with respect to each other). Thereafter, the rotation shaft portion 102c of the slide washer is fitted into the hole of the support plate 107 fixed in advance to the joint 9 by attachment screws and the like.

Figure 21:
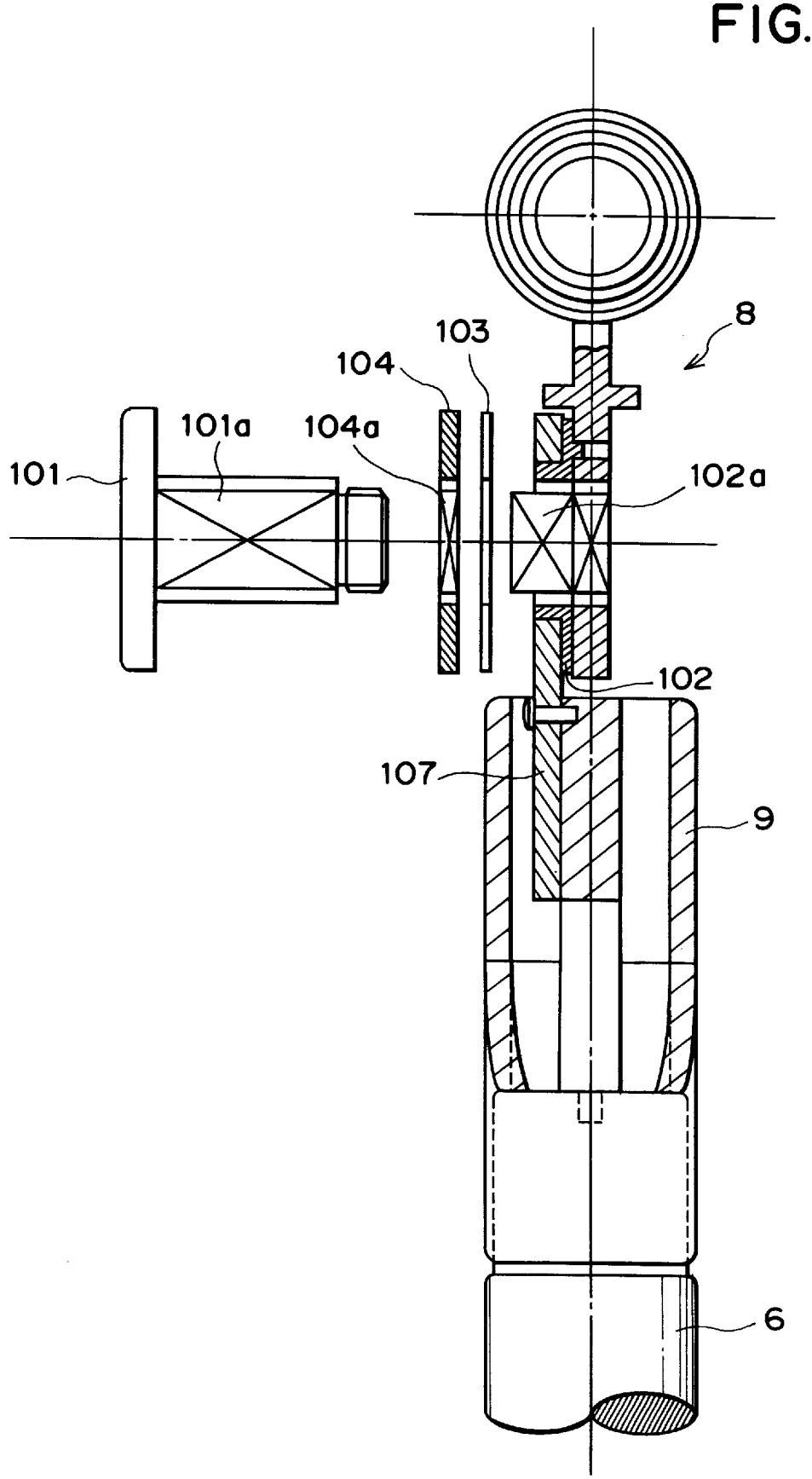
FIG. 21 is a view showing the assembling order of the second hinge portion in the embodiment of the present invention.

Subsequently, as shown in FIG. 21, the slide sheet 103 and the pivot washer 104 are fitted onto the projecting extended portions 102a, and furthermore, the metal pivot shaft 101 is inserted in a through hole. In this manner, a bearing portion on one side is completed.

Figure 22:
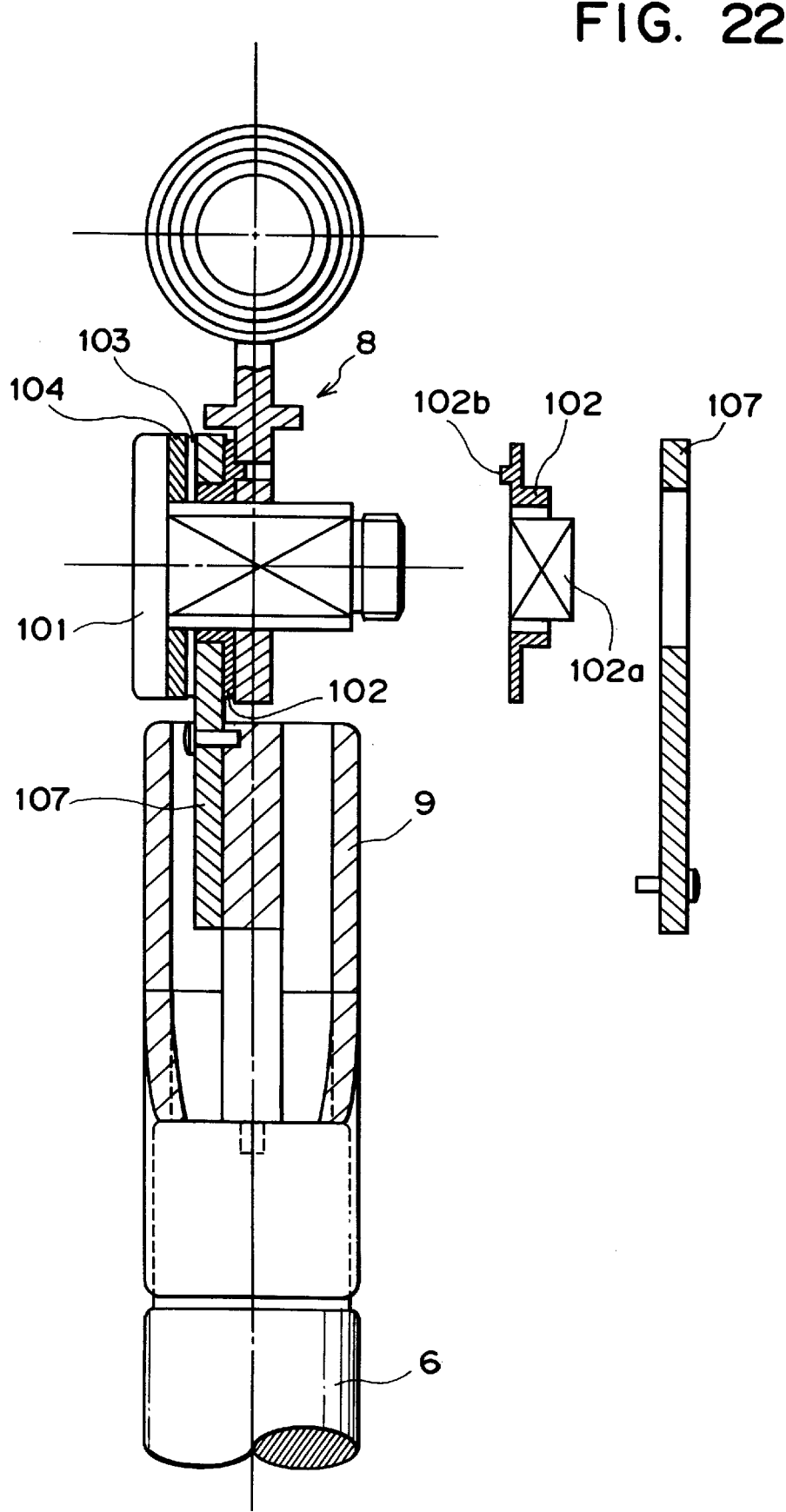
FIG. 22 is a view showing the assembling order of the second hinge portion in the embodiment of the present invention.

As shown in FIG. 22, the slide washer 102 on the opposite side is similarly attached to the joint 8 (at this time, the shaft portion of the metal pivot shaft 101 is inevitably inserted into the hole of the slide washer 102). Furthermore, the support plate 107 is attached by, e.g., attachment screws, thus completing the bearing portion on the opposite side.

Figure 23:
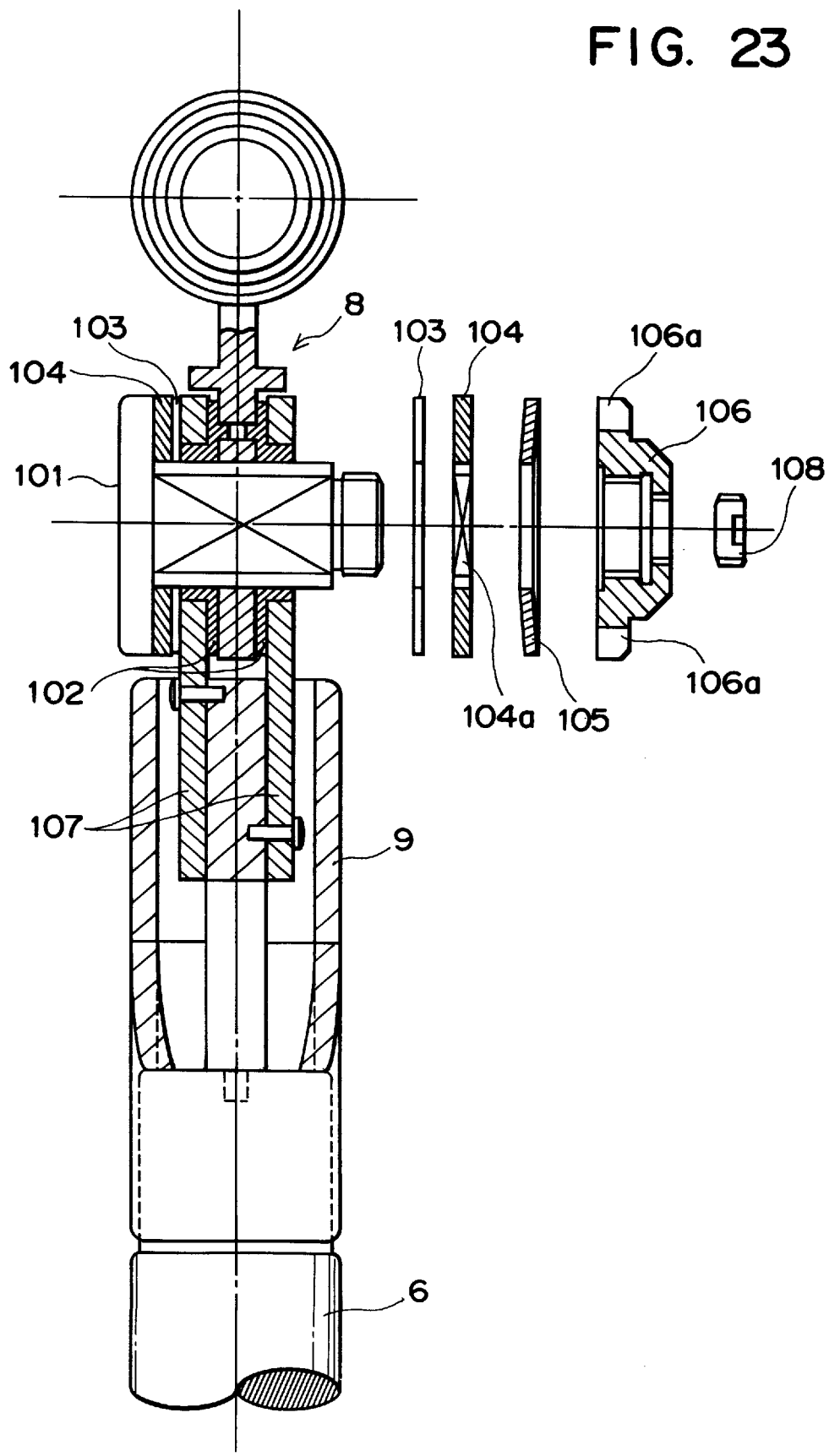
FIG. 23 is a view showing the assembling order of the second hinge portion in the embodiment of the present invention.

Subsequently, as shown in FIG. 23, the slide sheet 103, the pivot washer 104, and the belleville spring 105 are attached to the projecting shaft portion of the metal pivot shaft 101, and the metal nut 106 is tightened by a predetermined torque, thereby generating an axial force, in the thrust direction, of the pivot shaft. Furthermore, the set screw 108 is screwed into one end of the central portion of the metal nut 106 to stably generate a frictional force between the female screw portion of the metal nut 106 and the male screw portion of the metal pivot shaft 101, thus preventing the metal nut 106 from being loosened.

The torque generation mechanism of the hinge 12 will be explained below with reference to FIG. 24.

The metal nut 106 has, at two positions on its outer circumferential portion, the rotation groove portions 106a that can be accessed by a screwdriver tool or the like (in this embodiment, a fork tool). When the nut 106 is rotated clockwise by the fork tool, the belleville spring 105 is flexed gradually. By the repulsion force of the belleville spring 105, the joint 8 is pressed from the two surface sides. Note that each pivot washer 104 consists of a metal plate having rigidity (in this embodiment, a stainless steel material having a thickness of 1.6 mm). This material can prevent the pivot washer 104 from being flexed by the repulsion force generated by the belleville spring 105, and evenly distributes the force of the belleville spring 105 to the entire circumferential surface, thus enhancing the frictional force.

In the joint 8, frictional forces are generated at two positions, as will be described below, and a holding torque is generated. Since each slide washer 102 is fixed to the joint 8 by the projection 102b and the positioning hole 8c of the joint 8 so as not to be pivotal, the support plate 107 and the slide washer 102 slide against each other, and a frictional force is generated between their contact surfaces. Since the pivot washer 104 is fitted on the metal pivot shaft 101 by its flat portions 104a and pivots integrally with the shaft 101, the slide sheet 103 sandwiched between them slides together with one of the support plate 107 and the pivot washer 104, thus generating a frictional force.

At this time, since the slide sheet 103 is free to pivot, and the support plate 107 and the pivot washer 104 consist of the same material (stainless steel material), they have substantially the same frictional coefficients. For this reason, the frictional forces generated on the two surfaces of the slide sheet 103 approximately equal each other. As a result, although the slide surface is formed between the support plate 107 and the slide washer 102 or between the slide sheet 103 and the pivot washer 104 depending on a slight difference in roughness of the slide surface or environmental conditions such as temperature, humidity, and the like, the holding torque generated is hardly influenced by the position of the slide surface.

The holding torque to be generated depends on the pressing force in the axial direction. The pressing force depends on the compression amount of the belleville spring 105. For this reason, in order to obtain a required holding torque, the rotation amount of the nut 106 can be adjusted. In this embodiment, the holding torque is generated by inserting the belleville spring 105 on the right side in FIG. 24. Also, a second belleville spring may be inserted between the collar portion of the pivot shaft 101 and the pivot washer 104 on the left side in FIG. 24. With this arrangement, the spring constant of the hinge portion lowers, and the torque adjustment by tightening the metal nut 106 is facilitated very much, thus allowing fine adjustment.

Note that each slide washer 102 has an L-shaped section, and the rotation shaft portion 102c is inserted between the circular hole of the support plate 107 and the pivot shaft 101. This is to prevent wear of two metal members when the support plate 107 and the pivot shaft 101 are in direct and sliding contact with each other. A rotation means for rotating the metal nut 106 is not limited to the fork tool, but a special-purpose jig or tool utilizing a hexagon torque wrench, a screwdriver, or the like may be used. The set screw is similarly tightened by a hexagon torque wrench (not shown) in this embodiment, but may be tightened by a general screwdriver or a special-purpose jig or tool.

The loosening prevention mechanism of the hinge 12 will be explained below with reference to FIGS. 24 and 25. In this case, since the structure on the right side of the central line of the plane of the drawing in FIG. 24 is exclusively related to this mechanism, the following description will be given with reference to only the right side of the central line in FIG. 24.

The flat portions 104a formed on the two inner surfaces of the central portion of the pivot washer 104 have a width larger than that of the flat portions 101a formed on the shaft portion of the metal pivot shaft 101. The tongue-shaped extended portions 102a of the slide washer 102 are fitted in gaps defined by these shaft and hole. This structure prevents the nut 106 from rotating in the direction to loosen, as will be described below.

When the joint 8 pivots, the pivot washer 104 rotates together with the pivot shaft 101. If a structure in which the pivot washer 104 is not driven by the joint 8 is adopted, the pivot washer 104 stands still and the metal nut 106 receives a frictional force for stopping the nut 106 via the belleville spring 105 and a frictional force for pivoting the nut 106 via the screw portion of the pivot shaft 101. If the frictional force for stopping the nut 106 is larger than the other frictional force, the nut 106 and the pivot shaft 101 easily rotate relative to each other, and the nut 106 undesirably rotates in the direction to loosen little by little upon repetition of the pivotal motion. As a result, the holding torque decreases.

When the metal nut 106 and the pivot washer 104 begin to pivot via the belleville spring 105, since the belleville spring 105 consists of a metal, the slide surfaces are easily damaged depending on the surface precision of these members, and the frictional coefficient may gradually increase, resulting in an increase in torque change. In view of this problem, a structure for forcibly avoiding sliding contact between two metal surfaces is adopted.

However, in general, in a method wherein flat portions are formed on the hole of the pivot washer 104 and flat portions of the pivot shaft 101 are fitted in the hole in correspondence with these flat portions so as to prevent the pivot washer 104 from pivoting, a small gap is often formed between the hole and the shaft, which are fitted to each other, due to limitation on the working precision. Owing to fit play generated by the small gap, a frictional force for stopping rotation of the metal nut 106 acts on the metal nut 106, and consequently, the nut 106 undesirably rotates in the direction to loosen. In view of this problem, in this embodiment, since the slide washer 102 is a resin molded product, the extended portions 102a are formed by extending portions of the washer 102, as described above. By fitting the pivot washer 104 onto these extended portions 102a with a light pressure, the abovementioned fit play can be eliminated, and the metal nut 106 can be prevented from rotating in the direction to loosen (FIG. 25).

The pivot angle of the hinge 12 will be described below with reference to FIG. 26.

The above-mentioned joint 8 has the arcuated rib portion 8a, which constitutes a stopper for regulating the pivot angle when it contacts one of the projections 107a of the support plate 107. More specifically, when the joint 8 pivots, since the rib portion 8a contacts one of the projections 107a, the joint 8 can no longer pivot. The pivot angle at that time is the maximum pivot angle $\Omega(C1)$ or $\Omega(C2)$. Needless to say, a desired pivot angle can be obtained by appropriately changing the position of the rib portion 8a or the projections 107a.

The assembling order of the hinge 15 will be explained below with reference to FIGS. 28 to 31.

Figure 28:
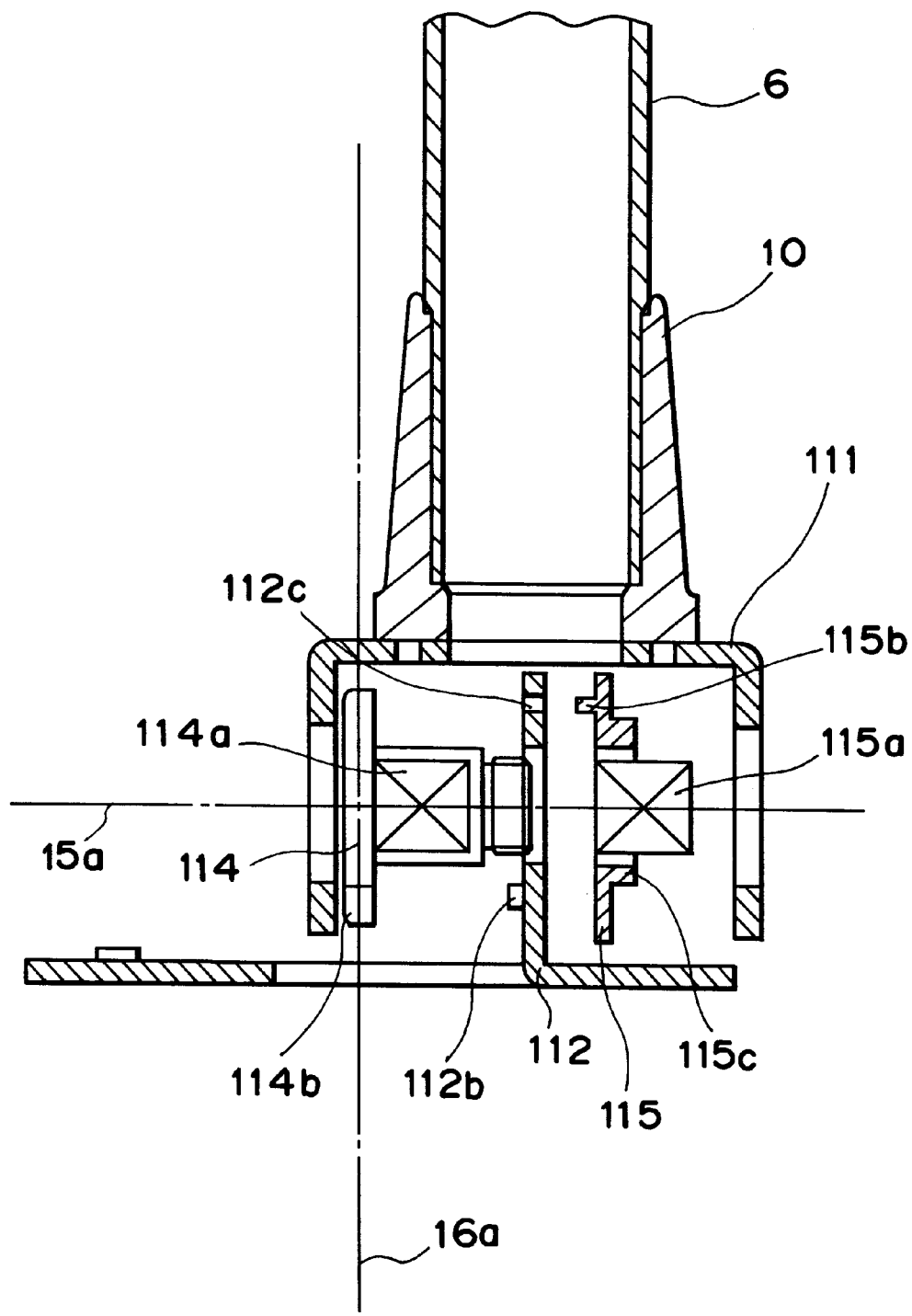
FIG. 28 is a view showing the assembling order of the third hinge portion in the embodiment of the present invention.

As shown in FIG. 28, the support shaft 114 is inserted into the hole formed on the rotation support flat portion of the base plate 112 from the inner side. Then, the support shaft 114 is inserted, via the slide washer 115, into the hole of one of the flat portions bent on the two sides of the pivot plate 111, to which the joint 10 is fixed. At this time, as described above, the support shaft 114 and the base plate 112 are positioned with respect to each other since the U-shaped groove 114b formed on a portion of the collar portion of the support shaft 114 is fitted on the circular projection formed on the base plate 112, so that they do not pivot with respect to each other. As in the hinge 12, the slide washer 115 is positioned with respect to the base plate 112 since the projection 115b is inserted in the hole 112c of the base plate 112, so that they do not pivot with respect to each other.

Figure 29:
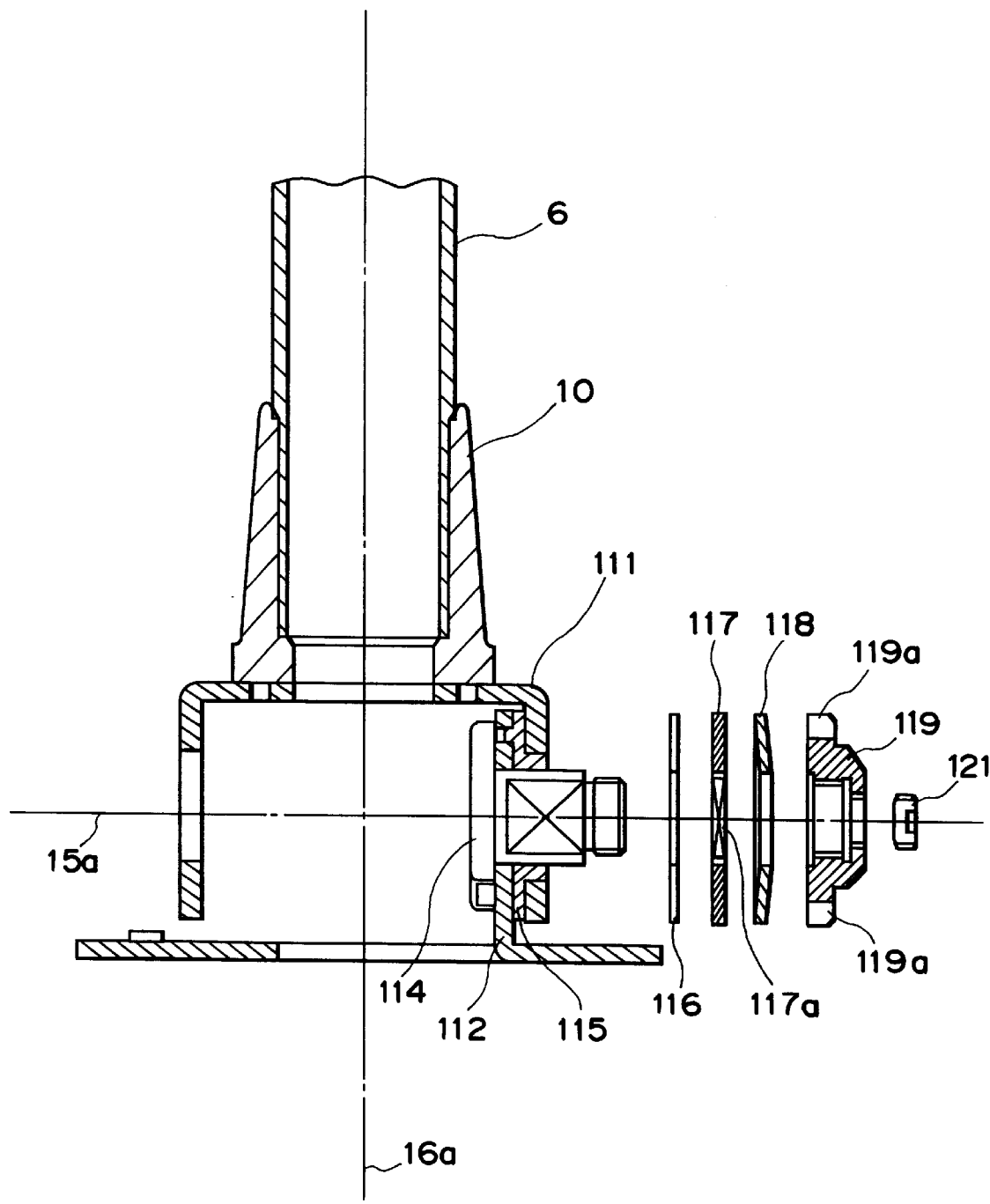
FIG. 29 is a view showing the assembling order of the third hinge portion in the embodiment of the present invention.

As shown in FIG. 29., the slide sheet 116, the stationary washer 117, and the belleville spring 118 are fitted on the extended portions 115a (not shown in FIG. 29 since they are located on the rear side of the support shaft 114 in FIG. 29) projecting from the slide washer 115, and the metal nut 119 is attached to the screw portion of the support shaft 114. In this case, the metal nut is tightened by a predetermined torque to generate a predetermined torque by one bearing portion. hereafter, the set screw 121 is screwed into one end of the metal nut 119, thus preventing loosening. In this manner, the bearing portion on one side is completed.

Figure 30:
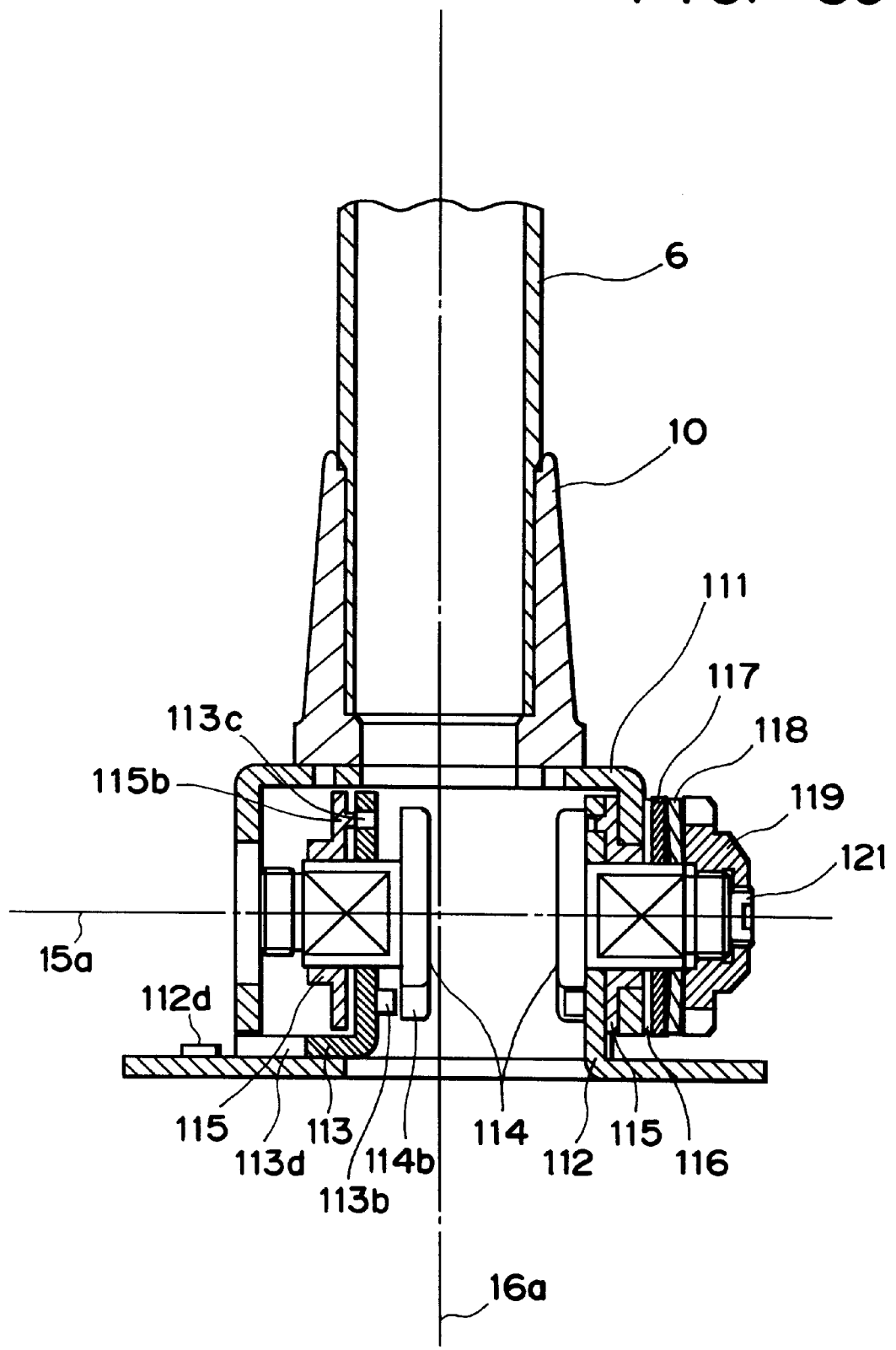
FIG. 30 is a view showing the assembling order of the third hinge portion in the embodiment of the present invention.

Furthermore, as shown in FIG. 30, the other support shaft 114 is inserted into the hole of the rotation support flat portion of the base auxiliary plate 113, and the base auxiliary plate 113 is attached to the base plate 112 via the slide washer 115 by roughly positioning the base auxiliary plate 113 using the positioning projection 112d and the notch 113d. Note that the longitudinal dimension (axial direction) of the support shaft 114 is set to be almost ½ the width of the flat portions bent on the two sides of the pivot plate 111, so the base auxiliary plate 113 and the slide washer 115 can be assembled after the bearing portion on one side has been completed.

As in the bearing portion on the opposite side, the support shaft 114 and the base auxiliary plate 113 are positioned with respect to each other since the U-shaped groove 114b formed on a portion of the collar portion of the support shaft 114 is fitted on the circular projection 113b formed on the base auxiliary plate 113, so that they do not pivot with respect to each other.

As for the slide washer 115 as well, the slide washer 115 and the base auxiliary plate 113 are positioned with respect to each other since the projection 115b is inserted into the hole 113c of the base auxiliary plate 113, so that they do not pivot with respect to each other.

Figure 31:
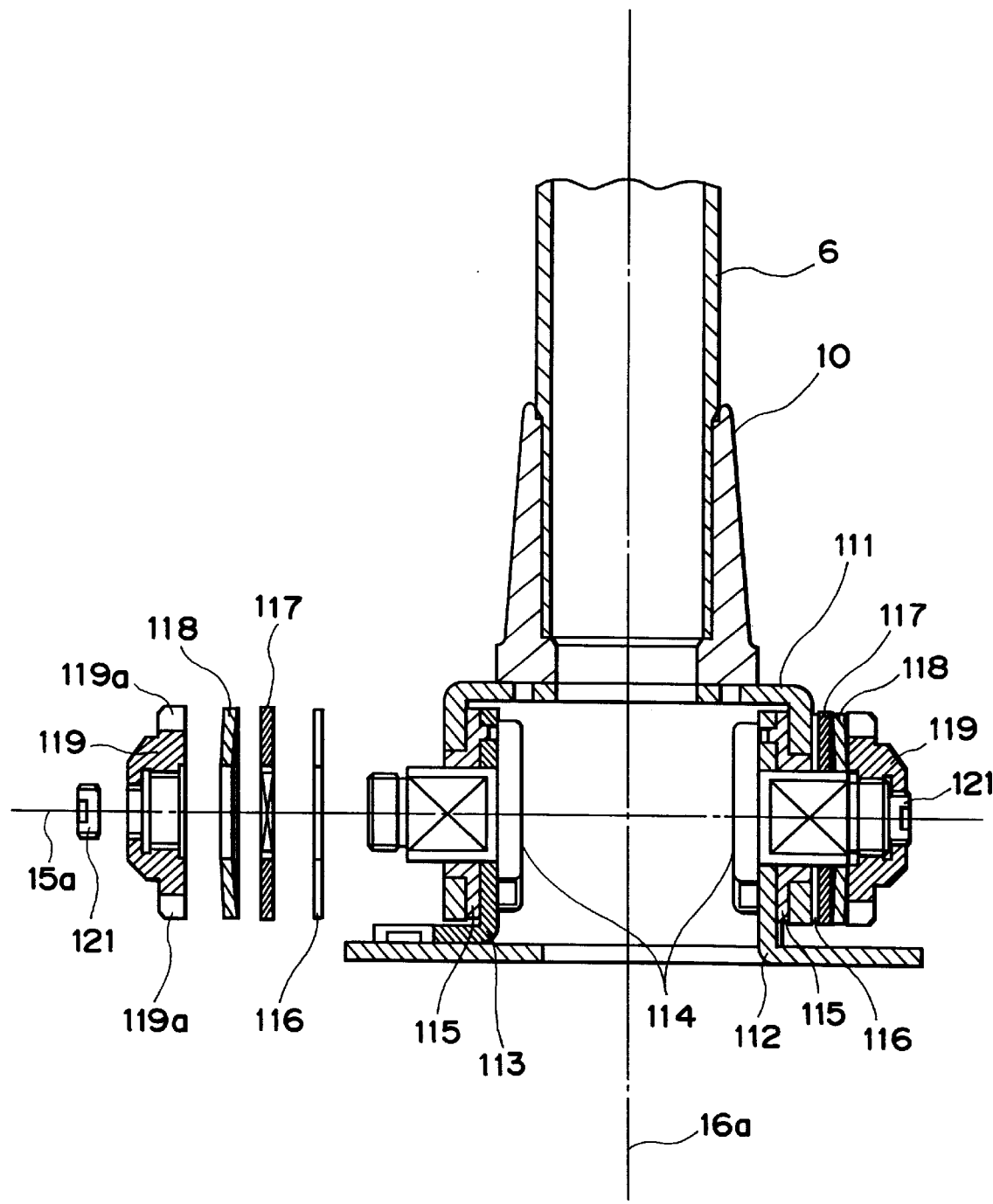
FIG. 31 is a view showing the assembling order of the third hinge portion in the embodiment of the present invention.

Subsequently, as shown in FIG. 31, the slide sheet 116, the stationary washer 117, and the belleville spring 118 are fitted on the extended portions 115a (not shown in FIG. 31 since they are located on the rear side of the support shaft 114 in FIG. 31) projecting from the slide washer 115, and the metal nut 119 is attached to the screw portion of the support shaft 114. In this case, the metal nut is tightened by a predetermined torque to generate a predetermined torque by one bearing portion. Thereafter, the set screw 121 is screwed into one end of the metal nut 119, thus preventing loosening. In this case, since the set screw 121 is screwed into one end of the metal nut 119, a large frictional force is always generated between the female screw portion of the metal nut 119 and the male screw portion of the metal support shaft 114, thereby preventing the metal nut 119 from loosening.

In this manner, the bearing portions on the two sides are completed, and the torque of the hinge portion is determined by a synthetic torque of these bearing portions. Furthermore, in this state, the base plate 112 and the base auxiliary plate 113 are securely fixed by screws (not shown). As described above, in this embodiment, the notch 113d has a U shape, and moves in the direction of the central axis 15a upon attachment (in the direction of an arrow in FIG. 33). Thus, the parts working precision of the pivot plate 111 can be absorbed upon assembling (see FIG. 33).

More specifically, after one bearing portion is assembled and its torque is set, the other bearing portion is assembled and attached, thus realizing an arrangement independent from the bending precision of the pivot plate 111. Thus, since the required parts working precision of the pivot plate 111 is relaxed, a low-cost hinge portion can be provided.

As the functions of the hinge portion at the base portion of the arm, the rotation functions in both the tilt direction (the rotation direction about the central axis 15a as the rotation axis) and the pan direction (the rotation direction about the central axis 16a as the rotation axis) must be provided. Since the hinge 15 has bearing portions at its two ends, as described above, an appropriate space can be assured in substantially the central portion of the pivot plate 111, thus allowing easy layout of the cable. As a result, durability upon rotation of the cable can be improved, and the hinge portion can be rendered compact, thus providing an apparatus with high reliability.

The torque generation mechanism of the hinge 15 will be described below with reference to FIG. 32.

The metal nut 119 has, at two positions on its outer circumferential portion, the rotation grooves 119a (see FIG. 27) to be accessed by a screwdriver tool or the like (in this embodiment, fork tool). When the metal nut 119 is rotated clockwise, the belleville spring 118 is flexed gradually. Then, by the repulsion force of the belleville spring 118, the pivot plate 111 is pressed from the two surface sides. Note that the stationary washer 117 consists of a metal plate having rigidity (in this embodiment, a stainless steel material having a thickness of 1.6 mm). This material can prevent the stationary washer 117 from being flexed by the repulsion force generated by the belleville spring 118, and evenly distributes the force of the belleville spring 118 to the entire circumferential surface, thus enhancing the frictional force.

In the pivot plate 111, frictional forces are generated at two positions, as will be described below, and a holding torque is generated. Since the slide washer 115 is fixed to the base plate 112 so as not to be pivotal, as described above, the pivot plate 111 and the slide washer 115 slide against each other to generate a frictional force between their contact surfaces.

Since the slide sheet 116 is free to pivot, and the pivot plate 111 and the stationary washer 117 consist of the same material (stainless steel material), they have substantially the same frictional coefficients. For this reason, the frictional forces generated on the two surfaces of the slide sheet 116 nearly equal each other. As a result, although the slide surface is formed between the pivot plate 111 and the slide sheet 116 or between the slide sheet 116 and the stationary washer 117 depending on a slight difference in roughness of the slide surface or environmental conditions such as temperature, humidity, and the like, the holding torque generated is hardly influenced by the position of the slide surface.

The holding torque to be generated depends on the pressing force in the axial direction. The pressing force depends on the compression amount of the belleville spring 118. In order to obtain a required holding torque, the rotation amount of the nut 119 can be adjusted. Note that the slide washer 115 has an L-shaped section, and its rotation shaft portion 115c is inserted between the circular hole of the pivot plate 111 and the metal support shaft 114. This is to prevent wear of two metal members when the pivot plate 111 and the support shaft 114 are in direct and sliding contact with each other.

The above description has been made in association with one bearing portion. The same applies to the other bearing portion.

The loosening prevention mechanism of the hinge 15 will be explained below with reference to FIG. 32.

As described above, the flat portions 117a (see FIG. 27) of the stationary washer 117 have a width larger than that of the flat portions 114a formed on the shaft portion of the support shaft 114. The tongue-shaped extended portions 115a of the slide washer 115 are fitted in gaps defined by these shaft and hole. This structure prevents the nut 119 from rotating in the direction to loosen, as will be described below.

When the pivot plate 111 pivots, the frictional force is transmitted to the stationary washer 117 via the sliding sheet 116 to pivot the washer 117. If the stationary washer 117 is free to pivot, the frictional force is transmitted to the nut 119 via the belleville spring 118. Although a frictional force is generated between the nut 119 and the screw portion of the support shaft 114, if the frictional force transmitted from the pivot plate 111 is larger than this frictional force even slightly, the nut 119 rotates little by little in the direction to loosen upon repetition of the pivotal motion. As a result, the holding torque decreases. In view of this problem, a structure for forcibly avoiding sliding contact between two metal surfaces is adopted.

However, in general, in a method wherein flat portions are formed on the hole of the stationary washer 117 and flat portions of the support shaft 114 are fitted in the hole in correspondence with these flat portions so as to prevent the stationary washer 117 from pivoting, a small gap is often formed between the hole and the shaft, which are fitted to each other, due to limitation on the working precision. Owing to fit play generated by the small gap, a frictional force for stopping rotation of the metal nut 119 acts on the metal nut 119, and consequently, the nut 119 undesirably rotates in the direction to loosen. In view of this problem, in this embodiment, since the slide washer 115 is a resin molded product, portions of the slide washer 115 are extended, and the stationary washer 117 is fitted on the extended portions with a light pressure, thereby eliminating the fit play and preventing the metal nut 119 from rotating in the direction to loosen.

If the torque lowers, the detachable blindfold cover 120 is detached, and the nut 119 is tightened stronger using a fork tool, thus increasing the holding torque again. A rotation means for rotating the nut 119 is not limited to the fork tool, but a special-purpose jig or tool utilizing a hexagon torque wrench, a screwdriver, or the like may be used.

The pivot angle of the hinge 15 will be explained below with reference to FIG. 34.

The projections 111a of the above-mentioned pivot plate 111, the tongue portions 112a of the base plate 112, and the tongue portions 113a of the base auxiliary plate 113 constitute stoppers for regulating the pivot angles. More specifically, when the pivot plate 111 pivots, since the projections 111a contact the tongue portions 112a and 113a, the pivot plate 111 can no longer pivot. The pivot angle at that time is the maximum pivot angle $\Omega(D1)$ or $\Omega(D2)$. Needless to say, a desired pivot angle can be obtained by appropriately changing the positions of the projections 111a or the tongue portions 112a and 113a.

The pivotal motion of the pivot portion 16 will be described below with reference to FIG. 34.

The slide shaft 130, to which the base plate 112 of the above-mentioned hinge 15 is fixed, is fitted in the round hole of the main body base 14 to be pivotal about the axis 16a, and the pan plate 133 is fixed from below to the slide shaft 130 via the washer 131 and the wave washer 132. When the wave washer 132 is flexed, the slide shaft 130 is pressed against the main body base 14 by the repulsion force of the washer 132 to generate a friction force, thereby generating a torque upon pivotal motion. As has been described above in the paragraphs of the camera head 2, since the washer 131 and the wave washer 132 slip against each other in accordance with the frictional force acting therebetween, a smooth slide motion can be obtained.

The bottom surface of the base plate 112 of the hinge 15 is circular. Although not shown, a portion of the circular bottom surface projects in the planar direction. Also, the slide surface, with respect to the slide shaft 130, of the main body base 14 also partially projects (14*a*). When the main body base 14 pivots, the above-mentioned projections contact each other to serve as a stopper for regulating the pivotal motion. In this embodiment, the positions of these projections are determined so that the pivot angle of the second pivot portion 16 becomes 180°. Of course, the present invention is not limited to this.

The support shaft 130 has a central through hole, and the main cable 25 that extends inside the arm 6 passes through this through hole. Furthermore, the hinge 15 also has a central hollow space, as described above, and does not disturb the route of the main cable 25. For this reason, no excessive force acts on the cable in the hinge 15 and the second pivot portion 16.

The internal structure of the main body base 14 will be described below with reference to FIG. 35.

Referring to FIG. 35, the main cable 25 extends through the arm 6, the joint 10, and the hole 245*a* of the ballast 245, and is fixed to the ballast 245 by the metal clamp 247. The metal clamp 247 has a roughly arcuated portion 247*a* and a roughly sawtooth-shaped portion 247*b*. The metal clamp 247 clamps a conductive copper foil tape 25*d* portion of the main cable 25 by its roughly arcuated portion 247*a*, and the roughly sawtooth-shaped portion 247*b* bites into the sheath of the main cable 25, thus preventing the main cable 25 from being removed even when it is pulled in the direction of an arrow 253.

Furthermore, the main cable 25 is released from the constraint of the tape 25*d*, and is separated into signal lines 25*e*. These signal lines 25*e* pass through a hole (not shown) of the main circuit board 248, and are connected to a connector arranged on a solder surface of the main circuit board 248. The solder surface of the main circuit board 248 also has an adjustment connector (not shown). In the final form with all the components except for the rear cover 249, the electrical final adjustment of, e.g., synchronization of signals, the color tone of an image, and the like can be made using the adjustment connector.

Since the main cable 25 is separated into the respective signal lines 25*e* from the position of the tape 25*d*, the signal lines 25*e* can be folded in a narrow space, as shown in FIG. 35. In this case, the respective signal lines 25*e* are easily influenced by noise since they are not particularly shielded. In this embodiment, a leg portion 245*c* of the ballast 245 is fixed to the chassis 253 by a screw. The chassis 253 is connected to a power supply earth via the main circuit board 248, and the ballast 245 consists of a zinc-based material since it serves as a weight. Therefore, the ballast 245 is connected to the power supply earth via the screw.

With this structure, the respective signal lines 25*e* are shielded by the ballast 245 and the chassis 253. The same applies to the main circuit board 248, i.e., the main circuit board 248 is shielded from noise by the chassis 253 and the ballast 245. Since the tape 25*d* fixes the shield material inside the sheath of the main cable 25, the shield material of the main cable 25 is connected to the ballast 245 via the tape 25*d*, and is grounded to the power supply earth. With this structure, the entire main cable 25 is shielded, i.e., is strong against noise. The ballast 245 has not only a role of a weight but also a role of the shield material, as described above, and its surface is silver in color. Therefore, in the square hole 245*b*, the ballast itself serves as a reflection surface for amplifying the amount of light emitted by the power LED 246, so that bright light with high visibility can be output from the power LED lens 18.

The main body base 14 is provided with the AGC switch 19, the negative/positive reversal switch 20, the microphone mute switch 21, and the WB switch 22. The negative/positive reversal switch 20 will be described below. The negative/positive reversal switch 20 is constituted by the negative/positive selection switch button 250, the coil spring 251, and the ring 252. When the operator depresses the negative/positive selection switch button 250, a tact switch 248*a* on the main circuit board 248 is turned on, thereby switching the image between negative and positive modes.

The image input apparatus of this embodiment can be attached to a tripod for a still camera or video camera by the screw portion 249*a* for a tripod and the hole 249*b* for receiving a pin for preventing rotation on the rear cover 249. Thus, the image input apparatus can be set not only on the desk but also in a place required by the operator using the tripod.

Furthermore, in the image input apparatus of this embodiment, even when the main cable 25 is disconnected by bending during use, and an image cannot be output, the main cable 25 can be exchanged as follows. More specifically, the rear cover 249 is detached, the connector of the main cable 25 is disconnected from the main circuit board 248, and the chassis 253 is detached from the main body base 14 vertically downward. The metal clamp 247 is detached from the ballast 245, and the portion, exposed from the joint 7, of the main cable 25 is pulled in the direction of the arrow 253 to remove the cable 25 from the arm 6. Then, the main cable 25 fixed to the camera head 2 and the head base 3 is detached, and the portion, exposed from the joint 7, of the main cable 25 is pulled to remove the cable 25 from the arm 5. In this manner, the disconnected main cable 25 can be removed, and can be exchanged with a new cable.

The embodiment, typical operation examples, and the like of the apparatus of the present invention have been described. As can be understood from the above description, the apparatus of the present invention has many advantages. These advantages will be summarized below.

(1) Each pivot or hinge portion in the first to third joint portions is constituted not to generate a spring back in the rotation direction, and can stand still at an arbitrary rotation angle. With this structure, the camera head can be prevented from being displaced upon movement of the camera head, and the camera head can be quickly moved to a position that the operator intended.

(2) When a general document photographing operation for fully displaying, e.g., an image of an A4-size original on the monitor screen is performed, the apparatus of this embodiment is set in a form in which the second column is set to be perpendicular to the base, the first column is set to be parallel to the base, and the camera head is set to face immediately downward, in other words, a form in which the base and the second column form right angles, the second and first columns form right angles, and the first column and the camera head form right angles. Since this form can be easily recognized and remembered by the operator, the general document photographing operation can be quickly performed. Even when the original size is not A4 size, e.g., when the original size is smaller than A4 size, the apparatus can be temporarily set in the abovementioned form, and thereafter, the camera head can be moved immediately downward. On the contrary, when the original size is larger than A4 size, the camera head can be moved immediately upward. In these cases, the document photographing operation can be performed very quickly as compared to the conventional apparatus.

(3) In the document photographing mode, in order to set an original at a position where the original is easy to read for the operator, the original must be placed to face the operator side. This placing direction of the original is opposite to the direction of an object in the portrait photographing mode. However, in the apparatus of this embodiment, since the camera head can be pivoted through 250° in the circumferential direction of the lens by the first pivot portion, the camera head is pivoted through 180° so as to adjust the vertical position of the CCD in correspondence with that of the original upon switching from the portrait photographing mode to the document photographing mode, so that an original is normally displayed on the monitor. With this structure, the original can be placed in the direction in which the original is easy to read for the operator in the document photographing mode.

(4) In the apparatus of this embodiment, the first pivot portion comprising the camera head is pivoted about the first hinge portion through 50° vertically upward with respect to the first column, the first column is pivoted about the second hinge portion until it becomes parallel to the second column, and the second column is set to be substantially perpendicular to the base, thus realizing a form almost falling within the projected range of the base. According to this form, the apparatus can be made compact, and the first and second columns which extend substantially parallel to each other can be held by one hand. With this structure, the operator can easily carry the apparatus of this embodiment with his or her one hand.

The specific numerical values such as angles and the like in the above embodiment can be appropriately changed within the scope of the present invention, and optimal values may be selected in correspondence with an actual use condition.

In the above embodiment, in particular, the structure around the joint portion for coupling the columns, the cable lay structure or method, and the like can be effectively applied to an electronic equipment or electronic apparatus which can adopt the structure of this type. For example, in an illumination apparatus such as a desk lamp, a medical equipment, or the like, a distal end member is set at a desired position via a column with respect to a base end member, and these members are connected via a cable.

As described above, according to this embodiment, in an image input apparatus of this type, since the camera head can be easily and adequately moved to and fixed at a desired position, very easy handling and high operability can be realized, and convenience can be greatly improved. The degree of freedom in setting the camera head is increased, and various photographing modes can be effectively set. In addition, in each photographing mode, a proper, high-quality image can be obtained. Since the apparatus form is easy to use and is compact, it is very convenient to use and store the apparatus. Furthermore, the apparatus is compact but has high durability. Therefore, a high-quality image can be guaranteed over a long period of time.

According to this embodiment, in an image input apparatus which comprises a camera unit for inputting an image, a cable for transmitting information from the camera unit, a support portion for supporting the camera unit, a base for pivotally supporting the support portion, and a pivot support mechanism arranged between the support portion and the base, the camera unit is stably supported by the base via the pivot support mechanism. In this case, since an opening portion through which the cable extends is formed on a coupling portion of a support member in the pivot support mechanism, the cable can be efficiently stored inside the apparatus, thus making the apparatus compact. Since an optimal layout of the cable is realized, no stress acts due to twisting or bending of the cable upon operation of the camera. Thus, the durability can be improved, and an image input apparatus with high reliability can be realized.

In the operation of the pivot support mechanism of this embodiment, since pivotal motion is made while generating an appropriate pivot torque, the camera head can be adequately located at a desired position, and a pivot support mechanism with high reliability can be realized.

Furthermore, since one torque generation means is adjustable, a low-cost pivot support mechanism can be realized.

As many apparently widely different embodiments of the present invention can be made without departing from the spirit and scope thereof, it is to be understood that the invention is not limited to the specific embodiments thereof except as defined in the appended claims.

What is claimed is:

1. An image input apparatus comprising a camera unit for inputting an image, a support portion for pivotally supporting said camera unit, a base for supporting said support portion, and a pivot support mechanism arranged between said camera unit and said support portion, wherein said pivot support mechanism comprises:
a first support member having two opposing projections;
a second support member arranged between the two projections;
a pair of clamping members arranged to clamp the two projections between said support members and themselves; and
torque generation means for generating a predetermined torque between said second support member, said clamp members, and the projections, and wherein said torque generation means comprises;
a first slide member arranged between the projections of said first support member and an end portion of said second support member;
a second slide member arranged between the projections and said clamping
clamping force generation means for generating a clamping force between said second support member and said clamping members.

2. The apparatus according to claim 1, wherein said second support member and said clamping members are coupled via a screw member and said clamping members are coupled via a screw arranged at a pivot center.

3. The apparatus according to claim 2, wherein said first support member is arranged in said support portion, and said second support member is arranged on a side of said camera unit.

4. The apparatus according to claim 3, wherein said camera unit and said second support member are coupled to each other via a coupling member.

5. The apparatus according to claim 1, wherein said clamping force generation means comprises:
tightening means for tightening from a position outside said pair of clamping members; and urging means arranged between said tightening means.

6. The apparatus according to claim 5, wherein said urging means is arranged outside at least one of said clamping members.

7. The apparatus according to claim 6, wherein said urging means comprises a belleville spring, said second slide member comprises a sheet-shaped member, and a metal plate is arranged between said urging means and said second slide member.

8. A pivot support mechanism, which is arranged between the first and second members, and supports said first and second members to bt pivotal relative to each other, comprising:
   a first support member having two opposing projections;
   a second support member arranged between the two projections;
   a pair of clamping members arranged to clamp the two projections between said second support members and themselves; and
   torque generation means for generating a predetermined torque between said second support member, said clamp members, and the projections,
   wherein said torque generation means comprises:
   a first slide member arranged between the projections of said first support member and an end portion of said second support member;
   a second slide member arranged between the projections and said clamping members; and
   clamping force generation means for generating a clamping force between said second support member and said clamping members.

9. The apparatus according to claim 8, wherein said second support member and said clamping members are coupled via a screw arranged at a pivot center.

10. The mechanism according to claim 8, wherein said clamping force generation means comprises:
    tightening means for tightening from a position outside said pair of clamping members; and
    urging means arranged between said tightening means.

11. The mechanism according to claim 10, wherein said urging means is arranged outside at least one of said clamping members.

12. The mechanism according to claim 11, wherein said urging means comprises a belleville spring, said second slide member comprises a sheet-shaped member, and a metal plate is arranged between said urging means and said second slide member.

13. An image input comprising a camera unit for inputting an image, a cable for transmitting information from said camera unit, a support portion for pivotally supporting said camera unit, a base for supporting said support portion, and a pivot support mechanism arranged between said camera unit and said suporting portion,
    wherein said pivot support mechanism comprises :
    a first support member having two opposing projections;
    a second support member which is a planar member having a U-shaped section, and has two end portions engaging with the two projections and a coupling portion for coupling the two end portions; and
    torque generation means arranged between said first and second support members, and
    the coupling portion is formed with an opening portion through which said cable extends,
    wherein said torque generation means comprises:
    a first slide member arranged between the projections of said first support member and an end portion of said second support member;
    a second slide member arranged to clamp the end portion of said second support member by said first slide member; and
    clamping force generation means for generating a clamping force between said first and second slide members.

14. The apparatus according to claim 13, wherein said support portion comprises a pipe-shaped member, and said cable extends through said support portion.

15. The apparatus according to claim 14, wherein said first support member is arranged on said base, and said second support member is arranged on said support portion.

16. The apparatus according to claim 13, wherein one of the two projections comprises a member, a position of which is adjustable with respect to said first support member.

17. The apparatus according to claim 13, wherein said clamping force generation means comprises:
    tightening means for tightening from a position outside said pair of clamping members; and
    urging means arranged between said tightening means.

18. The apparatus according to claim 17, wherein said urging means is arranged on a side of said second slide members.

19. The apparatus according to claim 18, wherein said urging means comprises a belleville spring, said second slide member comprises a sheet-shaped member, and a metal plate is arranged between said urging means and said second slide member.

20. A pivot support mechanism, which is arranged between first and second members, and supports said first and second members to be pivotal relative to each other, comprising:
    a first support member having two opposing projections;
    a second support member which is a planar member having a U-shaped section, and has two end portions engaging with the two projections and a coupling portion for coupling the two end portions; and
    torque generation means arranged between said first and second support members,
    wherein said torque generation means comprises: a
    first slide member arranged between the projections of sid first support member and an end portion of said second support member;
    a second slide member arranged to clamp the end portion of said second support member by said first slide member; and
    clamping force generation means for generating a clamping force between said first and second slide members.

21. The mechanism according to claim 20, wherein said clamping force generation means comprises:
    tightening means for tightening from a position outside the projections of said first support members and said second slide member; and
    urging means arranged between said tightening means.

22. The mechanism according to claim 21, wherein said urging means is arranged on a side of said second slide member.

23. The mechanism according to claim 22, wherein said urging means comprising a belleville spring, said second slide member comprises a sheet-shaped member, and a metal plate is arranged between said urging means and said second slide member.

24. The apparatus according to claim 20, wherein one of the two projections comprises a member which is attached to said first support member so that a position thereof is adjustable.

* * * * *

UNITED STATES PATENT AND TRADEMARK OFFICE
CERTIFICATE OF CORRECTION

PATENT NO.   : 5,933,191
DATED        : August 3, 1999
INVENTOR(S)  : Kazuto Ariga et al.

It is certified that error appears in the above-identified patent and that said Letters Patent is hereby corrected as shown below:

Column 16,
Line 13, after "view" delete "- ".
Line 37, after "pivotal" delete "- ".

Column 23,
Line 49, delete "$\Omega(E2)$" and insert therefor --- $\theta(E2)$ --.
Line 52, after "the" delete "15".
Line 57, delete $\Omega(E2)$" and insert therefor -- $\theta(E2)$ --.

Column 24,
Line 28, after "90" insert -- ° --.

Column 30,
Line 17, after "portion" delete "hereafter," and insert therefor -- Thereafter --.

Column 32,
Line 19, after "the" delete "- ".

Column 34,
Line 37, after "arm" delete "- ".

CLAIMS

Column 36,
Line 39, after "said" insert -- second --.
Line 44, after "comprises" delete ";" and insert therefor -- : --.
Line 49, after "said clamping" insert -- member; and --.

Column 37,
Line 10, after "between" delete "the".
Line 12, delete "bt" and insert therefor -- be --.
Line 48, after "input" insert -- apparatus --.
Line 53, delete "suporting" and insert therefor -- support --.

UNITED STATES PATENT AND TRADEMARK OFFICE
CERTIFICATE OF CORRECTION

PATENT NO. : 5,933,191
DATED : August 3, 1999
INVENTOR(S) : Kazuto Ariga et al.

It is certified that error appears in the above-identified patent and that said Letters Patent is hereby corrected as shown below:

<u>Column 38,</u>
Line 18, delete "said pair of clamping member," and insert therefor -- the projections of said first support members and said second slide member; --
Line 22, delete "members." and insert therefor -- member. --.
Line 41, delete "sid" and insert therefor -- said --.
Line 59, delete "comprises" and insert therefore -- comprising --.

Signed and Sealed this

Twenty-first Day of August, 2001

Attest:

*Nicholas P. Godici*

NICHOLAS P. GODICI
*Attesting Officer*    *Acting Director of the United States Patent and Trademark Office*